(12) United States Patent
Stojanovic et al.

(10) Patent No.: US 10,225,111 B2
(45) Date of Patent: *Mar. 5, 2019

(54) PARTIAL RESPONSE RECEIVER

(71) Applicant: Rambus Inc., Sunnyvale, CA (US)

(72) Inventors: Vladimir M. Stojanovic, Lexington, MA (US); Andrew C. Ho, San Jose, CA (US); Anthony Bessios, Pittsburgh, PA (US); Bruno W. Garlepp, Sunnyvale, CA (US); Grace Tsang, Los Altos Hills, CA (US); Mark A. Horowitz, Menlo Park, CA (US); Jared L. Zerbe, Woodside, CA (US); Jason C. Wei, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,205

(22) Filed: Feb. 27, 2018

(65) Prior Publication Data

US 2018/0287829 A1 Oct. 4, 2018

Related U.S. Application Data

(63) Continuation of application No. 15/092,435, filed on Apr. 6, 2016, now Pat. No. 9,917,708, which is a
(Continued)

(51) Int. Cl.
*H04L 25/03* (2006.01)
*H04L 25/06* (2006.01)
(Continued)

(52) U.S. Cl.
CPC ...... *H04L 25/03057* (2013.01); *H04L 7/0276* (2013.01); *H04L 25/063* (2013.01);
(Continued)

(58) Field of Classification Search
CPC ..... H04L 25/03057; H04L 2025/03369; H04L 27/01; H04L 25/03987; H04B 3/04
See application file for complete search history.

(56) References Cited

U.S. PATENT DOCUMENTS 3,534,273 A 10/1970 Thomas
3,582,879 A 6/1971 Sullivan
(Continued)

FOREIGN PATENT DOCUMENTS

EP 0180066 A2 5/1986
EP 0365257 A2 4/1990
(Continued)

OTHER PUBLICATIONS

Aboulnasr et al., "Characterization of a Symbol Rate Timing Recovery Technique for a 2B1Q Digital Receiver," IEEE Trans. on Communications, vol. 42, Nos. 2/3/4, pp. 1409-1414, Feb.-Apr. 1994. 6 pages.
(Continued)

*Primary Examiner* — Curtis Odom
(74) *Attorney, Agent, or Firm* — Lance Kreisman; Peninsula Patent Group

(57) ABSTRACT

A signaling system is described. The signaling system comprises a transmit device, a receive device including a partial response receive circuit, and a signaling path coupling the transmit device and the receive device. The receive device observes an equalized signal from the signaling path, and includes circuitry to use feedback from the most recent previously resolved symbol to sample a currently incoming symbol. The transmit device equalizes transmit data to transmit the equalized signal, by applying weighting based on one or more data values not associated with the most recent previously resolved symbol value.

20 Claims, 26 Drawing Sheets

Related U.S. Application Data continuation of application No. 14/683,081, filed on Apr. 9, 2015, now Pat. No. 9,407,473, which is a continuation of application No. 13/460,732, filed on Apr. 30, 2012, now Pat. No. 9,025,678, which is a continuation of application No. 12/710,615, filed on Feb. 23, 2010, now Pat. No. 8,170,163, which is a continuation of application No. 10/966,070, filed on Oct. 18, 2004, now Pat. No. 7,715,501, which is a continuation of application No. 10/662,872, filed on Sep. 16, 2003, now Pat. No. 7,397,848.

(60) Provisional application No. 60/461,729, filed on Apr. 9, 2003.

(51) Int. Cl.
*H04L 25/497* (2006.01)
*H04L 7/027* (2006.01)

(52) U.S. Cl.
CPC .. *H04L 25/497* (2013.01); *H04L 2025/03369* (2013.01); *H04L 2025/03503* (2013.01)

(56) References Cited

U.S. PATENT DOCUMENTS

| | | |
|---|---|---|
| 3,775,688 A | 11/1973 | Hinoshita et al. |
| 3,992,616 A | 11/1976 | Acker |
| 4,584,559 A | 4/1986 | Penney |
| 4,615,038 A | 9/1986 | Lim |
| 4,639,681 A | 1/1987 | Hasegawa |
| 4,709,376 A | 11/1987 | Kage |
| 4,719,369 A | 1/1988 | Asano et al. |
| 4,730,343 A | 3/1988 | Kanemasa |
| 4,970,609 A | 11/1990 | Cunningham et al. |
| 4,992,677 A | 2/1991 | Ishibashi et al. |
| 5,014,226 A | 5/1991 | Horstmann et al. |
| 5,036,525 A | 7/1991 | Wong |
| 5,122,690 A | 6/1992 | Bianchi |
| 5,122,890 A | 6/1992 | Makow |
| 5,191,462 A | 3/1993 | Gitlin et al. |
| 5,194,462 A | 3/1993 | Hirasaka et al. |
| 5,254,883 A | 10/1993 | Horowitz et al. |
| 5,265,125 A | 11/1993 | Ohta |
| 5,268,930 A | 12/1993 | Sendyk |
| 5,402,378 A | 3/1995 | Min |
| 5,402,445 A | 3/1995 | Matsuura |
| 5,425,033 A | 6/1995 | Jessop et al. |
| 5,448,200 A | 9/1995 | Fernandez et al. |
| 5,455,844 A | 10/1995 | Ishikawa |
| 5,459,762 A | 10/1995 | Wang et al. |
| 5,465,093 A | 11/1995 | Kusumoto et al. |
| 5,490,169 A | 2/1996 | Blackwell |
| 5,546,424 A | 8/1996 | Miyake |
| 5,596,285 A | 1/1997 | Marbot et al. |
| 5,659,581 A | 8/1997 | Betts et al. |
| 5,668,830 A | 9/1997 | Georgiou |
| 5,675,394 A | 10/1997 | Choi |
| 5,675,588 A | 10/1997 | Maruyama et al. |
| 5,742,798 A | 4/1998 | Goldrian |
| 5,757,297 A | 5/1998 | Ferraiolo |
| 5,757,857 A | 5/1998 | Buchwald |
| 5,778,217 A | 7/1998 | Kao |
| 5,802,105 A | 9/1998 | Tiedemann, Jr. |
| 5,852,630 A | 12/1998 | Langberg et al. |
| 5,875,177 A | 2/1999 | Uriu et al. |
| 5,877,647 A | 3/1999 | Vajapey et al. |
| 5,896,067 A | 4/1999 | Williams |
| 5,898,321 A | 4/1999 | Ilkbahar et al. |
| 5,917,340 A | 6/1999 | Manohar et al. |
| 5,940,442 A | 8/1999 | Wong et al. |
| 5,990,814 A | 11/1999 | Croman et al. |
| 6,108,801 A | 8/2000 | Malhotra et al. |
| 6,118,824 A | 9/2000 | Smith et al. |
| 6,122,757 A | 9/2000 | Kelley |
| 6,212,144 B1 | 4/2001 | Asano |
| 6,256,342 B1 | 7/2001 | Schlag et al. |
| 6,262,591 B1 | 7/2001 | Hui |
| 6,288,563 B1 | 9/2001 | Muljono et al. |
| 6,304,071 B1 | 10/2001 | Popplewell et al. |
| 6,377,076 B1 | 4/2002 | Gauthier |
| 6,380,758 B1 | 4/2002 | Hsu et al. |
| 6,417,700 B1 | 7/2002 | Hirata et al. |
| 6,448,806 B1 | 9/2002 | Roth |
| 6,509,756 B1 | 1/2003 | Yu et al. |
| 6,541,966 B1 | 4/2003 | Keene |
| 6,541,996 B1 | 4/2003 | Rosefield et al. |
| 6,574,758 B1 | 6/2003 | Eccles |
| 6,587,917 B2 | 7/2003 | Simmons |
| 6,628,621 B1 | 9/2003 | Appleton |
| 6,707,325 B2 | 3/2004 | Taguchi et al. |
| 6,717,985 B1 | 4/2004 | Poon |
| 6,724,329 B2 | 4/2004 | Casper |
| 6,760,389 B1 | 7/2004 | Mukherjee et al. |
| 6,760,574 B1 | 7/2004 | Lu et al. |
| 6,839,861 B2 | 1/2005 | Hoke et al. |
| 6,885,691 B1 | 4/2005 | Lyu |
| 6,897,712 B2 | 5/2005 | Ficken et al. |
| 6,941,483 B2 | 9/2005 | Brown et al. |
| 6,970,681 B2 | 11/2005 | Darabi |
| 6,979,987 B2 | 12/2005 | Kernahan et al. |
| 6,987,804 B2 | 1/2006 | Buchali et al. |
| 7,016,445 B2 | 3/2006 | Bronfer et al. |
| 7,054,402 B2 | 5/2006 | Muellner |
| 7,058,150 B2 | 6/2006 | Buchwald et al. |
| 7,092,472 B2 | 8/2006 | Stojanovic |
| 7,099,400 B2 | 8/2006 | Yang et al. |
| 7,281,079 B2 | 10/2007 | Bains et al. |
| 7,339,990 B2 | 3/2008 | Hidaka |
| 7,397,848 B2 | 7/2008 | Stojanovic et al. |
| 7,471,691 B2 | 12/2008 | Black et al. |
| 8,170,163 B2 | 5/2012 | Stojanovic et al. |
| 9,407,473 B2 * | 8/2016 | Stojanovic ............ H04L 25/063 |
| 9,917,708 B2 * | 3/2018 | Stojanovic ............ H04L 25/063 |
| 2001/0005405 A1 | 6/2001 | Shimoda |
| 2001/0026578 A1 | 10/2001 | Ando |
| 2001/0043649 A1 | 11/2001 | Farjad-Rad |
| 2002/0057101 A1 | 5/2002 | Tang et al. |
| 2002/0122503 A1 | 9/2002 | Agazzi |
| 2002/0150184 A1 | 10/2002 | Hafeez |
| 2002/0184564 A1 | 12/2002 | Muellner |
| 2003/0002602 A1 | 1/2003 | Kwon |
| 2003/0016091 A1 | 1/2003 | Casper |
| 2003/0063664 A1 | 4/2003 | Bodenschatz |
| 2003/0070126 A1 | 4/2003 | Werner et al. |
| 2003/0084385 A1 | 5/2003 | Zerbe |
| 2003/0093713 A1 | 5/2003 | Werner et al. |
| 2003/0108096 A1 | 6/2003 | Steinbach |
| 2003/0110433 A1 | 6/2003 | Castagnozzi et al. |
| 2003/0142740 A1 | 7/2003 | Haunstein et al. |
| 2003/0159094 A1 | 8/2003 | Smith |
| 2003/0208707 A9 | 11/2003 | Zerbe et al. |
| 2004/0001567 A1 | 1/2004 | Wei |
| 2004/0022311 A1 | 2/2004 | Zerbe et al. |
| 2004/0037374 A1 | 2/2004 | Gonikberg |
| 2004/0071203 A1 | 4/2004 | Gorecki |
| 2004/0071204 A1 | 4/2004 | Gorecki |
| 2004/0071205 A1 | 4/2004 | Gorecki |
| 2004/0076192 A1 | 4/2004 | Zerbe et al. |
| 2004/0141567 A1 | 7/2004 | Yang et al. |
| 2004/0203559 A1 | 10/2004 | Stojanovic et al. |
| 2007/0046347 A1 | 3/2007 | Lee |
| 2007/0047677 A1 | 3/2007 | Son et al. |

FOREIGN PATENT DOCUMENTS

| | | |
|---|---|---|
| EP | 0455910 A2 | 9/1991 |
| EP | 1331779 A1 | 7/2003 |
| JP | 60-176324 A | 10/1985 |
| JP | 2000-035831 A | 2/2000 |
| JP | 2000-332574 A | 11/2000 |
| JP | 2004-242327 A | 8/2004 |
| WO | WO-2000-011830 A2 | 3/2000 |

(56) References Cited

FOREIGN PATENT DOCUMENTS

| WO | WO-2003-025599 A1 | 3/2003 |
|---|---|---|
| WO | WO-2003-032652 A2 | 4/2003 |
| WO | WO-2004-008490 | 1/2004 |
| WO | WO-2004-093144 A2 | 10/2004 |

OTHER PUBLICATIONS

Armstrong, Jean, "Symbol Synchronization Using Baud-Rate Sampling and Data-Sequence-Dependent Signal Processing," IEEE Trans. on Communications, vol. 39, No. 1, pp. 127-132, Jan. 1991. 6 pages.
Douglas, Scott C., "Fast Implementations of the Filtered-X LMS and LMS Algorithms for Multichannel Active Noise Control," IEEE Transactions on Speech and Audio Proc., vol. 7, No. 4, Jul. 1999, pp. 454-465. 12 pages.
EP Communication re Extended European Search Report dated Nov. 30, 2009 for EP 9165754.4. 10 pages.
EP Extended European Search report dated Mar. 6, 2012 re EP Application No. 10175167.5. 9 pages.
EP Extended Search Report dated Sep. 15, 2015 in EP Application No. 15169337.1. 6 pages.
EP Extended Search Report with dated Nov. 30, 2009 re EP Divisional Patent Application No. 09 165 754.4. 10 pages.
EP Office Action dated Jan. 20, 2012 re EP Application No. 09155838.7. 5 pages.
EP Office Action dated Jan. 8, 2013 in EP Application No. 10175167.5-1525. 6 pages.
EP Office Action with dated Mar. 22, 2010 re EP Application No. 09155838.7. 4 pages.
EP Official Communication dated Nov. 23, 2009, for Application No. 04 814 386.1-2415. 8 pages.
EP Response dated Apr. 8, 2010 to Official Communication dated Nov. 23, 2009 re EP Application No. 04814386.1-2415 . . . 26 Pages.
EP Response dated Jul. 15, 2013 in EP Application No. 10175167.5, Includes New Claims. 18 pages.
EP Response dated Jun. 19, 2012 to EP Official Communication dated Jan. 20, 2012 in EP Application No. 09155838.7-1525. 20 pages.
EP Response dated Oct. 17, 2014 in EP Application No. 09155838.7, Includes New Claims. 10 pages.
EP Response dated Oct. 17, 2014 in EP Application No. 10175167.5, Includes New Claims. 12 pages.
EP Response with EP Appln. No. 15169337.1 filed on Jan. 11, 2016 in Response to EP Official Communication dated Nov. 23, 2015 and EP Search Report dated Sep. 15, 2015. 20 pages.
EP Search Report/Declaration and Abstract dated Mar. 16, 2010 re EP Application No. 09155838.7. 4 Pages.

Hoke et al., "Self-timed Interface for S/390 I/O Subsystem Interconnection," IBM J.Res. Develop., vol. 43, No. 5/6, Sep./Nov. 1999, pp. 829-846. 18 pages.
JP Argument and Amendment dated Jun. 21, 2010 in response to the Office Action re JP Application No. 2006-545411. 9 pages.
JP Argument dated Sep. 15, 2010 for JP Patent Application No. 2006-509855. 2 pages.
JP Office Action dated Nov. 26, 2010 re JP Application No. 2006-545411. 8 Pages.
JP Office Action dated Mar. 16, 2010 re Notice of Reasons for Rejection for JP Application No. 2006-509855 with translation. 4 pages.
JP Office Action dated Nov. 30, 2009 in JP Application No. 2006-545411. 6 pages.
Kasturia et al. Adaptive Nonlinear Cancellation for High-Speed Fiber-Optic Systems, Journal of Lightwave Technology, vol. 10, Issue 7, Jul. 1992 pp. 971-977.
Kasturia et al., "Techniques for High-Speed Implementation of Nonlinear Cancellation," IEEE Journal on Selected Areas in Communications, vol. 9, No. 5, Jun. 1991, pp. 711-717. 7 pages.
Martin et al., "8Gb/s Differential Simultaneous Bidirectional Link with 4 mV 9ps Waveform Capture Diagnostic Capability", ISSCC 2003/Session 4/Clock Recovery and Backplane Transceivers/Paper 4.5, 2003 IEEE International Solid State Circuits Conference. 10 pages.
Mueller et al., "Timing Recovery in Digital Synchronous Data Receivers," IEEE Trans. on Communications, vol. COM-24, No. 5, pp. 516-531, May 1976.
Parhi, Keshab K., "High-Speed Architectures for Algorithms with Quantizer Loops," IEEE, 1990, pp. 2357-2360. 4 pages.
Parhi, Keshab K., "Pipelining in Algorithms with Quantizer Loops," IEEE Transactions on Circuits and Systems, vol. 38, No. 7, Jul. 1991, pp. 745-754. 10 pages.
Response to Office Action dated Mar. 22, 2010, dated Oct. 1, 2010, re EP Appliction No. 09155838.7-1525. 27 pages.
Response to the Official Communication dated Jul. 22, 2010, dated Aug. 12, 2010 in EP Application No. 09165754.4-2415. 39 pages.
Response to the Official Communication dated Mar. 22, 2010, dated Jul. 30, 2010, re EP Application No. 09155838.7-1525. 1 page.
Stojanovic et al., "Transmit Pre-emphasis for High-Speed Time-Division-Multiplexed Serial-Link Transceiver," International Conference on Communications, New York, NY, May 2, 2002, pp. 1-6. 6 pages.
Winters et al., "Adaptive Nonlinear Cancellation for High-Speed Fiber-Optic Systems," Journal of Lightwave Technology, vol. 10, No. 7, Jul. 1992, IEEE, pp. 971-977. 7 pages.
Yeh et al., "Adaptive Minimum Bit-Error Rate Equalization for Binary Signaling," IEEE Transactions on Communications, vol. 48, No. 7, Jul. 2000 pp. 1226-1235. 10 pages.
Zerbe, Jared et al., "Equalization and Clock Recovery for a 2.5-10-Gb/s 2-PAM/4-PAM Backplane Transceiver Cell." IEEE Journal of Solid-State Circuits, vol. 38, No. 12, Dec. 2003. 10 Pages.

* cited by examiner

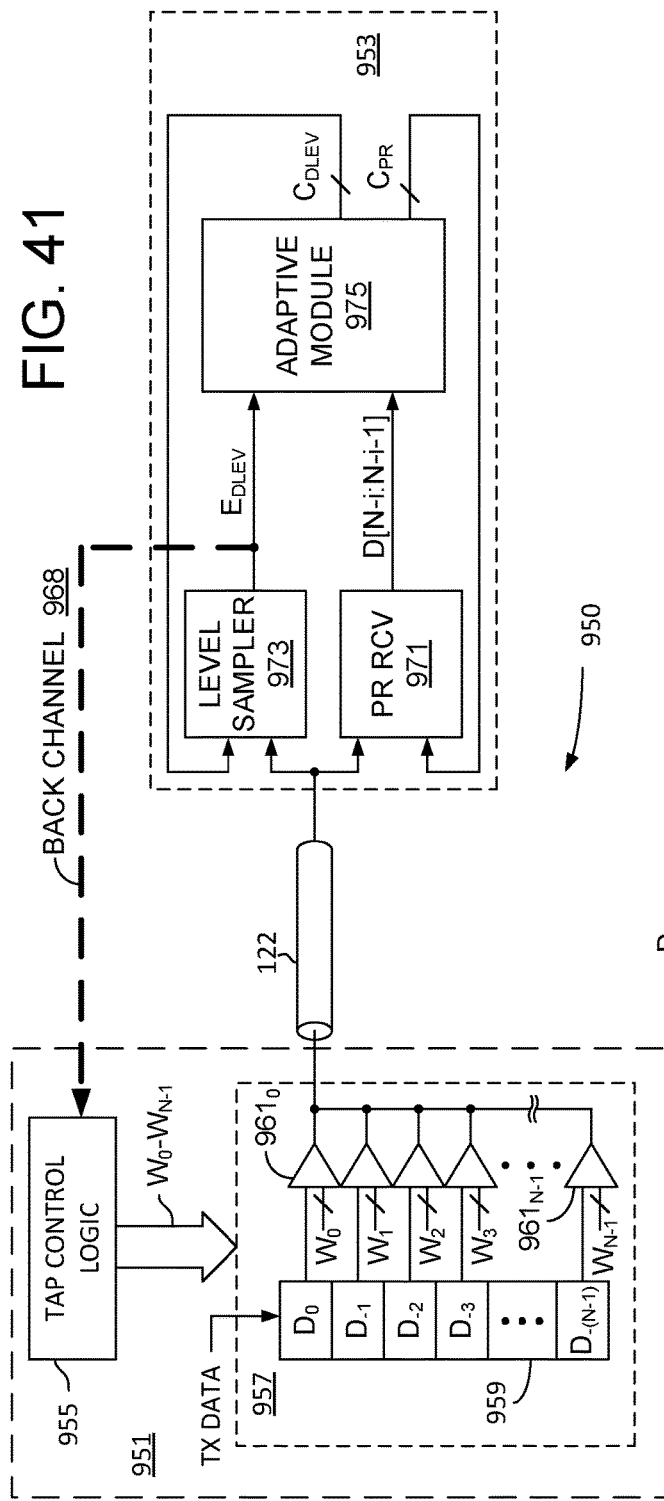
FIG. 41
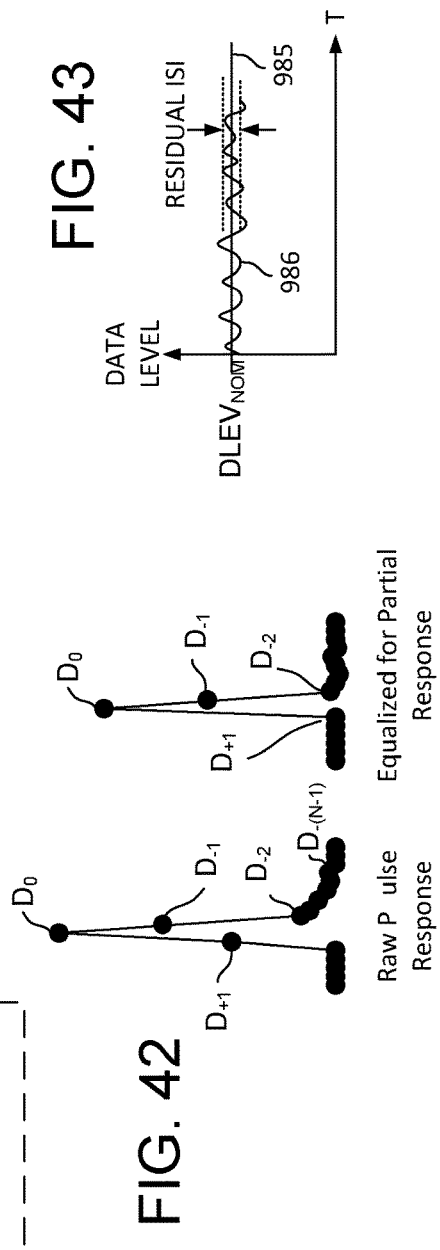
FIG. 43
FIG. 42

PARTIAL RESPONSE RECEIVER

CROSS-REFERENCE TO RELATED APPLICATIONS

This application is a continuation of U.S. patent application Ser. No. 15/092,435, filed Apr. 6, 2016, which is a continuation of U.S. patent application Ser. No. 14/683,081, filed Apr. 9, 2015, now U.S. Pat. No. 9,407,473, which is a continuation of U.S. patent application Ser. No. 13/460,732, filed Apr. 30, 2012, now U.S. Pat. No. 9,025,678, which is a continuation of U.S. patent application Ser. No. 12/710,615, filed Feb. 23, 2010, issuing on May 1, 2012 as U.S. Pat. No. 8,170,163, which is a continuation of U.S. patent application Ser. No. 10/966,070, filed Oct. 18, 2004, now U.S. Pat. No. 7,715,501, which is a continuation of U.S. patent application Ser. No. 10/662,872 filed Sep. 16, 2003, now U.S. Pat. No. 7,397,848, which claims priority from U.S. Provisional Application No. 60/461,729 filed Apr. 9, 2003, all of which are hereby incorporated by reference in their entirety.

FIELD OF THE INVENTION

The present invention relates generally to the field of communications, and more particularly to high speed electronic signaling within and between integrated circuit devices.

BACKGROUND

Electrical pulses transmitted on a band-limited signaling path disperse in time as they travel from source to destination. In systems in which data is transmitted as a sequence of level-encoded electrical pulses, such time-domain dispersion results in a blending of neighboring pulses; an effect known as dispersion-type inter-symbol interference (ISI). Dispersion-type ISI becomes more pronounced at faster signaling rates, ultimately degrading the signal quality to the point at which distinctions between originally transmitted signal levels may be lost.

FIG. 1 illustrates a prior-art signaling system having an equalizing output driver 109 and an equalizing receiver 103 to mitigate dispersion-type ISI resulting from signal transmission on a signaling path 102. The receiver 103 includes a sampling circuit 105 to generate digitized samples 106 of the incoming signal, a shift register 107 to store some number (N) of the most recently received samples, and an equalizer 112 to generate an equalization signal 114 based on samples stored in the shift register 107. Ideally, the equalization signal 114 represents the residual signal level on path 102 of the N prior received samples in the incoming signal so that, by subtracting the equalization signal 114 from the incoming signal in difference circuit 115, the dispersion-type ISI resulting from the prior transmissions is canceled. Because the prior decisions of the sampling circuit 105 are fed back to the sampling circuit input in the form of the equalization signal 114, the receiver 103 is commonly referred to as a decision feedback equalizer (DFE).

One major limitation of the DFE 103 is that the time delay in the overall feedback path from sampling circuit 105 to difference circuit 115 makes it difficult to generate the equalization feedback signal 114 in time to equalize the signal level of the immediately following data value if the least latent sample (i.e., the most recently captured sample 106) is included in the equalization feedback signal 114. Including the least latent sample in the equalization signal is particularly challenging in modern high-speed signaling systems in which incoming symbols are present on the signal path 102 for extremely brief intervals (e.g., less than a nanosecond for signal rates above one Gigabit per second). One solution to the least-latent sample problem is to omit one or more of the least-latent samples from contributing to generation of the decision-feedback equalization signal. Unfortunately, the least latent sample, being nearest in time to the incoming symbol, tends to be the largest contributor to dispersion-type ISI and therefore a primary objective of cancellation by the DFE. Consequently, in signaling systems in which the least-latent sample is omitted from contribution to decision-feedback equalization, transmit-side pre-emphasis is often used to decrease the dispersion-type ISI caused by the least-latent symbol. That is, when a given symbol is transmitted by the equalizing output driver 109, one or more previously transmitted symbols stored in shift register 113 (i.e., the least latent symbols relative to the outgoing symbol) are used to pre-shape the outgoing waveform to reduce the dispersion-type ISI observed at the receiver. Unfortunately, as can be seen in the raw and equalized pulse responses depicted in FIG. 2, forcing the least-latent sample, $D_{N-1}$, to zero (or near zero) results in significant attenuation of the overall signal level, thereby reducing signaling margins and ultimately limiting the data rate of the signaling system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 41 illustrates a partial-response signaling system according to an embodiment of the invention;

FIG. 42 illustrates a raw pulse response and a pulse response equalized by the signaling system of FIG. 41 to enable partial-response data reception; and FIG. 43 illustrates residual inter-symbol interference that may be equalized by transmit preemphasis within the signaling system of FIG. 41.

DETAILED DESCRIPTION

Figure 1:
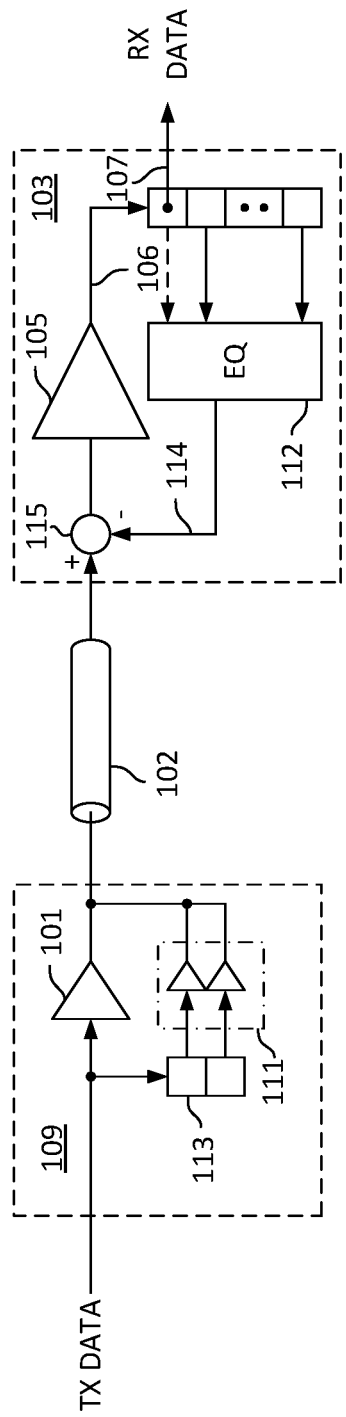
FIG. 1 illustrates a prior-art signaling system.
Figure 2:
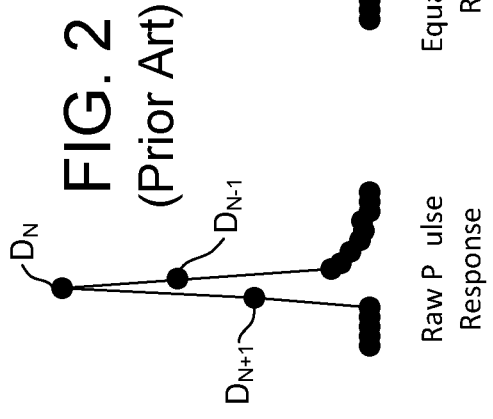
FIG. 2 illustrates raw and equalized pulse responses observed in the prior art signaling system of FIG. 1.

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<$\overline{\text{signalname}}$>') is also used to indicate an active low signal.

A novel signal receiving circuit for use in electrical signaling systems is disclosed in various embodiments. In one embodiment, the signal receiving circuit includes a pair of comparators for comparing an incoming electrical signal against respective threshold levels, with each threshold level being set according to the level of a dispersed component of a previously received signal. More specifically, one of the threshold levels corresponds to the dispersion-type ISI introduced by a previously transmitted signal representative of a first digital state, and the other of the threshold levels corresponds to the dispersion-type ISI introduced when the previously transmitted signal is representative of a second digital state. In the case of a binary signaling system, the previously transmitted signal is resolved into one of two states by the receiving circuit, then used to select which of the comparators is to source the sample to be used for selection of the subsequent pair of samples. By this arrangement, each of the comparators compares the incoming signal against a threshold that is offset from a nominal value according to a respective, anticipated level of ISI, with the comparator having its threshold level offset in the direction that corresponds to the state of the previously received signal ultimately being selected as the sample source. Because samples are captured on the assumption of dispersion-type ISI resulting from both possible states of the previously captured sample (i.e., the least-latent sample), both samples are available for later selection when the state of the previously captured sample is resolved. Thus, by establishing separate threshold levels according to the different possible levels of dispersion-type ISI and comparing the incoming signal against each threshold level, the timing problems associated with generating an equalization signal that includes the least latent sample are avoided. Because the threshold level supplied to each of the comparators includes an offset according to the residual, partial response of the signaling path to the previously transmitted signal, a receive circuit having such offset-threshold comparators is referred to herein as a partial response receiver.

In another embodiment of the invention, a multi-level signal receiver (i.e., receiver capable of receiving a symbol representative of more than a single binary bit), may be switched to a binary signaling, partial response mode. In one implementation, a multi-PAM receiver (Pulse Amplitude Modulation receiver—a type of multi-level signal receiver) includes multiple comparators for distinguishing different possible levels (e.g., 4 levels in a 4-PAM receiver, 8 levels in an 8-PAM receiver, etc.) such that no additional comparators are necessary to support partial response operation. Instead, when the partial response mode is enabled, the threshold levels supplied to the comparators are adjusted to match the partial response levels for the least-latent symbol (or set of N least-latent symbols) and the post processing of the comparator outputs is switched from a symbol decoding operation to a sample selection operation.

In other embodiments of the invention, methods and circuits for generating partial response threshold levels are disclosed. Also, methods and circuits for transmitting a partial-response data signal that includes a partial response from selected prior-transmitted bits are disclosed. Further, methods and circuits for recovering a clock signal from a partial response data signal are also disclosed.

Signaling System Overview

Figure 3:
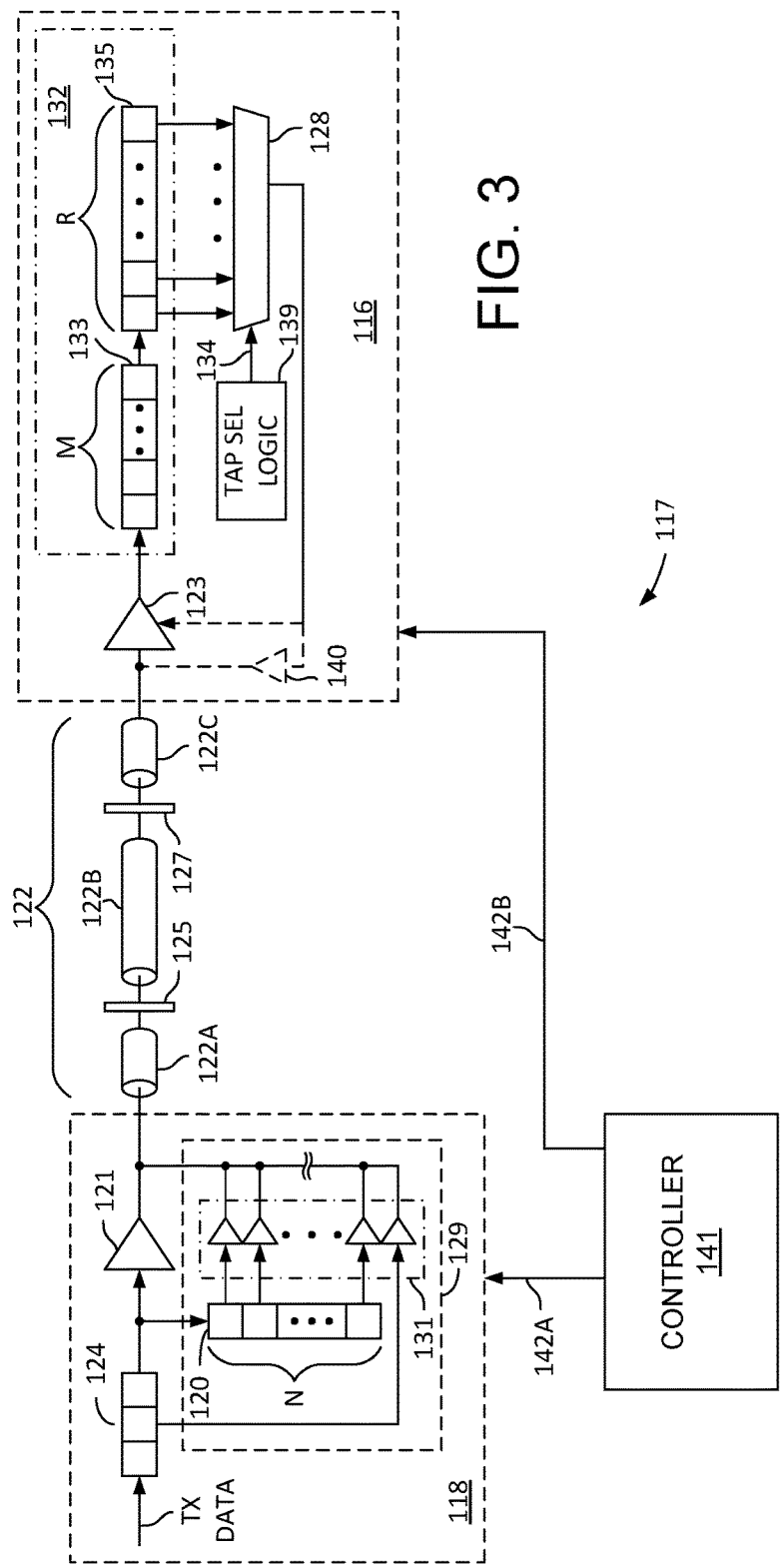
FIG. 3 illustrates a signaling system that includes a partial response receiver according to an embodiment of the invention.

FIG. 3 illustrates a signaling system 117 in which embodiments of the present invention may be used. The system 117 includes an equalizing transmitter 118 and equalizing receiver 116 coupled to one another via a high-speed signal path 122, and a controller 141 coupled to the transmitter 118 and the receiver 116 via relatively low-speed signal paths 142A and 142B, respectively. In one embodiment, the signal path 122 is formed by component signal paths 122A, 122B and 122C (e.g., transmission lines that introduce respective, nonzero propagation delays and exhibit respective impedance characteristics), each disposed on respective circuit boards that are coupled to one another via circuit board interfaces 125 and 127 (e.g., connectors). In a specific implementation, signal path 122B is formed on a backplane and signal paths 122A and 122C are formed on respective daughterboards (e.g., line cards) that are removably coupled to the backplane via circuit board interfaces 125 and 127. The transmitter 118 and receiver 116 are implemented in respective integrated circuit (IC) devices that are mounted on the daughterboards. The controller, which may be a general or special purpose processor, state machine or other logic circuit, is implemented within a third integrated circuit device mounted to a yet another circuit board. In the embodiment of FIG. 3, signal paths 142A and 142B are used to convey configuration information from the controller 141 to the transmitter 118 and receiver 116, respectively, and may be disposed on the same circuit board (or circuit boards) as signal path 122 or implemented by an alternative structure such as a cable. The controller may alternatively be coupled to the transmitter 118 and receiver 116 by a shared signal path such as a multi-drop bus. The operation of the controller 141 is discussed in greater detail below. In alternative embodiments, the IC devices containing the transmitter 118, receiver 116 and controller 141 may be mounted to a common structure with the signaling paths 122, 142A and 142B coupled directly to the IC devices (e.g., all three ICs mounted to a circuit board and coupled to one another via circuit board traces, or all three ICs packaged within a single multi-chip module with signal paths 122 and 142 formed between the ICs by bond wires or other conducting structures). Also, the transmitter 118, receiver 116 and controller 141, or any subset thereof, may be included within the same IC device (e.g., system on chip) and the signaling paths 122 and/or 142 implemented by a metal layer or other conducting structure within the IC device.

Figure 4:
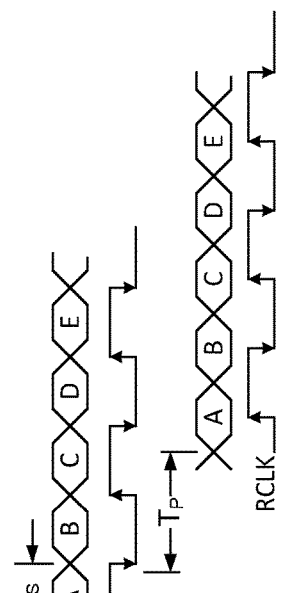
FIG. 4 illustrates a relationship between clock and data signals in one embodiment of the signaling system of FIG. 3.

The equalizing transmitter 118 transmits data on the signaling path 122 during successive time intervals, referred to herein as symbol times. In one embodiment, illustrated by the timing diagram of FIG. 4, each symbol time, $T_S$, corresponds to a half cycle of a transmit clock signal, TCLK, such that two data values (e.g., values A and B) are transmitted on signaling path 122 per transmit clock cycle. The transmitted data signal arrives at the input of the equalizing receiver 116 after propagation time, $T_P$, and is sampled by the receiver 116 in response to edges of a receive clock signal, RCLK. The receive clock signal may be received within the receive circuit via an external clock line, or may be a recovered version of a reference clock signal (e.g., recovered by a delay-locked loop or phase locked loop circuit). In other embodiments, discussed below, the receive clock signal may be recovered from the transmitted data signal. Still referring to FIG. 4, the receive clock signal has a quadrature phase relation to data valid windows (i.e., data eyes) in the incoming data signal such that each sample is captured at the midpoint of a data eye. In alternative embodiments, the sampling instant may be skewed relative to data eye midpoints as necessary to satisfy signal setup and hold time requirements in the receiver 116. Also, more or fewer symbols may be transmitted per cycle of the transmit clock signal.

The equalizing transmitter 118 includes a transmit shift register 124, output driver 121 and transmit equalizer 129; the transmit equalizer 129 itself including a shift register 120 and a bank of output drivers 131. At the start of each symbol time, the data value at the head (i.e., output) of the transmit shift register 124, referred to herein as the primary data value, is driven onto the signal path 122 by the output driver 121, and the transmit equalizer 129 simultaneously drives an equalizing signal onto the signal path 122. This type of equalization is referred to herein as transmit preemphasis. In one embodiment, the signal driven onto the signal path 122 by the output driver 121 (referred to herein as the primary signal) is a multi-level signal having one of four possible states (e.g., defined by four distinct signal ranges) and therefore constitutes a symbol representative of two binary bits of information. In alternative embodiments, the primary signal may have more or fewer possible states and therefore represent more or fewer than two binary bits. Also, the primary signal may be single-ended or differential (an additional signal line is provided to carry the complement signal in the differential case), and may be a voltage or current mode signal.

Each of the output drivers 131 within the transmit equalizer 129 form either a pre-tap driver or post-tap driver according to whether the source data value has already been transmitted (post-tap data) or is yet to be transmitted (pre-tap data). In the specific embodiment of FIG. 3, the equalizer includes N post-tap drivers sourced by data values within the shift register 120 and one pre-tap driver sourced by a data value within the transmit shift register 124. Accordingly, the resultant equalizing signal driven onto the data path 122 will have a signal level according to data values having symbol latencies of −1, 1, 2, . . . , N, where the symbol latency of a given data value refers to the number of symbol times by which transmission of the data value precedes the transmission of the primary value. Different numbers of post-tap and pre-tap drivers may be provided in alternative embodiments, thereby allowing for equalization based on values having different symbol latencies.

Still referring to FIG. 3, the equalizing receiver 116 includes a partial-response receive circuit 123, buffer 132 (e.g., shift register), tap select circuit 128 and tap select logic 139. Data signals are sampled by the partial response receive circuit 123 to generate digitized samples that are stored in the buffer 132 for eventual use by application logic (not shown). Because the buffered data is stored for at least a predetermined time and represents historical data up to a predetermined number of symbol latencies, the buffered data forms a source of post-tap data values that may be selected by the tap select circuit 128 to source equalizer taps in a receive-side equalizer circuit. Because a subset of buffered data values may be selected according to the precise symbol latencies of reflections and other high-latency distortions, a relatively small number of buffered data values may be selected to form receive-side equalization taps having latencies that match the latencies of the distortions. By this arrangement, high latency distortions may be reduced by receive-side equalization without dramatically increasing the parasitic capacitance of the receiver (i.e., as would result from a large number of receive-side equalization taps). In one embodiment, the tap select logic 139 is a configuration circuit that outputs a tap select signal 134 according to a configuration value. The configuration value may be automatically generated by system 117 (e.g., at system startup) or may be empirically determined and stored within the configuration circuit or elsewhere within system 117.

In the embodiment of FIG. 3, buffer 132 is formed by a shift register having a dead range component 133 having M storage elements and a selectable-range component 135 having R storage elements, the tap select circuit 128 being coupled to the selectable-range component 135 to select the subset of tap data sources therefrom. In alternative embodiments, the dead range component of the buffer 132 may include fewer than M storage elements or even zero storage elements, depending on the time required to receive data and transfer data into the buffer 132. Also, the tap select circuit 128 may be coupled to one or more storage elements within the dead range component 133 to enable the size of the dead range to be programmed according to the configuration of the transmit circuit 118. Finally, as discussed below, the buffer 132 may include one or more parallel registers in addition to (or instead of) the shift register formed by components 133 and 135.

Still referring to FIG. 3, numerous alternative types of equalization circuits may be used within the receiver 116. For example, in one embodiment, the receiver 116 includes an output driver 140 (illustrated in dashed outline in FIG. 3 to indicate its optional nature) to drive an equalizing signal onto the signal path 122 (and therefore to the input of the partial response receive circuit 123) coincidentally with the symbol time of an incoming signal. In another embodiment, the partial response receive circuit 123 includes a preamplifier having an equalizing subcircuit.

Multi-Modal Signal Distribution—Partial Response

Figure 5:
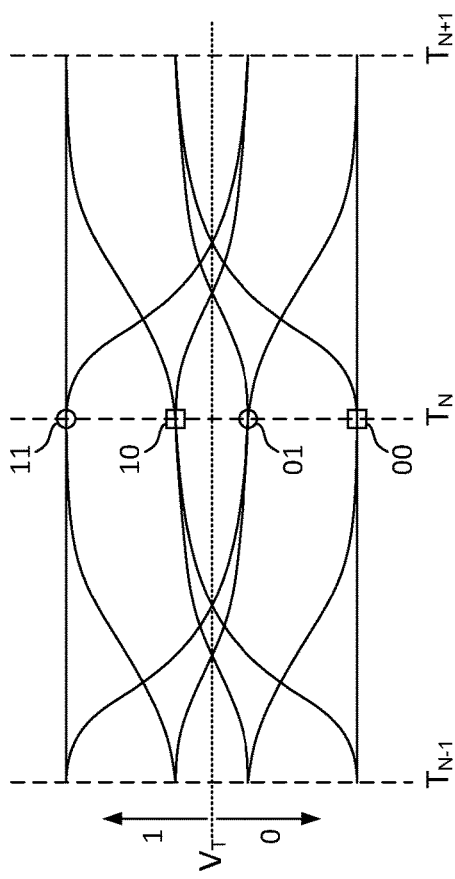
FIG. 5 illustrates the bimodal distribution of a binary signal observed at a signal receiver when the primary source of dispersion-type ISI is the signal transmitted in the immediately preceding symbol time.

FIG. 5 illustrates the bimodal distribution of a binary signal observed at a signal receiver when the primary source of dispersion-type ISI is the signal transmitted in the immediately preceding symbol time. That is, the symbol sampled at time $T_{N-1}$ is the primary source of dispersion-type ISI in the symbol sampled at time $T_N$; the symbol sampled at time $T_N$ is the primary source of dispersion-type ISI in the symbol sampled at time $T_{N+1}$; and so forth. Referring to the signal levels at time $T_N$, it can be seen that if the if the preceding symbol was a logic '1', the partial response to the preceding symbol will raise the signal level at time $T_N$ to one of the circled levels '11' or '01' (the second bit of the '11' and '01' bit sequences corresponding to the state of the signal at time $T_{N-1}$). If the preceding symbol was a logic '0', the partial response to the preceding symbol will lower the signal level at time $T_N$ to one of the square-designated levels '10' or '00'. In a single-ended signaling system, the incoming signal is sampled and compared with a reference voltage level at the midpoint between the steady state extremes (i.e., midway between the '11 . . . 1' and '00 . . . 0' signal levels). Accordingly, the worst case voltage margins (i.e., smallest voltage differences between the signal and reference voltage) occur when the signal transitions from a '1' to a '0' or vice-versa; the '10' and '01' signaling levels becoming indistinguishable when the partial response level (i.e., residual signal level from the preceding symbol transmission) is large. In a differential signaling system, the incoming signal and its complement are sampled, for example, by a differential amplifier which amplifies the difference between the complementary signal levels. As in the single-ended case, the worst case voltage margins occur when the differential signal transitions from a '1' to a '0' or vice-versa; the '10' and '01' signaling levels becoming indistinguishable when the partial response pushes the '10' and '01' levels to the common mode (i.e., the average of a differential signal pair).

Figure 6:
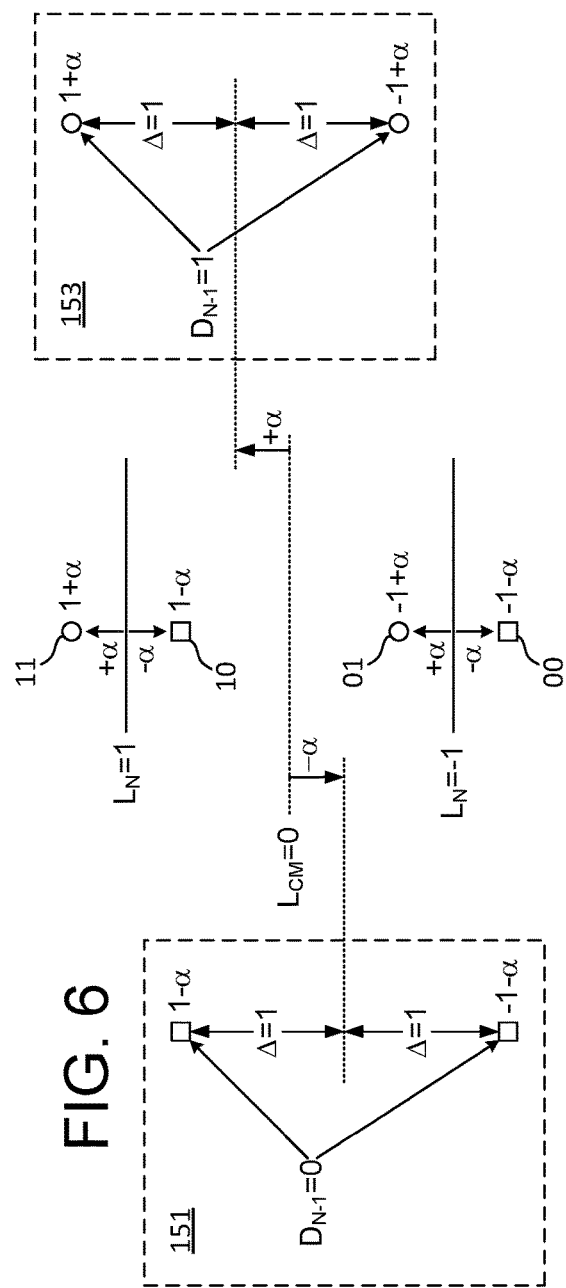
FIG. 6 illustrates the four partial response signal levels depicted in FIG. 5 relative to a common mode level, $L_{CM}$.

FIG. 6 illustrates the four partial response signal levels depicted in FIG. 5 relative to a common mode level, $L_{CM}$. In the case of a differential signaling system, the partial response to the preceding symbol may be viewed as increasing or decreasing the differential amplitude (i.e., the amplitude difference between the signals that form the differential signal pair) relative to a nominal differential amplitude. Normalizing the positive and negative signal levels for the nominal differential amplitude to 1 and −1, respectively, the common mode level, $L_{CM}$, becomes zero, and the four possible signal levels become 1+α, 1−α, −1+α and −1−α, where α represents the magnitude of the partial response to the preceding symbol. Thus, when the preceding symbol, $D_{N-1}$, is a '0', the incoming symbol, $D_N$, is represented by a signal level at either 1−α or −1−α, depending on whether $D_N$ is a '1' or '0' Similarly, when $D_{N-1}=1$, the incoming symbol is represented by a signal level at either 1+α or −1+α according to the state of the current symbol. In the former case (i.e., when $D_{N-1}=0$), the two complementary signal levels, $-1-\alpha$ and $1-\alpha$, have a common mode of $-\alpha$, as shown in box 151. In the latter case (i.e., when $D_{N-1}=1$), the two complementary signal levels, $1+\alpha$ and $-1+\alpha$, have a common mode of $+\alpha$, as shown in box 153.

Partial Response Receiver

Figure 7:
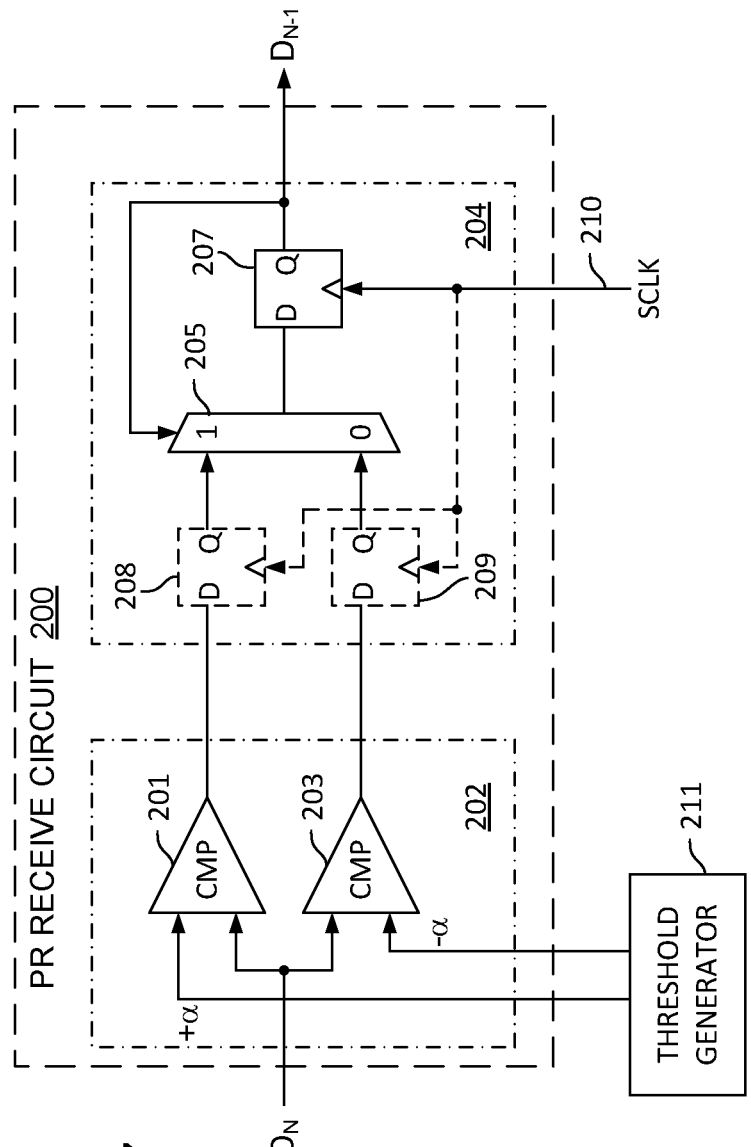
FIG. 7 illustrates a partial response receive circuit according to an embodiment of the invention.

FIG. 7 illustrates a partial response receive circuit 200 according to an embodiment of the invention that exploits the bi-modal characteristic of the signal levels depicted in FIGS. 5 and 6. The partial response circuitry includes a compare circuit 202 to sample the input data signal, $D_N$, and a decision circuit 204 to generate an output data value (i.e., received data value) based on data samples generated by the compare circuit 202. Rather than a single comparator that distinguishes between binary signaling levels based on whether the sampled signal is above or below a common mode threshold, the compare circuit 202 includes two comparators 201 and 203 having threshold levels that are offset from the common mode threshold by the two possible partial responses to the preceding symbol. That is, the threshold level of the comparator 201 is set the $+\alpha$ level, and the threshold level of the comparator 203 is set to the $-\alpha$ level. By this arrangement, if the preceding symbol was a '1' (i.e., $D_{N-1}=1$), the comparator 201 will resolve the incoming signal as being a '1' or '0' by determining whether the signal level is above or below the partial response level, $+\alpha$. Conversely, if $D_{N-1}=0$, the comparator 203 will resolve the incoming signal as being a '1' or '0' by determining whether the signal is above or below the partial response level, $-\alpha$. Because both comparisons are performed for each incoming symbol, the selection of which comparator output represents the state of the symbol may be delayed until the state of the preceding symbol is resolved. In the partial response receive circuit 200, for example, the sample values output by the comparators 201 and 203 are output to the decision circuit 204 where they are optionally stored in storage elements 208 and 209 (e.g., D flip-flops or other types of storage circuits) and provided to respective input ports of a select circuit 205 (e.g., a multiplexer). The sample value selected by the select circuit 205 is stored in a storage circuit 207 in response to a sampling clock signal 210 (or other timing control signal) at which point the sample value becomes the $D_{N-1}$ sample value. The $D_{N-1}$ sample value stored within storage circuit 207 is fed back to the select input of the select circuit 205 to select one of the two sample values generated by the comparators 201 and 203. That is, the $D_{N-1}$ sample value is used to select, via select circuit 205, which of the comparators 201 and 203 will source the $D_N$ sample. In an embodiment that includes the storage elements 208 and 209, the output of storage circuit 207 becomes the $D_{N-2}$ sample value and is used to select one of the $D_{N-1}$ sample values output from the storage elements 208 and 209.

Reflecting on the operation of the partial response receive circuit 200 of FIG. 7 in reference to the signal distribution shown in FIG. 6, it can be seen that the signaling margin (i.e., difference between signal levels representative of '1' and '0' states) within either of the comparators 201, 203 exceeds the signaling margin between the worst-case partial response states. That is, the signaling margin between the worst-case partial response states (10-to-01) is $(1-\alpha)-(-1+\alpha)=2-2\alpha$, while the signaling margin in either pair of the separated signal constellation is $(1-\alpha)-(-1-\alpha)=2$. Thus, as alpha grows, the signaling margin in a single-comparator receiver decreases, going to zero as a approaches 1. By contrast, the signaling margin in the partial response receive circuit 200 of FIG. 7 remains substantially constant at 2, even as a grows. In effect, by offsetting the threshold of the comparators 201 and 203 by the partial response levels $+\alpha$ and $-\alpha$, respectively, the partial response to the preceding symbol is canceled, making the full response of the incoming symbol available to resolve the symbol state.

Still referring to FIG. 7, a threshold generator 211 is used to generate the $\pm\alpha$ thresholds supplied to the comparators 201 and 203. In the case of a single-ended signaling system, the threshold values $\pm\alpha$ may be voltage levels applied to reference inputs of the comparators 201 and 203, respectively, to enable pseudo-differential signal detection (i.e., comparison of the incoming signal level with the threshold voltage level to resolve the digital state of the sample value). In the case of a differential signaling system, the threshold values $\pm\alpha$ may be voltages or currents applied to offset the common modes of the comparators to the $\pm\alpha$ voltage levels depicted in FIG. 6. The threshold values $\pm\alpha$ may also be digital values for controlling digital-to-analog converters (DACs) within the comparators 201 and 203. In one embodiment, the threshold generator 211 includes circuitry for a one-time or periodic determination of the $\pm\alpha$ threshold levels, for example in one or more calibration operations. In other embodiments, the $\pm\alpha$ threshold levels are adaptively generated based on incoming signal levels produced by selected data patterns. Embodiments of the threshold generator 211 are discussed in further detail below.

Multi-Data-Rate Signaling

Figure 8:
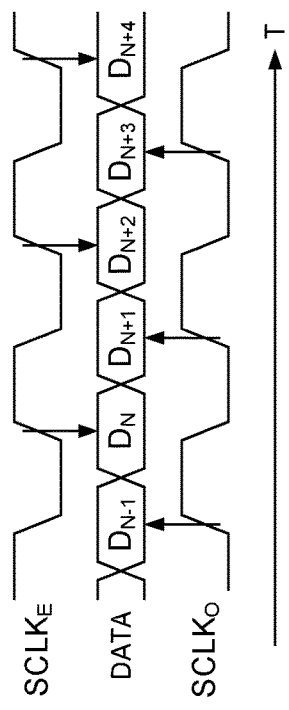
FIG. 8 illustrates a double data rate signaling protocol in which two symbols are transmitted in succession during each cycle of a sampling clock signal.

In the partial response receive circuit 200 of FIG. 7, a single symbol is captured during each cycle of the sampling clock signal 210. That is, a rising (or falling) edge of the sample clock is used to capture samples of the incoming data signal. In a multi-data rate system, multiple symbols are captured per cycle of the sampling clock signal 210. In such systems, clock generation circuitry is provided to generate multiple instances of the sampling clock signal 210 that are phase-distributed through a period (1/frequency) of the sampling clock signal. FIG. 8, for example, depicts a double data rate signaling protocol in which two symbols are transmitted in succession during each period (i.e., cycle time) of a sampling clock signal. Accordingly, two instances of the sampling clock signal are provided: an even-phase sampling clock signal, $SCLK_E$, to sample even-numbered symbols $D_N, D_{N+2}, D_{N+4} \ldots$; and an odd-phase sampling clock signal, $SCLK_O$, to sample odd-numbered symbols $D_{N-1}, D_{N+1}, D_{N+3} \ldots$. This technique may be extended to achieve virtually any data rate, including quad data rate (4 symbols per sampling clock cycle), octal data rate (8 symbols per sampling clock cycle), decade data rate (10 symbols per sampling clock cycle), and so forth.

Figure 9:
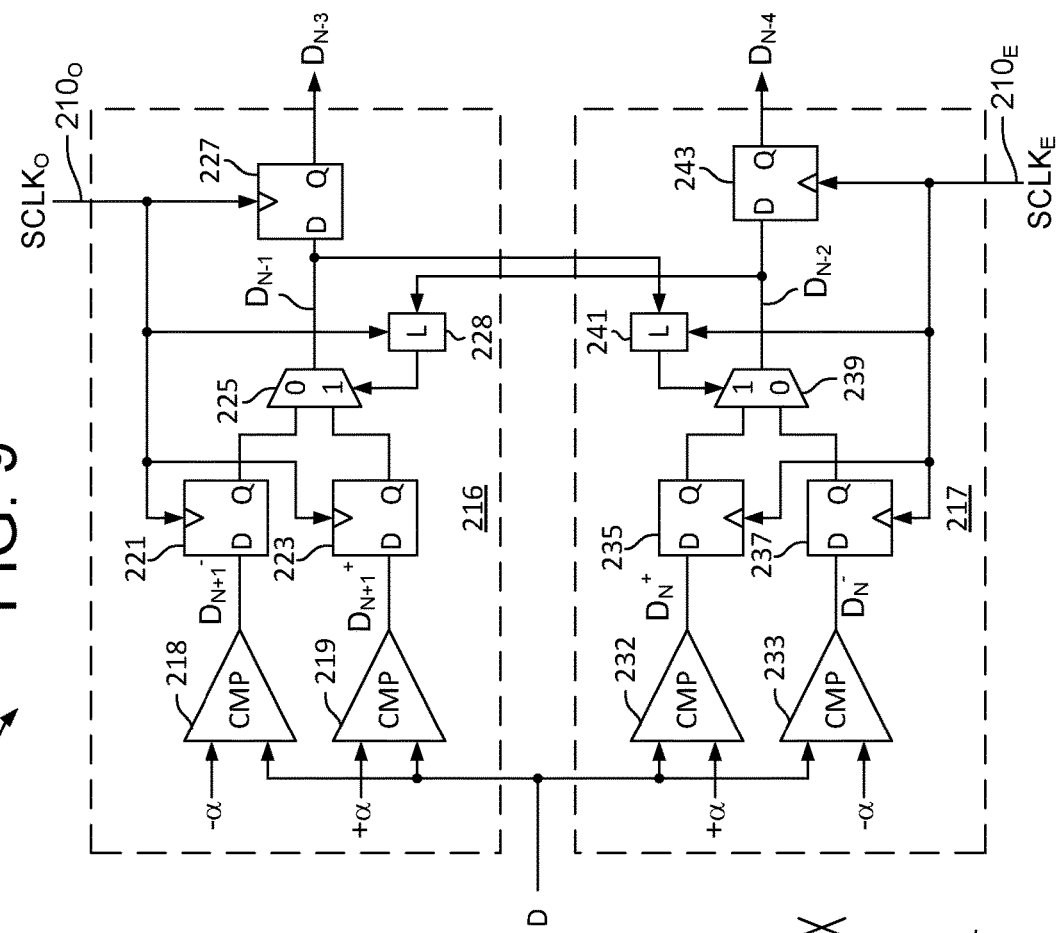
FIG. 9 illustrates a partial response receive circuit for use in a double data rate signaling system.
Figure 10:
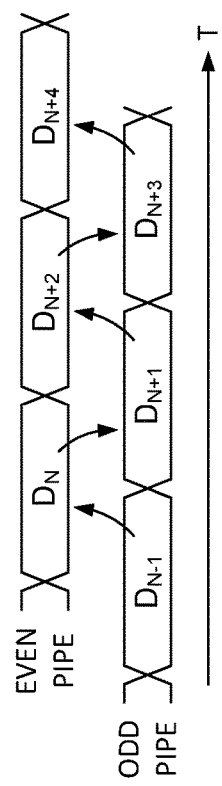
FIG. 10 illustrates even and odd pipelines of sample values generated within the partial response receive circuit of FIG. 9.

FIG. 9 illustrates a partial response receive circuit 215 for use in a double data rate signaling system. The partial response receive circuit 215 includes an odd-phase receive circuit 216 clocked by an odd-phase sampling clock signal $210_O$ ($SCLK_O$), and an even-phase receive circuit 217 clocked by an even-phase sampling clock signal $210_E$ ($SCLK_E$). The odd- and even-phase receive circuits 216, 217 are similar to the partial response receive circuit 200 of FIG. 7, except that, due to the interleaved nature of the samples they generate, the select circuit 225 of the odd-phase receive circuit 216 is controlled by a latched instance of a sample selected by the select circuit 239 in the even-phase receive circuit 217 and, conversely, the select circuit 239 of the even-phase receive circuit 217 is controlled by a latched instance of a sample selected by the select circuit 225 in the odd-phase receive circuit 216. Samples $D_N^+/D_N^-$ are generated by comparators 232 and 233, stored in storage circuits 235 and 237, and then selected by select circuit 239 to form the even-phase pipeline (EVEN PIPE) illustrated in FIG. 10 (the output of the select circuit 239 optionally being buffered in storage circuit 243 in response to the even-phase sampling clock signal $210_E$). Similarly, samples $D_{N+1}^+/D_{N+1}^-$ are generated by comparators 218 and 219, stored in storage circuits 221 and 223, then selected by the select circuit 225 form the odd-phase pipeline (ODD PIPE) illustrated in FIG. 10 (the output of the select circuit 225 optionally being buffered in storage circuit 227 in response to the odd-phase sampling clock signal $210_O$). Thus, when an odd phase sample $D_{N-1}$ is selected by select circuit 225, the $D_{N-1}$ sample is latched within latch element 241 of the even-phase receive circuit (thereby making $D_{N-1}$ available for a full cycle of the even-phase clock signal $210_E$) and thereafter used to select the subsequent even-phase sample $D_N$. The selected even phase sample $D_N$ is then latched within latch element 228 of the odd-phase receiver and thereafter used to select the subsequent odd-phase sample, $D_{N+1}$. For higher data rates, the number of partial-cycle receive circuits (circuits 216 and 217 each being a half-cycle receive circuit) may be increased according to the data rate. For example, in a quad data rate system, a partial-response receiver includes four quarter-cycle receive circuits interconnected such that sample N within a first quarter-phase receive circuit is used to select sample N+1 within a second quarter-phase receive circuit; sample N+1 within the second quarter-phase receive circuit is used to select sample N+2 in a third quarter-phase receive circuit; sample N+2 is used to select sample N+3 in a fourth quarter-phase receive circuit; sample N+3 is used to select sample N+4 in the first quarter phase receiver; and so forth. In the remainder of this description, various partial response receive circuit embodiments are described in the context of a single data rate (SDR) signaling system. Each of the embodiments disclosed may be modified as described in reference to FIGS. 8-10 to support multi-data rate signaling.

Threshold Level Generation

In one embodiment of the invention, a technique referred to herein as embedded scoping is used to determine the ±α threshold levels applied within the comparators of the partial response receive circuit. Embedded scoping involves iteratively receiving a sequence of symbols in a receiver and comparing the received symbol sequence with a local generation of the sequence to confirm error-free reception. With each receive-and-confirm iteration, a threshold voltage used to distinguish between symbol values in the incoming signal is offset from a calibrated level by a progressively larger amount until a symbol in the sequence no longer matches the expected value. The threshold voltage offset at which the failure occurs is referred to herein as a pass/fail offset and represents a measure of the signal level at the sampling instant at which the failure occurred. Thus, by sweeping the threshold voltage through a range of threshold voltages until the pass/fail offsets for each symbol in the symbol sequence have been detected, a sample plot for the incoming signal may be developed. Further, by sweeping the receive clock signal through an incremental sequence of phase offsets, and determining the pass/fail offset at each phase offset, a complete trace of the incoming signal may be generated. Also, the granularity and start stop points of the phase offsets and/or threshold voltage steps may be controlled (e.g., by configuring a programmable circuit or register) to enable the waveform trace to be constrained to selected points of interest in the incoming signal (e.g., ±N° from an intended sampling instant, N representing a sweep angle).

Figure 11:
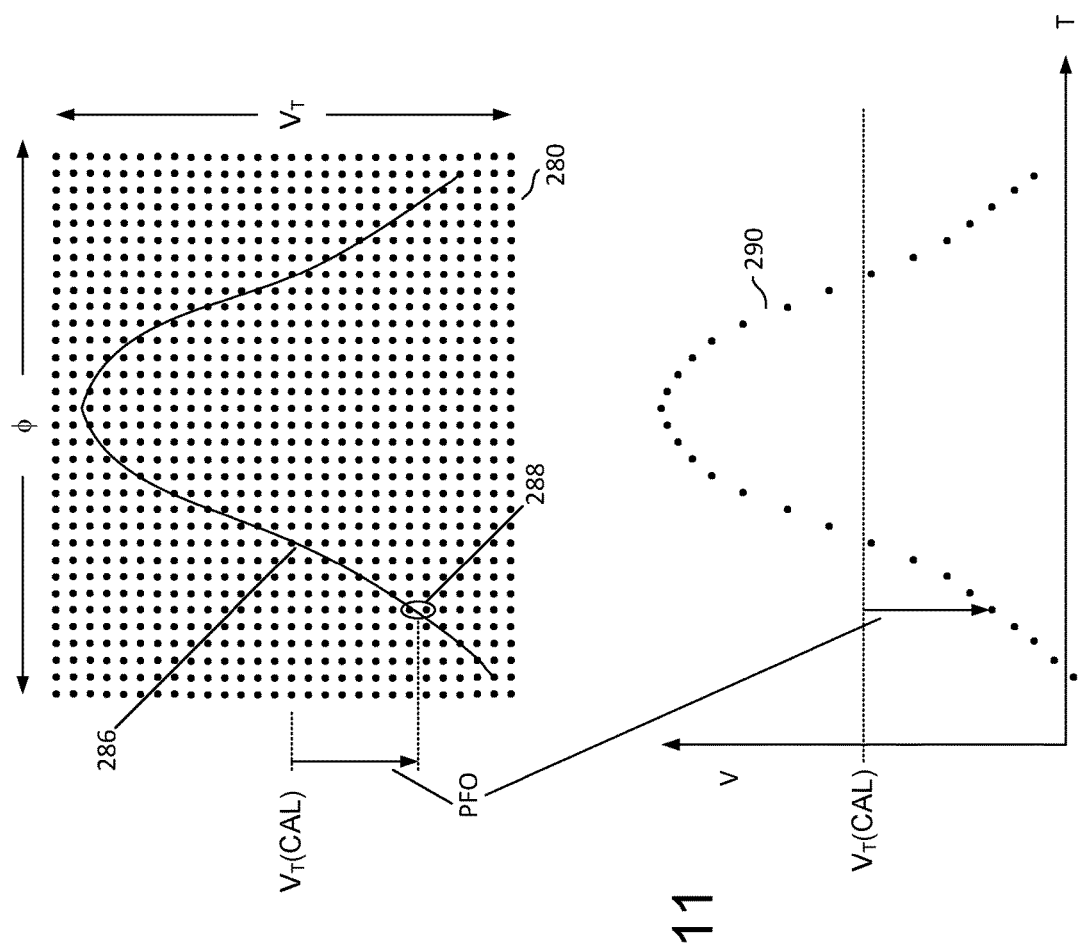
FIG. 11 illustrates the use of embedded scoping to generate a time-based trace of an incoming data signal.

FIG. 11 illustrates the use of embedded scoping to generate a time-based trace 290 of an incoming data signal 286. The range of threshold voltage offsets over which the incoming signal 286 is sampled is indicated by $V_T$, and the range of phase offsets at which the signal is sampled is indicated by φ. Each sample point within the sweep is indicated by a respective dot within a grid of sample points 280. Note that the sweep may be obtained by stepping the voltage threshold through the range of $V_T$ values for each value of), or, alternatively, by stepping the clock phase through the range of φ values for each value of $V_T$.

Still referring to FIG. 11, reference numeral 288 indicates a pair of samples for which a pass/fail condition is detected. A corresponding pass/fail offset (PFO) is determined according to the difference between the calibrated $V_T$ level ($V_T$ (CAL)) and the average of the $V_T$ offsets between the pass and fail samples, and recorded as a measure of the incoming signal. That is, the pass/fail offset may be used to establish a data point within the trace 290 as shown. After sweeping through all the sample points within the grid 280 (which sweep may be repeated numerous times to obtain an average and to discard statistical outliers), a measure of the incoming signal is obtained as illustrated graphically by the trace 290.

Embedded scoping has a number of benefits over traditional signal measurement techniques. First, because the technique is non-invasive (i.e., no probe contact), the electrical characteristics of the system under test are unaltered, thereby yielding potentially more accurate results. Also, the trace is generated from the perspective of the receive circuit itself, meaning that any non-ideal characteristics of the receive circuit are accounted for in the resulting signal trace information. Finally, because all components needed for embedded scoping may be included within a finished signaling system, embedded scoping may be used to perform numerous run-time analyses in addition to partial response measurement including, without limitation, determining the latency and amplitude of reflections and other distortions within the signaling system.

Figure 12:
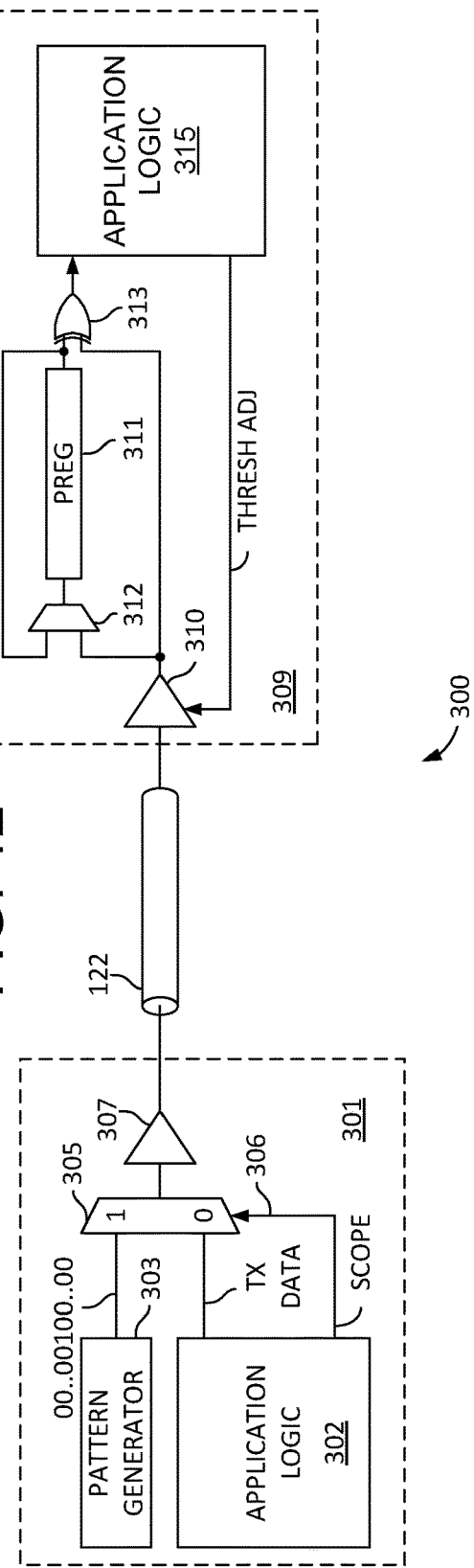
FIG. 12 illustrates a signaling system according to an embodiment of the invention.

FIG. 12 illustrates a signaling system 300 according to an embodiment of the invention. The signaling system 300 includes a transmit device 301 and receive device 309 that employ embedded scoping to determine partial response amplitudes. The transmit device 301 includes a pattern generator 303, data selector 305, equalizing transmitter 307 and application logic 302. The application logic 302 performs the core function of the transmitting device (e.g., signal processing, instruction processing, routing control, or any other function) and provides transmit data (TX DATA) to a first input of the data selector 305. During normal operation, the application logic 302 outputs a logic low scope signal 306 (SCOPE) to the data selector 305 to select the transmit data to be passed to the equalizing transmitter 307 for transmission to the receive device 309 via signal path 122 (which may include or be connected to numerous sources of discontinuity such as connectors, vias, stubs, etc.). During a scoping mode of operation, the application logic 302 drives the scope signal 306 high to enable a scoping mode of operation within the transmit device 301. In the scoping mode, the data selector 305 selects a repeating single-symbol pulse sequence (e.g., a test signal such as: 00100 . . . 00100 . . . 00100 . . . ) generated by the pattern generator 303 to be transmitted to the receive device 309. The receive device 309 includes a partial response receiver 310 to receive the incoming data signal, a pattern register 311 to store a local version of the single-symbol pulse sequence, a multiplexer 312 to enable the pattern register 311 to be switched between load and barrel-shifting modes, a XOR gate 313 to compare the received data sequence with the locally generated sequence, and application logic 315 (or other logic) to generate a threshold voltage adjust signal (THRESH ADJ) to step the threshold voltage used within the partial response receive circuit through their scoping ranges. In on embodiment, the thresholds applied to the multiple comparators of the partial response receive circuit are set to the same nominal starting value and stepped together for purposes of embedded scoping. In an alternative embodiment, only one comparator of the partial response receive circuit is used when scoping mode is enabled. The application logic may additionally generate a clock adjust signal (not shown) to step the sampling clock through a sequence of phase offsets within a cycle of the sampling clock signal. The application logic 315 additionally builds a trace record (i.e., data indicative of the incoming data sequence) based on the output of XOR gate 313.

When the receive device 309 is in a scoping mode of operation, the multiplexer 312 is initially set to load the pattern register 311 with the output of the partial response receiver 310. After a desired sequence of data (e.g., the single-symbol pulse sequence) is shifted into the pattern register 311, the multiplexer 312 is set to enable the barrel-shifting mode of the pattern register 311. That is, the multiplexer 312 selects the output of the pattern register 311 to be fed back to the input of the pattern register 311 so that the contents of the pattern register 311 are continuously rotated through the pattern register 311 (i.e., a barrel shifting operation). By this arrangement, the data sequence loaded into the pattern register 311 is repeatedly output, bit by bit, to a first input of the XOR gate 313. The data sequence received by the partial response receiver 310 is input to a second input of the XOR gate 313 so that the received data sequence is compared, bit by bit, with the data sequence stored within the pattern register 311. By selecting the length of the repeatedly transmitted data sequence to match the storage size of the pattern register 311, the pattern register contents are repeatedly compared with a newly received version of the same data sequence (i.e., putatively the same data sequence). Any reception error will result in a mismatch between the received value and the corresponding value within the pattern register and therefore, when compared by XOR gate 313, will result in an error signal being output from the XOR gate 313 to the application logic 315. The application logic 315 may then record the adjusted threshold voltage (and optionally the clock phase offset) at which the error occurred as a signal level within the waveform trace.

Figure 13:
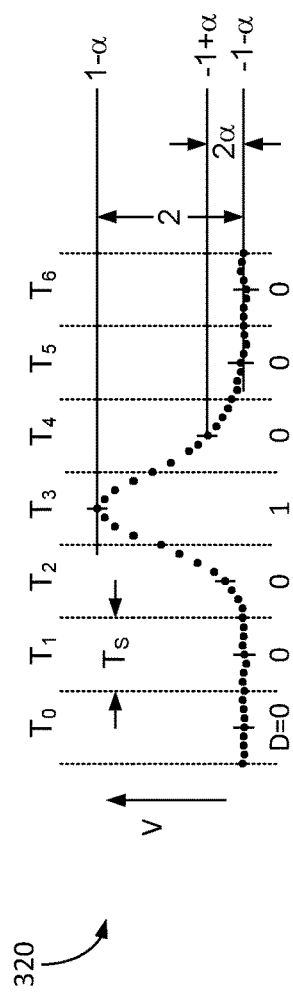
FIG. 13 illustrates a waveform trace of a pulse response captured by an embedded scope within the signaling system of FIG. 12.

FIG. 13 illustrates a sample waveform trace 320 of a pulse response captured by an embedded scope within the signaling system of FIG. 12. As shown, the waveform starts and ends at a steady-state low level which corresponds to the $-1-\alpha$ level discussed in reference to FIGS. 5 and 6. A pulse (i.e., D=1) is received at time T3, and the partial response of the pulse is received at time T4. Due to the preceding zero-valued symbol, the signal level sampled at time T3 corresponds to the $1-\alpha$ level. Similarly, due to the preceding one-valued symbol, the signal level sampled at time T4 corresponds to the $-1+\alpha$ level. The difference between the $-1+\alpha$ level and the $-1-\alpha$ level may be determined by the application logic 315 of FIG. 12 (or other circuitry) and used to determine $\pm\alpha$. That is, $\alpha=((-1+\alpha)-(-1-\alpha))/2$. The normalized signal level, 1, may be used in certain clock recovery operations (discussed below) and may be determined from the pulse level and the steady-state low level (i.e., $1=((1-\alpha)-(-1-\alpha))/2$). Once determined, the a level may be applied to the comparators of the partial response receive circuit to enable partial response operation.

Figure 14:
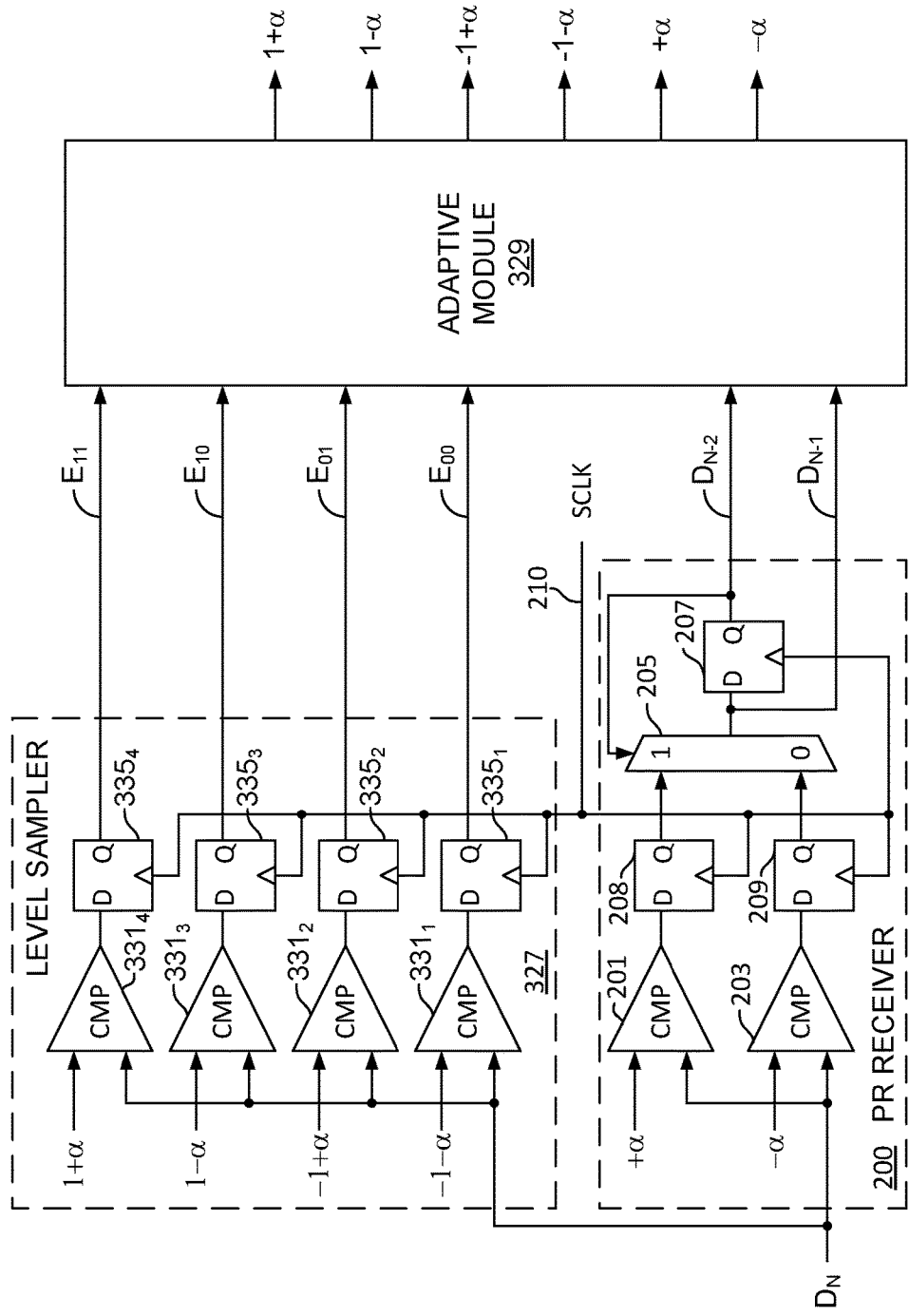
FIG. 14 illustrates a partial response receiver according to an embodiment of the invention that adaptively generates partial response threshold levels.

FIG. 14 illustrates a partial response receiver 325 that includes circuitry for adaptively generating the partial response threshold levels $\pm\alpha$. The partial response receiver 325 includes a partial response receive circuit 200, a level sampler 327, and an adaptive module 329. The partial response receive circuit 200 operates generally as described above in reference to FIG. 7 to generate a pair of sample values based on comparisons (in comparators 201 and 203) of the incoming signal $D_N$ with offset thresholds $\pm\alpha$. The samples are stored in storage elements 208 and 209 as samples $D_{N-1}^+$ and $D_{N-1}^-$ (the '+' and '−' designating the samples as corresponding to relatively positive and negative partial responses). A select circuit 205 selects one of the $D_{N-1}^+$ and $D_{N-1}^-$ samples to be the selected $D_{N-1}$ sample based on the state of the $D_{N-2}$ sample stored in storage circuit 207. As discussed above, in a multi-data rate system, the $D_{N-2}$ sample may be supplied by a counterpart partial response receive circuit clocked by a phase shifted version of the sampling clock signal 210. In either case, single- or multi-data rate, two or more time-adjacent sample values are supplied to (or buffered within) the adaptive module 329. In the embodiment of FIG. 14, sample values $D_{N-2}$ and $D_{N-1}$ are supplied to the adaptive module 329, though higher or lower latency samples may be provided in alternative embodiments.

The level sampler 327 includes four comparators $331_1$-$331_4$ for comparing the signal level of the incoming symbol, $D_N$, with each of the four signal levels that correspond to the bimodal signal distribution of FIG. 5. That is, comparator $331_4$ compares the incoming signal with a threshold level at $1+\alpha$ and generates a corresponding error sample $E_{11}$ according to whether the incoming signal is above or below the $1+\alpha$ level. Similarly, comparators $331_3$, $331_2$ and $331_1$ compare the $D_N$ signal level with threshold levels at $1-\alpha$, $-1+\alpha$ and $-1-\alpha$, respectively, and generate corresponding error samples $E_{10}$, $E_{01}$ and $E_{00}$. Each of the error samples is buffered in a respective storage circuit $335_1$-$335_4$ before being provided to the adaptive module 329. By this arrangement, the error samples arrive at the adaptive module 329 with the same latency as the $D_{N-1}$ sample generated by the partial response receive circuit 200.

The adaptive module 329 responds to the data samples from the partial response receive circuit 200 and the error samples from the level sampler 327 by selectively updating the threshold values supplied to the comparators 201 and 203 within the partial response receive circuit 200 and comparators $331_1$-$331_4$ within the level sampler 327. For example, when the data samples indicate a 11 state (i.e., D[N−1:N−2]=11), the adaptive module 329 increases or decreases the $1+\alpha$ threshold level according to whether the incoming signal level is indicated by error sample $E_{11}$ to be above or below the $1+\alpha$ threshold level. The adaptive module similarly updates the $1-\alpha$, $-1+\alpha$, and $-1-\alpha$ thresholds based on error samples $E_{10}$, $E_{01}$ and $E_{00}$ when the data samples indicate the 10, 01 and 00 states, respectively. As discussed below, the $\pm\alpha$ levels may be derived from the $1+\alpha$, $1-\alpha$, $-1+\alpha$ and $-1-\alpha$ threshold levels, or a subset thereof.

Figure 15:
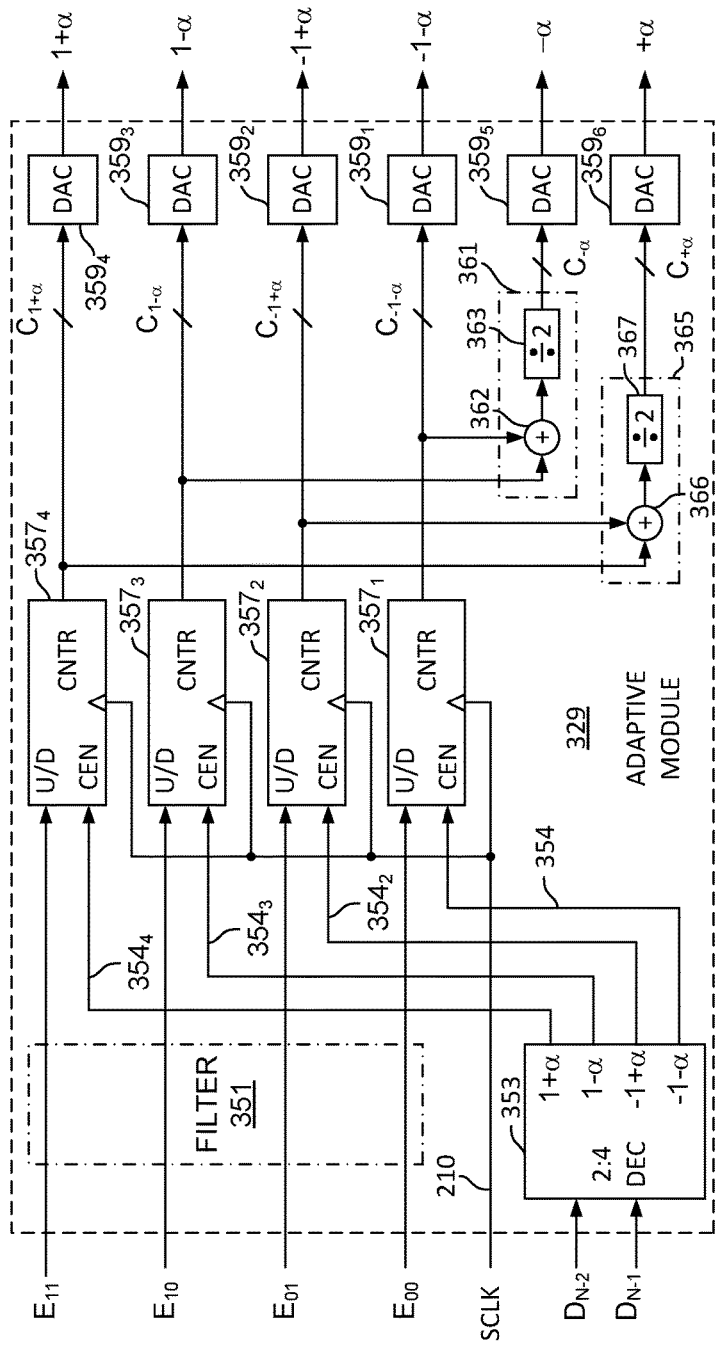
FIG. 15 illustrates a embodiment of the adaptive module of FIG. 14.

FIG. 15 illustrates an embodiment of the adaptive module 329 of FIG. 14. The adaptive module includes a 2:4 decoder 353, up/down counters $357_1$-$357_4$, averaging circuits 361 and 365, digital-to-analog converters (DACs) $359_1$-$359_6$, and, optionally, a filter circuit 351. The 2:4 decoder 353 activates one of four enable signal lines $354_1$-$354_4$ (i.e., asserts an enable signal on the signal line) according to the state of the input data samples $D_{N-1}$ and $D_{N-2}$ (also expressed herein as D[N−1:N−2]). Each of the counters 357 has an up/down input (U/D) coupled to receive a respective one of the four error samples (i.e., $E_{00}$, $E_{01}$, $E_{10}$ and $E_{11}$), a count enable input (CEN) coupled to a respective one of the enable signal lines 354, and a strobe input coupled to receive the sample clock signal 210. By this arrangement, during each cycle of the sample clock signal 210, the counter 357 coupled to the activated enable signal line 354 is incremented or decremented according to the state of the corresponding error sample. Thus, when D[N−2:N−1]=11, counter $357_4$ is incremented if error sample $E_{11}$ indicates that the incoming signal level is above the 1+α threshold level, and decremented if $E_{11}$ indicates that the incoming signal level is below the 1+α threshold level. The count values maintained within counters $357_3$, $357_2$ and $357_1$ are similarly incremented and decremented according to error samples E10, E01 and E00, respectively, when enabled by their respective enable signal lines 354. In one embodiment, the filter circuit 351 is used to filter the incoming error samples, for example, by requiring a predetermined number of same-state error samples to be received within a given time before the corresponding count value is adjusted. Other types of error sample filtering may be applied in alternative embodiments. Also, the filter 351 may be omitted altogether.

The count values maintained within the counters $357_1$-$357_4$ are output as control values to respective DACs $359_1$-$359_4$ to generate the 1+α, 1−α, −1+α and −1−α levels. Thus, the adaptive module 329 operates to selectively update the 1+α, 1−α, −1+α and −1−α threshold levels according to the state of the received data values D[N−1:N−2].

The averaging circuits 361 and 365 generate the ±α threshold levels by averaging the control values output from counters $357_1$-$357_4$. Averaging circuit 365, for example, includes a summing circuit 366 to sum the $C_{1+\alpha}$ and $C_{-1+\alpha}$ control values from counters $357_4$ and $357_2$, respectively, and a divide-by-2 element 367 (which may be achieved without active circuitry by dropping the least significant bit of the sum) to generate a control value $C_\alpha$ that corresponds to the desired α threshold level (i.e., $(C_{1+\alpha}+C_{-1+\alpha})/2=C_\alpha$). Averaging circuit 361 similarly includes a summing circuit 362 to sum the count values $C_{1-\alpha}$ and $C_{-1-\alpha}$ from counters $357_3$ and $357_1$, and a divide-by-2 element 363 to generate control value $C_{-\alpha}$. In one embodiment, each of the control values generated by the counters 357 and the averaging circuits 361, 365 are input to respective DACs $359_1$-$359_6$ to generate the threshold levels used within the comparators of the partial response receive circuit 200 and level sampler 327 of FIG. 14. In an alternative embodiment, each of the comparators within the partial response receive circuit 200 and level sampler 327 include internal DACs and receive respective threshold values in the form of the control values themselves (i.e., $C_\alpha$, $C_{-\alpha}$, $C_{1+\alpha}$, $C_{1-\alpha}$, $C_{-1+\alpha}$, $C_{-1-\alpha}$). Also, in a differential embodiment (and in certain single-ended embodiments), the $C_{+\alpha}$ and $C_{-\alpha}$ values may be complements of one another so that one of the averaging circuits 361 or 365 may be replaced by a multi-bit inverter. Further, the $C_{1+\alpha}$ and $C_{-1-\alpha}$ values may be complements, and the $C_{1-\alpha}$ and $C_{-1+\alpha}$ values may be complements such that two of the comparators within the level sampler 327 of FIG. 14 and two of the counters 357 within the adaptive module 329 (and two of the DACs 359, if used) may be omitted.

Figure 16:
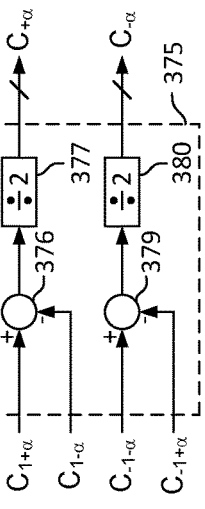
FIG. 16 illustrates an alternative circuit arrangement that may be used in place of the averaging circuits of FIG. 15.

FIG. 16 illustrates an alternative circuit arrangement 375 that may be used in place of the averaging circuits 361 and 365 of FIG. 15. Instead of averaging the $C_{1+\alpha}$ and $C_{-1+\alpha}$ count values to generate the $C_{+\alpha}$ value, $C_{+\alpha}$ is generated by halving the difference between the $C_{1+\alpha}$ and the $C_{1-\alpha}$ control values (i.e., $C_\alpha=((C_{1+\alpha})-(C_{1-\alpha}))/2$). Similarly, the $C_{-\alpha}$ value is generated by halving the difference between the $C_{-1-\alpha}$ and the $C_{-1+\alpha}$ control values. Thus, the circuit of FIG. 16 includes a difference circuit 376 to generate 2α by subtracting the $C_{1-\alpha}$ control value from the $C_{1+\alpha}$ control value, and a divide-by-2 element 377 (which may be implemented by dropping the least significant bit of the difference) to generate $C_\alpha$ by halving the 2α value. Difference circuit 379 and divide-by-2 element 380 are used in a similar manner to generate $C_{-\alpha}$ from count values $C_{-1+\alpha}$ and $C_{-1-\alpha}$ in a corresponding manner.

Differential Comparator

Figure 17:
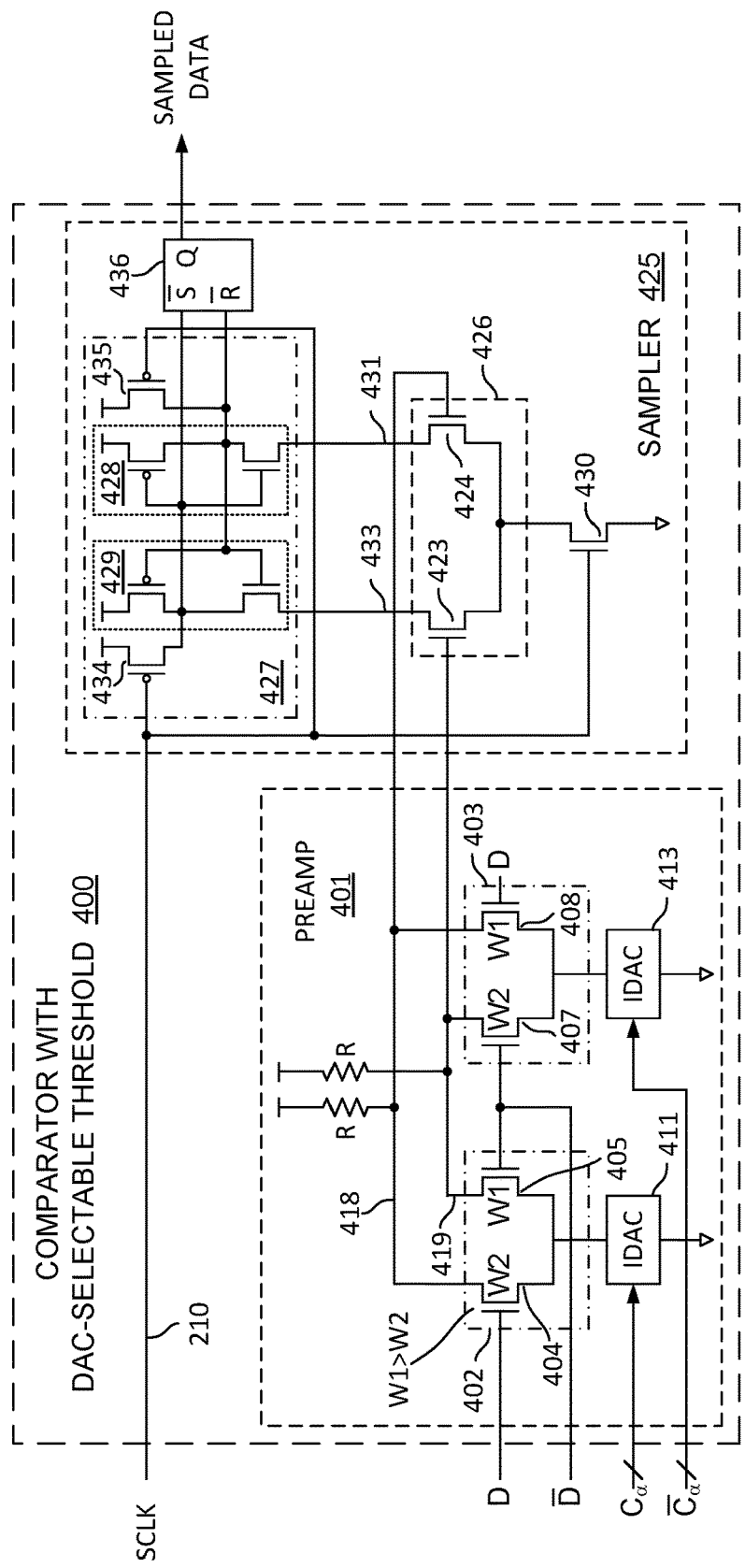
FIG. 17 illustrates a comparator that may be used within the receiver circuits and level sampling circuits of FIGS. 7, 9 and 14.

FIG. 17 illustrates a comparator 400 that may be used within the receiver circuits and level sampling circuits of FIGS. 7, 9 and 14. The comparator 400 includes a preamplifier 401 and a sampling circuit 425. The preamplifier 401 includes a pair of differential amplifiers 402 and 403 each biased by a respective current DAC (IDAC) 411 and 413, and each having first and second output nodes 418 and 419 coupled to a supply voltage via a respective resistive element, R. The resistive elements may be implemented, for example, using diode-configured transistors, biased transistors, resistors, or any other active or passive circuitry for establishing a resistance. Transistors 405 and 404 within differential amplifier 402 have widths W1 and W2, respectively, with W1 being greater than W2. Transistors 408 and 407 within differential amplifier 403 also have respective widths W1 and W2. A differential input signal composed of signal components D and /D is coupled to each of the differential amplifiers 402, 403 such that D is coupled to transistors 404 and 408 and /D is coupled to transistors 405 and 407. By this arrangement, when $C_\alpha$ and /$C_\alpha$ are substantially equal (e.g., in an 8-bit control word, $C_\alpha$=128 and /$C_\alpha$=127), the differential amplifiers 402 and 403 are substantially balanced, operating in effect as a single differential amplifier having component transistors of width W1+W2. Thus, if D is greater than /D, transistors 404 and 408 will collectively sink more current than transistors 405 and 407, thereby causing the voltage on output node 418 to be pulled down (i.e., via the resistive element, R, coupled to the output node 418) more than the voltage on output node 419.

When the preamplifier 401 is balanced (i.e., $C_\alpha$ substantially equal to /$C_\alpha$), the voltages on the preamplifier output nodes 418 and 419 are substantially equal when D and /D are at the common mode potential (i.e., as when D and /D cross one another in transition). Thus, the effective threshold of the preamplifier 401, and therefore the comparator 400 as a whole, occurs at the common mode of D and /D. By contrast, when the preamplifier is imbalanced by increasing $C_\alpha$ relative to /$C_\alpha$, equal values of D and /D result in output node 419 being pulled lower than output node 418, due to the fact that transistor 405 is wider than transistor 404 (and therefore has a greater gain), and that the compensating (balancing) effect of differential amplifier 403 is diminished by the reduced control value /$C_\alpha$. Thus, increasing $C_\alpha$ relative to /$C_\alpha$ increases the effective threshold of the preamplifier above the common mode. By increasing $C_\alpha$ to the point at which the threshold between '0' and '1' signal levels is set to α, a differential comparator having a threshold level at α is achieved. By reversing the connections of the $C_\alpha$ and /$C_\alpha$ values to the current DACs of a counterpart comparator (not shown), a differential comparator having a threshold level at −α is achieved.

The sampling circuit 425 includes a differential amplifier 426 formed by transistors 423 and 424, a sense amplifier 427 formed by back-to-back coupled inverters 428 and 429, and a storage circuit 436 formed by a set-reset flip-flop. The differential amplifier 426 includes control inputs coupled to the output nodes 418 and 419, respectively, of the preamplifier 401, and output nodes 431 and 433 coupled to source terminals of the inverters 428 and 429, respectively. A biasing transistor 430, switchably controlled by the sampling clock signal 210 (or other sample control signal), is coupled between the differential amplifier 426 and a ground reference (or other low voltage reference). The sampling clock signal 210 is additionally coupled to control inputs of positively-doped MOS (PMOS) transistors 434 and 435 which are coupled between a supply voltage (e.g., $V_{DD}$) and output nodes of the inverters 428 and 429. By this arrangement, when the sample clock signal 210 is low, transistor 430 is switched off, and transistors 434 and 435 are switched on to pre-charge the output nodes of the inverters 428 and 429 to the supply voltage. The output nodes of the inverters 428 and 429 are coupled to active-low set and reset inputs, respectively, of the storage circuit 436, so that the content of the storage circuit 436 is maintained through the low half-cycle of the sample clock signal 210. When the sample clock signal 210 goes high, biasing transistor 430 is switched on and draws current through the two transistors 424 and 423 of the differential amplifier 426 in proportion to the voltages developed on the output nodes 418 and 419 of the preamplifier 401. Thus, if the voltage developed on node 419 is higher than the voltage on node 418, the current drawn by biasing transistor 430 will flow primarily through transistor 423. Conversely, if the voltage developed on node 418 is higher than the voltage on 419, the current drawn by biasing transistor will flow primarily through transistor 423. Transistors 434 and 435 are switched off in response to the high-going sample clock signal 210, so that the pre-charged outputs of the inverters 428 and 429 are discharged by currents flowing through transistors 423 and 424. By this operation, if the incoming signal (D) exceeds the common mode voltage, ((D+/D) divided by 2), by more than the +α threshold level (i.e., the incoming signal exceeds the +α threshold level), the current drawn by biasing transistor 430 will flow primarily through transistor 423. Consequently, the output node of inverter 429 will be discharged more rapidly than the output node of inverter 428, driving the output of inverter 429 low and driving the output of inverter 428 high (i.e., the PMOS transistor within inverter 428 is switched on and the NMOS transistor within inverter 428 is switched off). The low output of inverter 429 is applied to the active-low set input of the storage circuit 436, causing the storage circuit 436 to store a logic '1' sampled data value. By contrast, if the incoming signal level does not exceed the +α threshold level, the current drawn by biasing transistor 430 will flow primarily through transistor 424, thereby driving inverter 428 low (and driving inverter 429 high) to store a logic '0' sampled data value within storage circuit 436.

Figure 18:
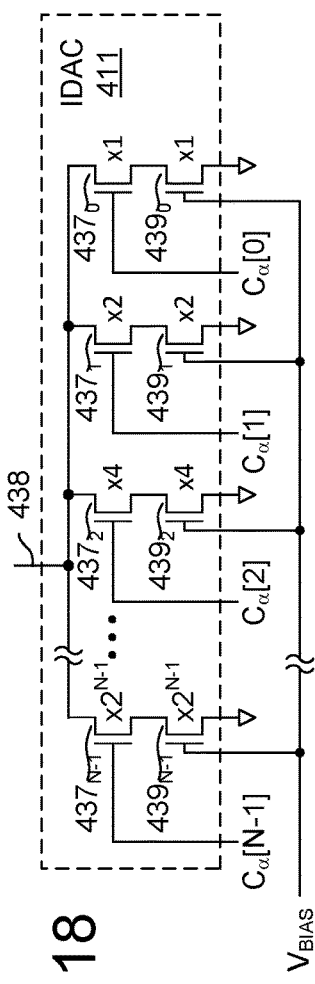
FIG. 18 illustrates an embodiment of the current DAC of FIG. 17.

FIG. 18 illustrates an embodiment of the current DAC 411 of FIG. 17. The current DAC 411 includes control transistors $\mathbf{437_0}$-$\mathbf{437_{N-1}}$ and biasing transistors $\mathbf{439_0}$-$\mathbf{439_{N-1}}$. Each of the control transistors $\mathbf{437_0}$-$\mathbf{437_{N-1}}$ is coupled in series (e.g., source to drain) with a corresponding one of the biasing transistors $\mathbf{439_0}$-$\mathbf{439_{N-1}}$ to form a transistor pair that is coupled between a reference voltage (ground in this example) and an output node 438 (i.e., the node to be connected to the source terminals of the transistors which form the differential amplifier 402). Gate terminals of the control transistors $\mathbf{437_0}$-$\mathbf{437_{N-1}}$ are coupled to receive respective component signals, $C_\alpha[0]$–$C_\alpha[N-1]$, of a multi-bit control value, $C_\alpha$ (or, control value $/C_\alpha$). Each of the control transistors $\mathbf{437_0}$-$\mathbf{437_{N-1}}$ has a binary weighted gain such that a current of $I_{REF} \times 2^i$ (where i represents the $i^{th}$ transistor in the positions 0, 1, 2, ..., N-1) flows through control transistor $\mathbf{437_i}$ when the corresponding control signal component is high. Thus, if all the constituent bits of the control value $C_\alpha[N-1:0]$ are high, then $I_{REF}$ flows through control transistor $\mathbf{437_0}$, $I_{REF} \times 2$ flows through transistor $\mathbf{437_1}$, $I_{REF} \times 4$ flows through control transistor $\mathbf{437_2}$, and so forth to control transistor $\mathbf{437_{N1}}$ which conducts $I_{REF} \times 2^{N-1}$. Accordingly, control transistors $\mathbf{437_0}$-$\mathbf{437_{N-1}}$ are designated x1, x2 ..., $x2^{N-1}$ transistors, respectively. By this arrangement, the control value $C_\alpha[N-1:0]$ may be set to any of $2^N$ values to select bias currents that range from 0 to $I_{REF} \times 2^{N-1}$ in increments of $I_{REF}$. The biasing transistors $\mathbf{439_0}$-$\mathbf{439_{N-1}}$ have gate terminals coupled to receive a bias voltage, VBIAS, that is adjusted as necessary (e.g., by a biasing circuit) to establish or maintain a desired $I_{REF}$.

In one embodiment, the relative gains (i.e., transconductance values) of the various transistors used to implement the current DAC 411 (and therefore drive strengths of the sub-drivers) are established by adjusting the width-length ratio (i.e., W/L) of individual control transistors 437 and/or biasing transistors 439. For example, the width-length ratio of the x2 control transistor $\mathbf{437_1}$ is twice the width-length ratio of the x1 control transistor $\mathbf{437_0}$, the width-length ratio of the x4 control transistor $\mathbf{437_2}$ is twice the width-length ratio of the x2 control transistor $\mathbf{437_1}$, and so forth. The biasing transistors 439 may have similar gain ratios relative to one another (e.g., x1, x2, x4, $x2^{N-1}$ as shown in FIG. 18). Other techniques for adjusting the relative gains of the control transistors 437 and biasing transistors 439 may be used in alternative embodiments. Also, weightings other than binary weightings may be used. For example, in one embodiment, each of the control transistors 437 has an equal gain to each of the other control transistors 437 such that the current drawn by the current DAC 411 is proportional to the number of logic '1' bits in the control value, $C_\alpha$.

Figure 19:
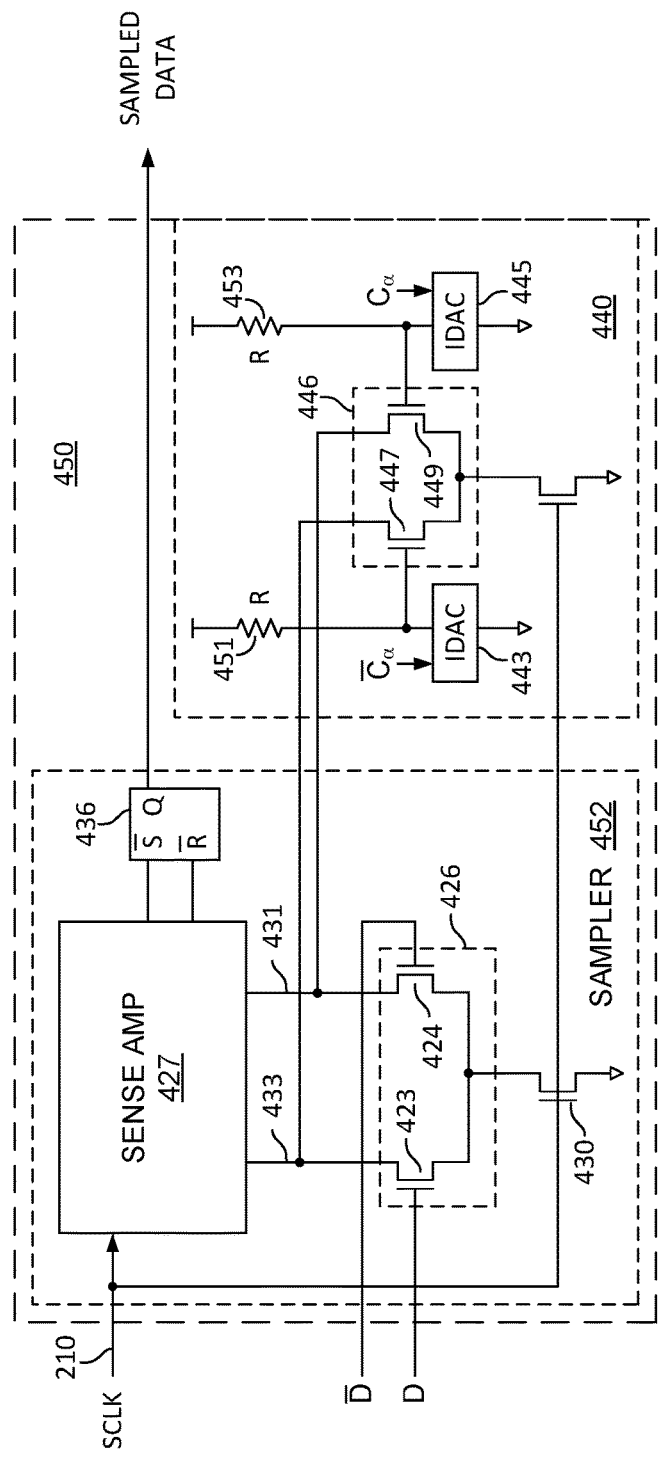
FIG. 19 illustrates an alternative comparator embodiment that may be used within the receiver circuits and level sampling circuits of FIGS. 7, 9 and 14.

FIG. 19 illustrates an alternative embodiment of a differential comparator 450 that may be used to implement the comparators depicted in FIGS. 7, 9 and 14. The comparator 450 includes a sampling circuit 452 and an offset control circuit 440. The sampling circuit 452 is implemented in generally the same manner as the sampling circuit 425 of FIG. 17 (and includes differential amplifier 426, sense amplifier 427, biasing transistor 430, and storage circuit 436), except that the input signal lines carrying D and /D are coupled directly to the control terminals of transistors 423 and 424, respectively. The offset control circuit 440 includes a differential amplifier 446 having output nodes coupled to nodes 431 and 433 of the sampling circuit 452. Control terminals of the transistors 447 and 449 of the differential amplifier 446 are biased by respective voltage DACs (e.g., implemented by current DACs 443 and 445 coupled to respective resistive pull-up elements 451 and 453) controlled by $C_\alpha$ and $/C_\alpha$, respectively. By this arrangement, when the sample clock signal goes high the current through output node 433 of the sampling circuit 452 is a sum of the currents drawn by transistor 423 of the sampling circuit 452 and transistor 447 of the offset control circuit 440. Similarly, the current through node 431 of the sampling circuit 452 is a sum of the currents drawn by transistor 424 of the sampling circuit 452 and transistor 449 of the offset control circuit 440. As discussed above in reference to FIG. 17, when the current through node 431 exceeds the current through node 433, a logic '1' is stored within storage circuit 436 and, conversely, when the current through node 433 exceeds the current through node 431, a logic '0' is stored within storage circuit 436.

When the DAC control values $C_\alpha$ and $/C_\alpha$ are substantially the same, the comparator 450 is balanced and the effective threshold occurs at the common mode of the D and /D signal levels. That is, if D exceeds the common mode voltage, $V_{CM}$=((D+/D) divided by 2), the current through node 433 exceeds the current through node 431, causing a logic '1' to be captured as the sampled data value. As $C_\alpha$ is increased and $/C_\alpha$ decreased, the effective threshold of the differential amplifier is increased such that D must be higher than /D by an amount necessary to overcome the additional current drawn by transistor 449 of the offset control circuit. Thus, by increasing $C_\alpha$ and decreasing $/C_\alpha$, the effective threshold of the sampling circuit may be set to the partial response level, a. That is, a logic '1' is output as the sampled data value if the difference between the D exceeds the common mode voltage, $V_{CM}$ by more than α, and a logic '0' is output otherwise. A counterpart comparator having a −α threshold may be provided by switching the $C_\alpha$ and $/C_\alpha$ inputs to the DACs 443 and 445.

Threshold Level Generator with Single Level-Adapting Comparator

Figure 20:
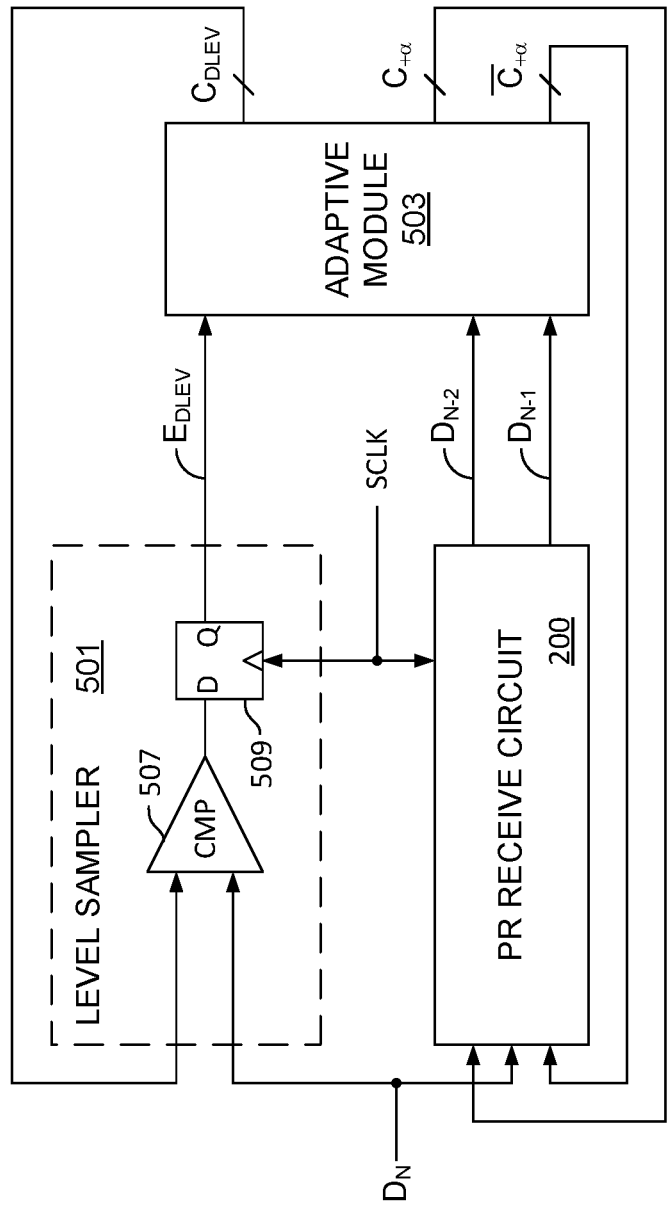
FIG. 20 illustrates a partial response receiver according to another alternative embodiment of the invention.

FIG. 20 illustrates a partial response receiver 500 according to another alternative embodiment. The partial response receiver 500 includes a partial response receive circuit 200 that operates generally as described in reference to FIGS. 7 and 14, a level sampler 501, and an adaptive module 503. In contrast to the level sampler 327 of FIG. 14, the level sampler 501 includes a single comparator 507 that generates an error sample, $E_{DLEV}$, according to whether the incoming signal exceeds or is below a data level threshold generated by the adaptive module 503. In the embodiment of FIG. 20, the data level threshold is established by a multi-bit control value, $C_{DLEV}$, generated by the adaptive module. In alternative embodiments, the data level threshold may be established by an analog voltage or current generated by the adaptive module 503. The error sample may be buffered in one or more storage circuits 509 before being forwarded to the adaptive module 503, thereby aligning the latency of the error sample with data samples generated by the partial response receive circuit 200.

The adaptive module 503 receives the error sample from the level sampler 501 and data samples $D_{N-1}$ and $D_{N-2}$ from the partial response receive circuit 200 and, in response, generates control values, $C_\alpha$ and $/C_\alpha$, to establish the ±α levels within the partial response receive circuit 200, and the control value, $C_{DLEV}$, to establish the data level threshold within the level sampler 501. In one embodiment, the adaptive module 503 initially updates the $C_{DLEV}$ value upon detecting reception of the 1+α data pattern (i.e., D[N−1:N−2]=11) until the comparator 507 indicates that the data level threshold matches the 1+α data level. Thereafter, the adaptive module 503 updates the $C_{DLEV}$ value in response to the 1−α data pattern (10) until the $D_{LEV}$ threshold matches the 1−α data level. The control value, Cα, may be generated, for example, by halving the difference between the two $C_{DLEV}$ values (i.e., $C_{1+\alpha}$ and $C_{1-\alpha}$), and the /Cα control value may be generated by complementing the $C_\alpha$ value.

Figure 21:
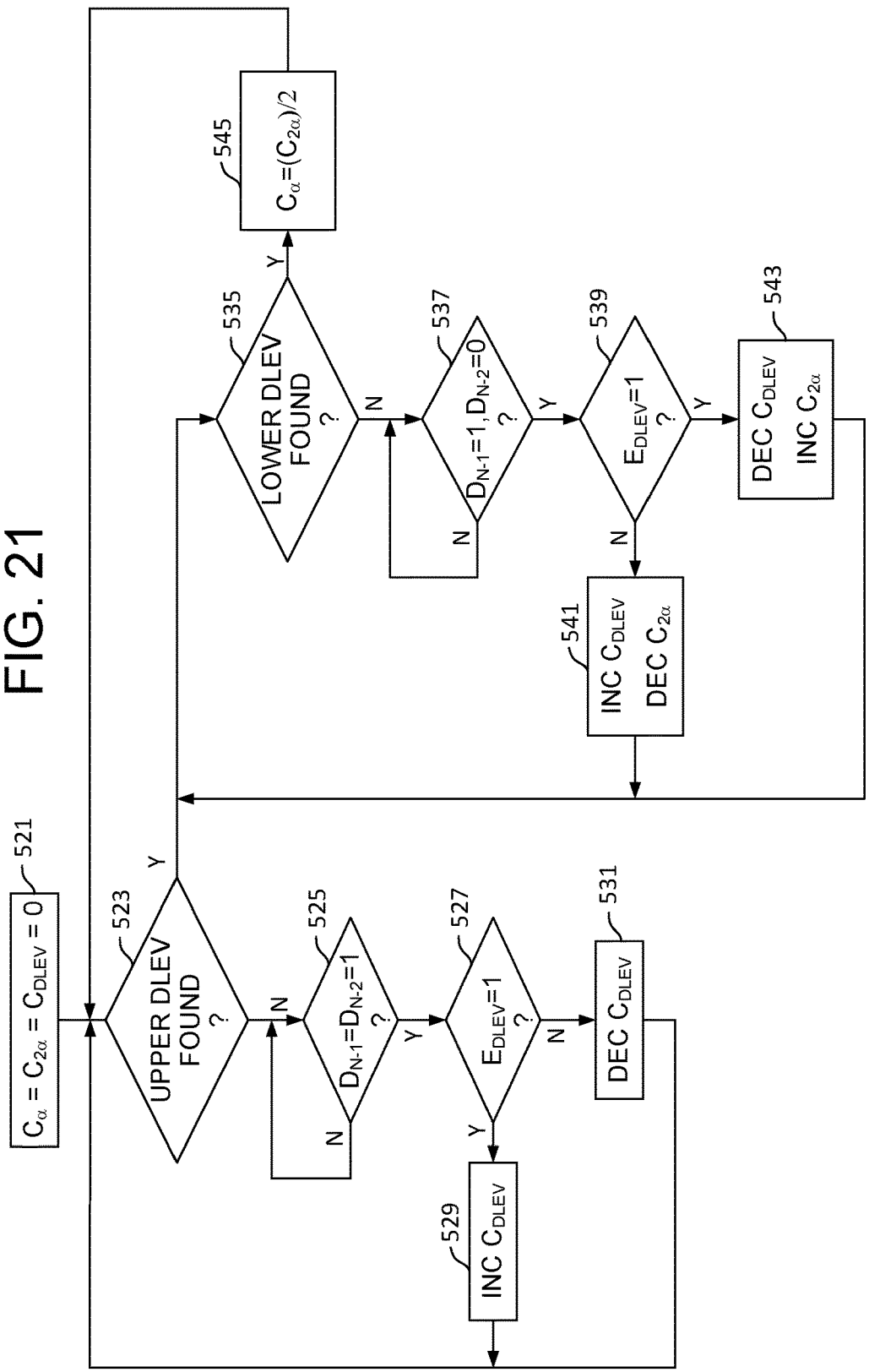
FIG. 21 illustrates the operation of the adaptive module of FIG. 20 according an embodiment of the invention.

FIG. 21 illustrates the operation of the adaptive module 503 of FIG. 20 according one embodiment. Initially, at block 521, the control values, $C_\alpha$ and $C_{DLEV}$, and an internally maintained control value, $C_{2\alpha}$, are each set to a nominal zero value. In one embodiment, the nominal zero value corresponds to a DAC midpoint value. For example, in an 8-bit DAC, a midpoint value of 1000 0000b (the 'b' indicating binary notation) or 128 decimal may be used as the nominal zero value. The $C_{-\alpha}$ value may be generated by subtracting the $C_\alpha$ value from the full-scale DAC value. Thus, in the eight-bit example, when $C_{+\alpha}$=128, $C_{-\alpha}$=$(2^8-1)-128$=127. It will be appreciated that this result may be obtained by complementing $C_\alpha$ (i.e., $/C_\alpha$=$C_{-\alpha}$).

At decision block 523, a history of increment and decrement operations applied to $C_{DLEV}$ value is evaluated to determine whether the threshold level that corresponds to the 1+α signal level has been reached (i.e., UPPER DLEV FOUND). In one embodiment, if, over the last N updates to the $C_{DLEV}$ value, the difference between the number of increment operations and the number of decrement operations is less than a predetermined value, the data level threshold is deemed to be dithering about the 1+α signal level and the upper data level threshold is therefore considered found. If the upper data level threshold has not been found, then the sample values generated by the partial response receive circuit (D[N−1:N−2]) are evaluated in decision block 525 to determine whether a signal level at the 1+α level has been received. If so, the error sample generated by the level sampler, $E_{DLEV}$, is evaluated in decision block 527 to determine whether the incoming signal level is greater than or less than the threshold level established by the present value of $C_{DLEV}$. If the error sample is a '1', the incoming signal level is greater than the threshold level, and the $C_{DLEV}$ value is incremented at 529 to increase the data level threshold. If the error sample is a '0', the signal level is less than the data level threshold and the $C_{DLEV}$ value is decremented at 531 to decrease the data level threshold. As discussed above in reference to FIG. 15, some level of filtering may be applied before incrementing or decrementing the $C_{DLEV}$ value. After the $C_{DLEV}$ value has been incremented or decremented (i.e., in block 529 or 531), the $C_{DLEV}$ increment/decrement history is evaluated again at decision block 523 to determine whether the upper data level threshold has been found.

Returning to decision block 525, if D[N−1:N−2] is not equal to '11', the error sample, $E_{DLEV}$, is not evaluated and the operation at 525 is repeated for a subsequent set of data samples. Thus, in the level-adapting loop formed by blocks 523-531, the adaptive module selectively updates the $C_{DLEV}$ value, and therefore the data level threshold according to the state of the data samples generated by the partial response receive circuit (i.e., updates the $C_{DLEV}$ value in response to detection of the 1+α sample pattern).

If, at decision block 523, the upper data level is deemed to be found, the history of increment and decrement operations is cleared and a second level adapting loop is begun at decision block 535. At decision block 535, the history of increment and decrement operations is evaluated to determine whether a data level threshold corresponding to the 1−α data level has been found (i.e., LOWER DLEV FOUND). In one embodiment, if, over the last N updates to the $C_{DLEV}$ value, the difference between the number of increment operations and the number of decrement operations is less than a predetermined value, the data level threshold is deemed to be dithering about the 1−α signal level and the lower data level threshold is therefore considered found. If the lower data level threshold has not been found, then the sample values generated by the partial response receive circuit, D[N−1:N−2], are evaluated in decision block 537 to determine whether a signal level at the 1−α level has been received. If not, decision block 537 is repeatedly entered for subsequent sample value pairs until a signal level at the 1−α level has been received. When data samples that correspond to the 1−α level are detected, the error sample generated by the level sampling circuit, $E_{DLEV}$, is evaluated at decision block 539 to determine whether the incoming signal level is above or below the data threshold level established by the present value of $C_{DLEV}$. If the error sample is a '0', as it will be initially, the signal level is below the data threshold level, and the $C_{DLEV}$ value is decremented at 543 to decrease the DLEV threshold level, and the $C_{2\alpha}$ control value is incremented to track the difference between the upper and lower data level thresholds. If the error sample is determined to be a '1' at decision block 537, then $C_{DLEV}$ is incremented and $C_{2\alpha}$ decremented at block 541. By this arrangement, when the data level threshold reaches the 1−α data level, the control value, $C_{2\alpha}$, will be representative of twice the +α threshold level. Accordingly, at block 545, the $C_\alpha$ value is generated by dividing $C_{2\alpha}$ by 2 (e.g., by right shifting or otherwise dropping the least significant bit of $C_{2\alpha}$). The $C_{-\alpha}$ value may be generated by complementing the $C_\alpha$ value. Thereafter, the process is repeated starting at decision block 523. Alternatively, an updated $C_{2\alpha}$ value may be generated by counting the return increments from the lower data level threshold to the upper data level threshold, and another updated value of $C_{2\alpha}$ generated on a subsequent return to the lower data level threshold, and so forth. The $C_\alpha$ value may be updated after each regeneration of the $C_{2\alpha}$ value. Also, rather than finding the 1+α and 1−α data levels, the 1+α and −1+α data levels may be determined, and the corresponding data level control values averaged to generate the $C_\alpha$ value.

Dual Mode Receiver

Figure 22:
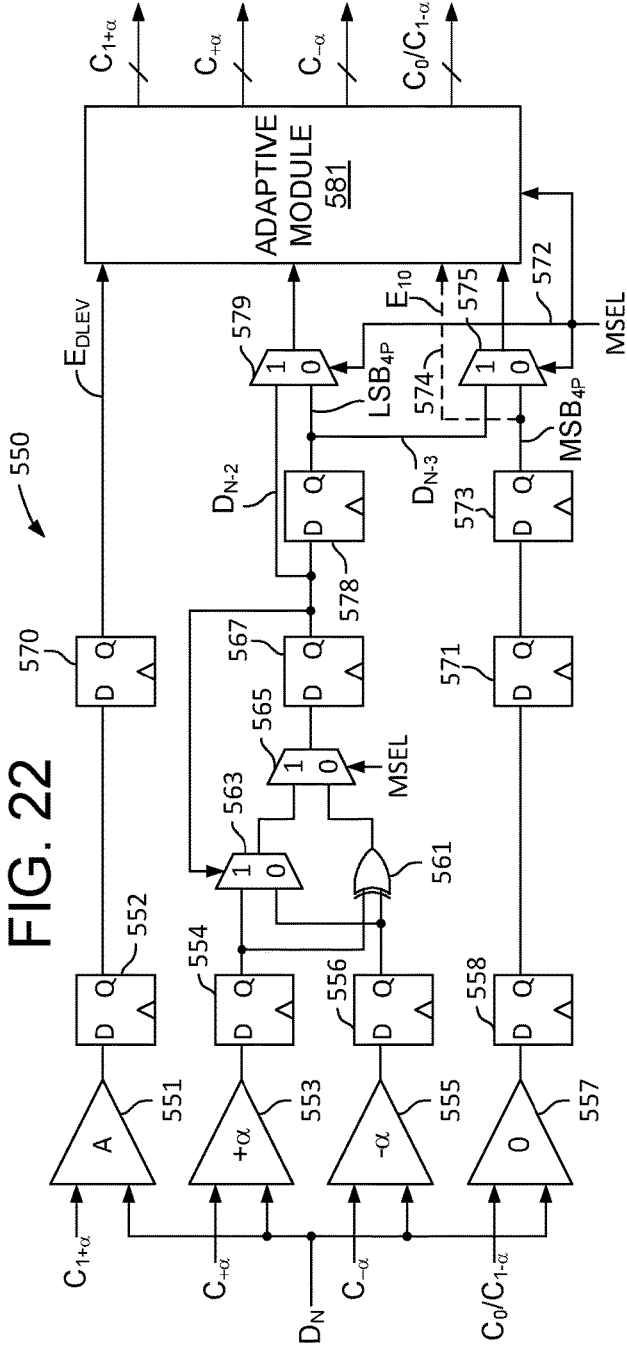
FIG. 22 illustrates an embodiment of a dual mode receiver that may be operated in either a multi-level signaling mode or a partial response mode.

FIG. 22 illustrates an embodiment of a dual mode receiver 550 that may be operated in either a multi-level signaling mode or a partial response mode. When a mode select signal 572 (MSEL) is in a first state (e.g., a logic low state), a two-bit per symbol, multi-level signaling mode is selected. In one embodiment, illustrated in FIG. 23, the signal level of each incoming symbol falls into one of four voltage ranges distinguished by three threshold levels. The four voltage ranges are designated 10, 11, 01 and 00 in FIG. 23 according to the pair of data bits represented at each level. Because each symbol constitutes a pulse having one of four possible amplitudes, the incoming multi-level signal is referred to herein as a 4-PAM (Pulse Amplitude Modulation) signal. Different PAM levels (e.g., 8-PAM, 10-PAM, etc.) may be used in alternative embodiments.

Figure 23:
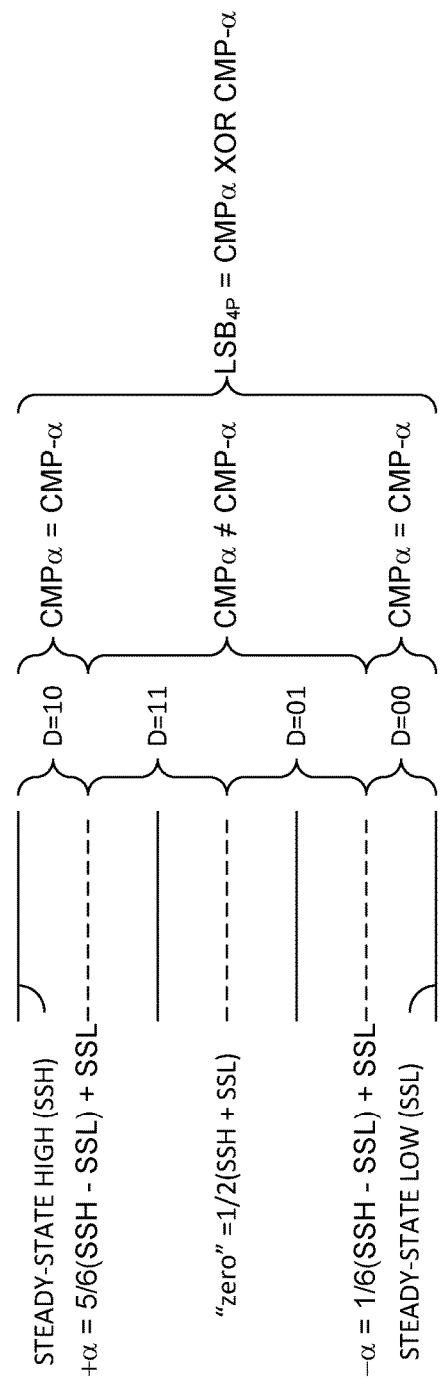
FIG. 23 illustrates a multi-level signaling protocol used within dual mode receiver of FIG. 22.

In the multi-level signaling mode, comparator 557 compares the incoming signal with a midlevel threshold (referred to herein as the zero threshold) to determine the state of the most significant bit (MSB) of the symbol. In the embodiment of FIGS. 22 and 23, the MSB is resolved to be a '1' if the signal level exceeds the zero threshold, and a '0' if the signal level does not exceed the zero threshold. Comparators 553 and 555 compare the incoming signal with threshold levels +α and −α, respectively. For example, in a 4-PAM signal mode, the +α threshold level is set to the steady-state low level plus 5/6 of the difference between the steady-state high and low levels, and the −α threshold is set to the steady-state low level plus 1/6 of the difference between the steady-state high and low levels. Referring to FIG. 23, if the incoming signal level exceeds the +α threshold level, both comparators 553 and 555 generate a logic high sample value, and if the signal level is below the −α threshold level, both comparators 553 and 555 generate a logic low sample value. By contrast, if the incoming signal level is between the +α and −α threshold levels, the comparators 553 and 555 generate outputs having different states. Thus, by assigning the least significant bit (LSB) of the incoming symbol to be a logic '0' in the case of a signal level above the +α threshold level or below the −α threshold level, and a logic '1' in the case of a signal level between the +α and −α thresholds, the LSB may be generated by exclusive ORing the sample values generated by the comparators 553 and 555. Accordingly, exclusive OR gate 561 is coupled to receive the sample values generated by the comparators 553 and 555 (i.e., after the sample values are buffered in storage circuits 554 and 556), and outputs the LSB to a first port of select circuit 565. When the mode select signal selects the 4-PAM mode of the dual-mode receiver, the LSB is selected to be passed to next stage storage circuits 567 and 578, and ultimately is selected by select circuit 579 to be provided to the adaptive module 581. Thus, in 4-PAM mode, the adaptive module 581 receives an LSB and MSB (the MSB bit being stored in succession in storage circuits 558, 571 and 573 for latency alignment with the LSB) for each set of sample values generated by the comparators 553, 555, and 557.

It should be noted that the threshold levels and data signal levels described in reference to FIG. 23 may be used in both differential and single-ended signaling systems. In the case of single-ended signaling systems, the voltage levels of the thresholds and data signals are expressed as an offset from a common, substantially fixed reference voltage, such as a ground reference. In differential signaling systems, the data signals and thresholds are each represented by differential signal pair, with the voltage level of the data signal or threshold being the voltage difference between the two differential signals (e.g., subtracting the voltage level of one signal from the other).

Still referring to the 4-PAM mode of the dual mode receiver 550, the comparator 551 generates an error sample $E_{DLEV}$ that is buffered within storage circuits 552 and 570, then provided to the adaptive module 581. In one embodiment, the adaptive module generates the 4-PAM mode threshold level control values $C_0$, $C_{+\alpha}$ and $C_{-\alpha}$ (i.e., the control values supplied to comparators 557, 553, 555, respectively) by determining the data signal level at MSB/LSB=11, and then the signal level at MSB/LSB=00. For example, the $C_{+\alpha}$ value is offset from the 00 signal level by two-thirds of the difference between the 11 and 00 signal levels, $C_0$ is set to the midpoint between the 11 and 00 signal levels, and $C_{-\alpha}$ is offset from the 00 signal level by one-third of the difference between the 11 and 00 signal levels. As with the adaptive module described in reference to FIG. 14, the error sample generated by the comparator 551 may be filtered to obtain the steady state 11 signal level and the steady state 00 signal level.

Still referring to FIG. 22, when the mode select signal 572 is high, the dual mode receiver 550 is switched to the partial response mode. In the partial response mode, the comparators 553 and 55 are used to compare the incoming data signal against the partial response threshold levels +α and −α, respectively. The samples values generated by the comparators 553 and 555 are buffered in storage circuits 554 and 556, respectively, then provided to select circuit 563 which selects one of the samples according to the state of the previously received sample. That is, one of the $D_{N-1}$ samples stored in storage circuits 554 and 556 is selected to be stored in storage circuit 567 according to the $D_{N-2}$ sample previously stored in the storage circuit 567. The $D_{N-2}$ sample is stored in the storage circuit 578 to generate the $D_{N-3}$ sample value. During a given symbol time, both the $D_{N-2}$ and $D_{N-3}$ samples are provided to the adaptive module 581 via select circuits 579 and 575, respectively. Thus, in 4-PAM mode, the adaptive module 581 receives the MSB/LSB pair for each incoming 4-PAM symbol, and in partial response mode, the adaptive module 581 receives the D[N−2:N−3] sample values that represent one of the four states of the bimodal signal illustrated in FIG. 4.

Still referring to FIG. 22, in partial response mode, the comparator 551 and adaptive module 581 operate to generate the +α and −α levels in the manner described in reference to FIGS. 20 and 21. Alternatively, because the MSB comparator 557 is not otherwise used in the partial response mode, the comparator 557 may be used to determine the level of the 1−α partial response state, thereby enabling both the 1+α and 1−α signal levels to be determined simultaneously. The ±α levels may then be generated based on the 1+α and the 1−α signal levels (i.e., $C_\alpha = ((C_{1+\alpha})-(C_{1-\alpha}))/2$, and $C_{-\alpha}=/C\alpha$). In another alternative embodiment, the MSB comparator may be used to determine the −1+α signal level, thereby enabling ±α to be determined by averaging the 1+α and −1+α signal levels. The error signal generated by the MSB comparator, $E_{10}$ (or $E_{01}$) is illustrated by dashed line 574 to indicate its optional nature.

Reflecting on the dual mode receiver 550 of FIG. 22, it can be seen that much of the circuitry provided for 4-PAM operation (e.g., the four comparators (551, 553, 555 and 557), storage circuits (552, 554, 556, 558, 567, 570, 571, 578 and 573) and adaptive module 581) is re-used in the 2-PAM partial response mode, thereby providing partial response operation with relatively little additional hardware overhead. The mode select signal 572 may be provided from an external source or from a configuration control circuit within the integrated device that includes the dual mode receiver 550. In one embodiment the configuration control circuit is a configuration register that may be programmed by one or more other integrated circuits within a system (e.g., a host processor or similar control device) to establish the mode of the dual mode receiver 550. The configuration control circuit may also be a non-volatile control circuit such as a non-volatile memory, fusible circuit or similar circuit that may be programmed with a mode select value. In yet other embodiments, the configuration control circuit may dynamically change the state of the mode select signal in response to detecting selected system conditions (e.g., detection of threshold error rate when in one operating mode or the other).

Clock Recovery

Figure 24:
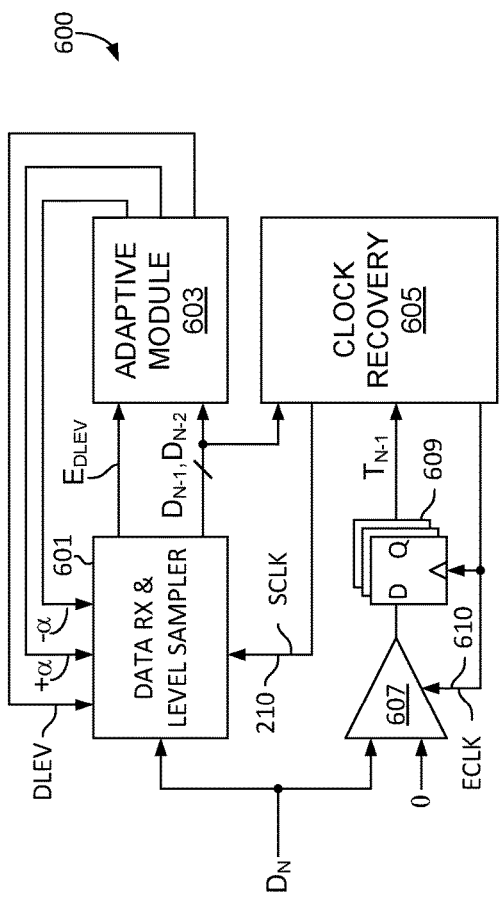
FIG. 24 illustrates a partial response receiver having a clock data recovery function according to an embodiment of the invention.

FIG. 24 illustrates an embodiment of a partial response receiver 600 that performs a clock data recovery (CDR) function. That is, the partial response receiver 600 recovers both data and clocking information from the incoming data signal, $D_N$. The partial response receiver 600 includes a data receive and level sampling circuit 601, adaptive module 603, clock recovery circuit 605, edge-sampling comparator 607, and one or more storage circuits 609. The data receive and level sampling circuit 601 operates as described above in reference to FIGS. 14 and 20 to generate one or more error samples, $E_{DLEV}$, and data samples D[N−1:N−2]. The data receive and level sampling circuit 601 may also be operable in a multi-PAM mode as described in reference to FIG. 22. The adaptive module 603 generates one or more threshold control values that are supplied to the data receive and level sampling circuit 601, including one or more data level control values, $C_{DLEV}$, and partial response control values, $C_{+\alpha}$ and $C_{-\alpha}$. The control values are used to establish threshold values in the partial response compare circuits (i.e., the ±α comparators) and one or more level adapting comparators as discussed above.

The clock recovery circuit 605 generates a sampling clock signal 210 (SCLK) and edge clock signal 610 (ECLK) in response to a transition sample, $T_{N-1}$, generated by the edge-sampling comparator 607 and the data and error samples generated by the data receive and level sampling circuit 601 (i.e., $E_{DLEV}$ and D[N−1:N−2]). The sampling clock signal 210 is used to time the operation of comparators and storage circuits within the data receive and level sampling circuit 601 and, at least in one embodiment, is phase aligned with midpoints in the incoming data eyes (i.e., midpoint of data valid intervals in the incoming data signal, $D_N$). In an alternative embodiment, the sampling clock signal 210 may be offset from the midpoints in the incoming data eyes, for example, to accommodate asymmetric setup and hold time requirements in the comparators or other circuitry in the data receive and level sampling circuit 601. Note that while only a single sampling clock signal 210 is shown, multiple sampling clocks may be generated by the clock recovery circuit to enable receipt of multi-data rate signals. For example, in a double data rate system, the clock recovery circuit may generate SCLK and /SCLK to enable capture of data and signal level samples in both odd and even phases of the sampling clock signal 210.

The clock recovery circuit 605 adjusts the phase of the edge clock signal 610 to maintain phase alignment between the edge clock signal 610 and transition points between incoming data eyes (i.e., the edge clock signal 610 is edge aligned with data valid intervals in the incoming data signal). The edge clock signal 610 is supplied to the edge-sampling comparator 607 where it is used to time the sampling of transitions in the incoming data signal, and to one or more storage circuits 609 provided to latency-align the transition sample, $T_{N-1}$, with the data sample, $D_{N-1}$. In the case of a low-to-high data signal transition, a logic '1' transition sample (i.e., $T_{N-1}=1$) indicates that the edge clock transition occurred after the transition in the data signal and therefore that the edge clock signal 610 lags the data signal transition. Conversely, a logic '0' transition sample indicates that the edge clock transition occurred prior to the low-to-high data signal transition and therefore that the edge clock signal 610 leads the data signal transition. The transition samples from edge-sampling comparator 607 and data samples from the data receive and level sampling circuit 601 are used within the clock recovery circuit 605 to adjust the phase of the edge clock signal 610 as necessary to maintain alignment between the edge clock signal 610 and transitions in the incoming data signal. In one embodiment, the sampling clock signal 210 is maintained at a substantially constant phase offset from the edge clock signal 610 such that phase alignment between the edge clock signal 610 and data signal transitions yields a desired phase alignment between the sampling clock signal 210 and midpoints in the incoming data eyes.

Figure 25:
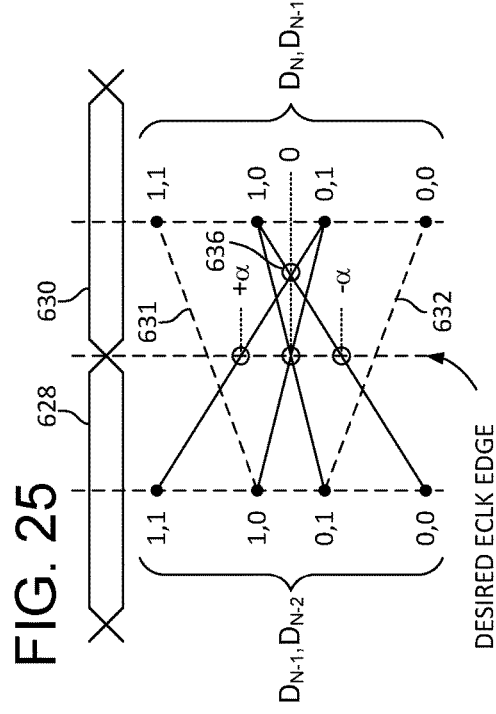
FIG. 25 illustrates a number of possible data signal transitions when the incoming data signal has the bimodal distribution shown in FIG. 4.

FIG. 25 illustrates a number of possible data signal transitions when the incoming data signal has the bimodal distribution shown in FIG. 5. That is, if the incoming data signal has one of the four bimodal signal levels corresponding to the partial response states 11, 10, 01, 00, then the signal may transition from either the 11 or 10 level to the 01 level (i.e., D[N−1:N−2]=11 or 10 and D[N:N−1]=01), and the signal may transition from either the 00 or 01 level to the 10 level. Note that signal transitions from the 10 level to the 11 level (illustrated by dashed line 631) and from the 01 level to the 00 level (illustrated by dashed line 632) are also possible.

Considering the transitions from 10-to-01 and from 01-to-10, it can be seen that each of these transitions crosses the midpoint threshold (i.e., zero threshold level) at a time, T1, midway between the centers of the data eyes 628 and 630. That is, if the edge clock signal 610 is phase aligned to the transitions in the incoming data signal, the 10-to-01 and 01-to-10 data signal transitions cross the midpoint threshold coincidentally (i.e., in phase alignment) with the edge clock transition. Accordingly, the 10-to-01 and 01-to-10 transitions may be compared with the zero threshold level (designated '0' in FIG. 25) to generate transition samples for adjusting the phase of the edge clock signal. Note that, because the signal swings in the transitions from 11-to-01 and 00-to-10 are not symmetric with respect to the zero threshold level, the 11-to-01 and 00-to-10 transitions do not cross the zero threshold level at the same time as the 10-to-01 and 01-to-10 transitions, but rather cross the zero threshold level at some time later (indicated by circle 636). Consequently, use of the 11-to-01 and 00-to-10 transitions to determine zero-crossing times (i.e., times at which the zero threshold level is crossed) may introduce phase error and/or bi-modal jitter in the recovered edge and sampling clock signals 610 and 210. Accordingly, in one embodiment of the invention, transitions in the incoming data signal are selected according to their zero-crossing characteristics, with the selected transitions being used to adjust the phase of the edge and sampling clock signals 610 and 210.

Figure 26:
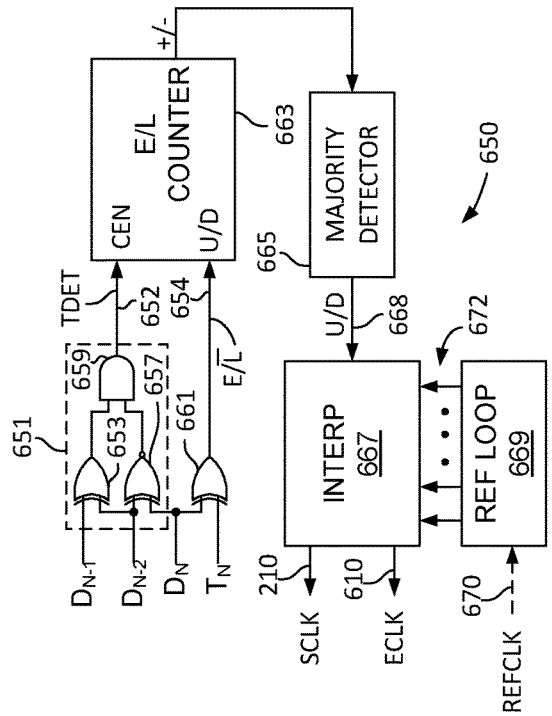
FIG. 26 illustrates an embodiment of a clock recovery circuit that adjusts the phase of edge clock signal and sampling clock signal based on selected transitions detected in the incoming data signal.

FIG. 26 illustrates an embodiment of a clock recovery circuit 650 that adjusts the phase of edge clock signal 610 and sampling clock signal 210 based on selected transitions detected in the incoming data signal. The clock recovery circuit 650 includes a transition detect circuit 651, early/late detector 661, early/late counter 663, majority detector 665, interpolator 667 and reference loop 669. In the embodiment of FIG. 26, the transition detect circuit 651 asserts a transition detect signal 652 (TDET) upon detecting a 01-to-10 or a 10-to-01 transition in the incoming data signal. More specifically, incoming data samples $D_{N-1}$ and $D_{N-2}$ are compared in exclusive-OR gate 653 to determine whether a transition has occurred, and signals $D_N$ and $D_{N-2}$ are compared in exclusive-NOR gate 657 to determine whether the $D_N$ state matches the $D_{N-2}$ state. The outputs of the exclusive OR and exclusive-NOR gates 653, 657 are supplied to AND gate 659 which generates the transition detect signal 652. By this arrangement, the transition detect signal 652 goes high if D[N:N−2]=010 or 101 (i.e., in response to a 01-to-10 transition or a 10-to-01 transition). The transition detect signal 652 is applied to a count enable input (CEN) of the early/late counter 663 to enable an early/late count value to be incremented or decremented according to the output of the early/late detector 661. In one embodiment, the early late detector 661 is implemented by an exclusive OR gate, and therefore asserts an early signal 654 (e.g., a logic high signal) if the transition sample, $T_N$, does not match data sample $D_N$, and a late signal (e.g., logic low signal 654) if the $T_N$ matches $D_N$. That is, if the transition sample is captured after the transition from $D_{N-1}$ to $D_N$, the transition sample will match the $D_N$ sample and thereby indicate that the edge clock signal transition is late relative to the data signal transition. Conversely, if the transition sample is captured before the transition from $D_{N-1}$ to $D_N$, the transition sample will not match the $D_N$ sample and thereby indicate that the edge clock signal transition is early relative to the data signal transition.

In one embodiment, the early/late counter 663 is initialized to a zero level, and is then incremented in response to an early signal (i.e., from the early/late detector 661) and decremented in response to a late signal. By this arrangement, the sign bit (e.g., the MSB) of the early/late count maintained within the early/late counter 663 indicates whether more early signals than late signals, or more late than early signals have been received from the early/late detector (i.e., the count value will underflow to a negative value if more late signals than early signals are detected). Accordingly, after a predetermined number of transition detect assertions (or after a predetermined time), the majority detector 665 evaluates the sign of the early/late count and asserts an up/down signal 668 to the interpolator accordingly. The early/late count value may then be reset to zero in order to count a subsequent set of early/late signal assertions.

In one embodiment, the interpolator 667 maintains a digital control word that is incremented in response to a logic high up/down signal 668 and decremented in response to a logic low up/down signal 668. The most significant bits of the digital control word are used to select a pair of phase vectors from the set of N phase vectors 672 generated by the reference loop 669, and the least significant bits of the digital control word are used to interpolate between the selected pair of phase vectors. As the control word is incremented, the interpolation is incrementally shifted from a leading one of the phase vectors to a lagging one of the phase vectors, thereby incrementally retarding the phase of the edge and sampling clock signals 610, 210. Conversely, as the control word is decremented, the interpolation is incrementally shifted toward the leading one of the selected phase vectors, thereby incrementally advancing the phase of the edge and sampling clock signals 610, 210.

In one embodiment, the reference loop 669 is formed by a delay locked loop (DLL) that receives a reference clock signal 670 and, in response, generates a plurality of phase vectors 672 that are phase distributed within a cycle time of the reference clock signal 670. Alternatively, the reference loop 669 may be a phase locked loop (PLL) that multiplies the reference clock frequency to generate a plurality of phase vectors 672 having a higher frequency than the reference clock frequency. In another alternative embodiment, the reference loop 669 may include an internal timing reference generator (e.g., a ring oscillator or other clock generating circuit) so that no reference clock signal 670 is required. Also, as discussed above, the interpolator 667 may generate any number of sampling clock and edge clock signals. For example, in a double data rate system, the interpolator generates an edge clock signal and complement edge clock signal, and a sampling clock signal and complement sampling clock signal, the sampling clock signal being offset from the edge clock signal by a quarter cycle (90 degrees) of the edge clock signal. The quarter cycle offset may be achieved, for example, by a second interpolator that maintains a control word having a 90 degree digital offset from the control word used to generate the edge clock signal. Other techniques may be used to generate the edge clock-to-sample clock offset in alternative embodiments. In a quad data rate system, the interpolator generates four edge clock signals and four sampling clock signals, the combined set of eight clock signals being distributed in phase through a cycle time of the edge clock signal (i.e., 45 degree increments between successive clock edges). This approach may be extended to support virtually any data rate.

It should be noted that numerous changes may be made to the clock recovery circuit of FIG. 26 without departing from the scope of the present invention. For example, in one alternative embodiment, the up/down signal is a two-bit signal in which the 00 state indicates a hold condition in which control word maintained within the interpolator is not adjusted. In such an embodiment, the majority detector may receive the entire early/late count from the early/late counter, and output the up/down signal in the 00 state if the count value indicates a balanced reception of early and late detections (e.g., the early/late count is zero). Alternatively, the majority detector may be omitted altogether and the sign of the early/late count value output directly to the interpolator to control the phase adjustment of the edge and sampling clock signals.

Returning to FIG. 25, it can be seen that the 11-to-01 transition occurs between the 1+α and −1+α signal levels, and therefore crosses the midpoint between the centers of data eyes 628 and 630 (i.e., time T1) at the +α threshold level. That is, the 11-to-01 transition crosses the +α threshold coincidentally with the desired transition time of the edge clock signal 610. Similarly, the 00-to-10 transition crosses the −α threshold coincidentally with the desired transition time of the edge clock signal 610. Moreover, the 11-to-01 and 00-to-10 transitions have a faster slew rate than the 10-to-01 and 01-to-10 transitions and therefore tend to yield more accurate timing edges. That is, the signal passes through the metastable region more quickly, thereby generating less timing jitter. Accordingly, in one embodiment, additional edge comparators are provided to generate transition samples at the +α and/or −α thresholds. Additional circuitry is also provided within the clock recovery circuit 650 of FIG. 26 to detect the 11-to-01 and/or 00-to-10 transitions and, in response, to update the early/late counter according to the corresponding transition samples. By this arrangement, the overall number of data signal transitions that are used for clock recovery is increased, thereby relaxing the transition density required in the incoming signal for clock recovery purposes.

In partial response receiver embodiments in which the ±α levels are adapted (i.e., as opposed to being initially calibrated or determined empirically and one-time programmed), the ±α levels may initially be incorrect (e.g., started at 0) so that edge comparison based on the ±α levels may be undesirable. In such a system, a zero-threshold edge comparator (e.g., edge-sampling comparator 607 of FIG. 24) may be used to recover the edge and sampling clock signals initially, with switchover to ±α edge comparators occurring after the ±α levels are determined. Transition samples generated by zero-threshold edge comparator may then be ignored, or the samples may continue to be used.

In a system that recovers edge and sampling clock signals based on ±α threshold crossings, and that adapts ±α levels based on a difference between the 1+α and 1−α signal levels, a non-convergence of the ±α threshold levels may occur in certain situations. Referring to bimodal distribution shown in FIG. 27, it can be seen that as the sampling clock phase moves left (i.e., in the increasingly lagging direction), the difference between signal levels 682 and 684 increases. Unfortunately, the increased difference between signal levels 682 and 684 yields larger magnitudes for the ±α threshold levels which, as can be seen in the diagram of FIG. 25, shifts the phase of the edge and sampling clock signals further in the lagging direction (i.e., further to the left), thereby further increasing the clock phase error. If the clock phase error becomes too large, accurate data and edge samples are no longer received by the partial response receiver so that the ±α threshold levels will not converge to the desired setpoints.

Figure 27:
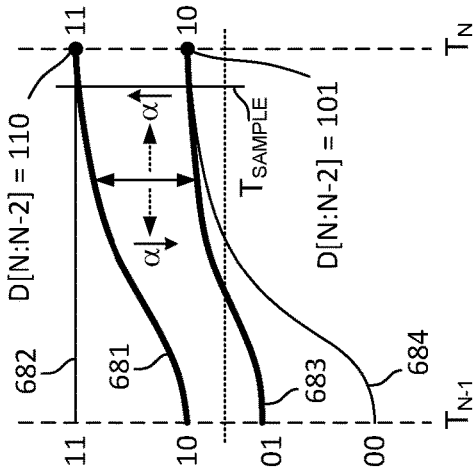
FIG. 27 illustrates a potential source of non-convergence in a system that adaptively generates partial response threshold levels.

Still referring to FIG. 27, one solution to the non-convergence problem is to limit the data samples used to adapt the ±α threshold levels to those indicated by bolded lines 681 and 683. That is, in the case of a sample for which D[N:N−1]=11, the +α level is updated only if the preceding state was 10 (i.e., D[N−1:N−2]=10). Similarly, in the case of a sample for which D[N:N−1]=10, the −α threshold level is updated only if the preceding sate was 01 (i.e., D[N−1:N−2]=01). By this arrangement, as the edge and sampling clock signals begin to lag the desired phase offsets (i.e., $T_{SAMPLE}$ moving to the left in the diagram of FIG. 27), the difference between the +α and −α threshold levels will decrease, thereby producing a counter-effect to shift the edge and sampling clock signals in the leading direction. The level-adapting procedure described in reference to FIG. 21 may be modified to accommodate the above change by changing the evaluation in decision block 525 to D[N−1:N−3]=110 and changing the evaluation in decision block 537 to D[N−1:N−3]=101. Note that these sample patterns are illustrated in FIG. 27 as being patterns for bits D[N:N−2]. In general, the data samples relied upon for level adaptation may have any latency.

Figure 28:
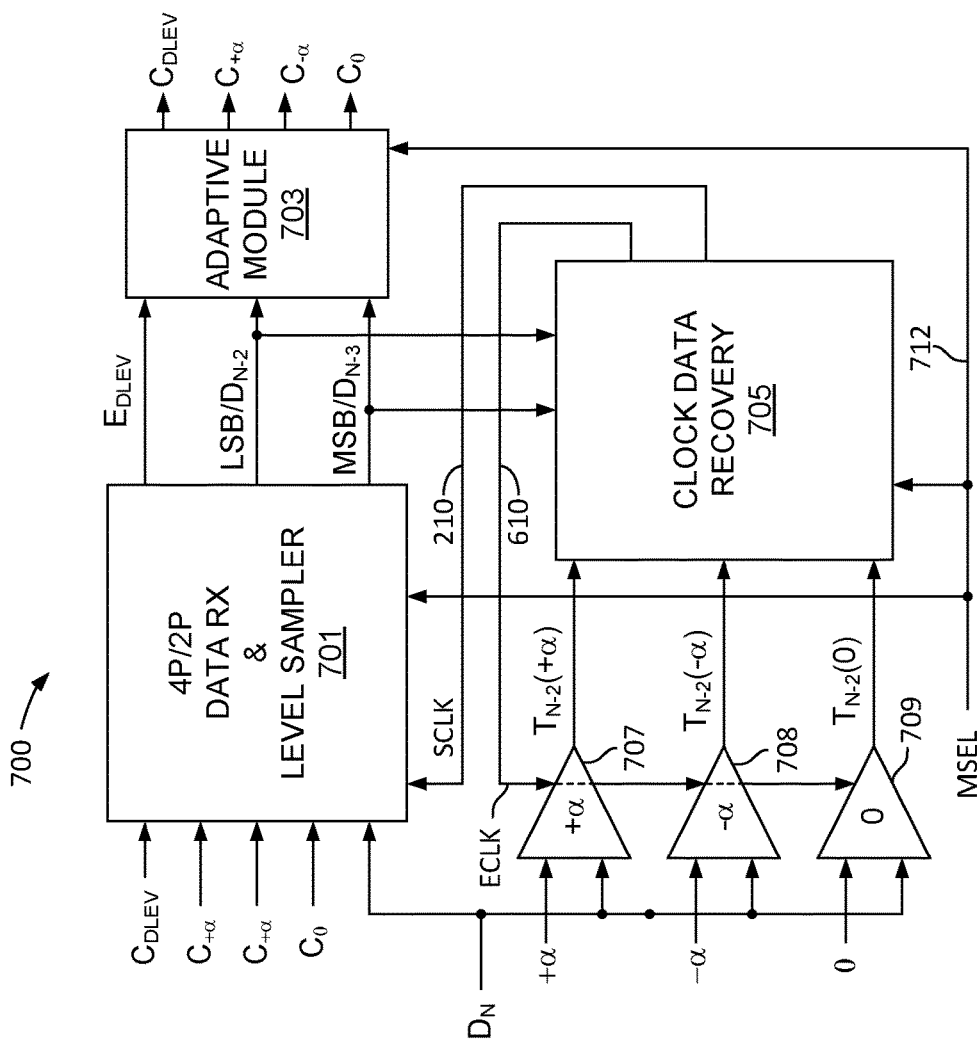
FIG. 28 illustrates an embodiment of a dual-mode, partial response receiver with clock data recovery.

FIG. 28 illustrates an embodiment of a dual-mode, partial response receiver 700 with clock data recovery. The partial response receiver 700 includes a dual-mode data receive/ level sampling circuit 701, adaptive module 703, edge comparators 707, 708, 709, and clock recovery circuit 705. The dual-mode data receive/level sampling circuit 701 and the adaptive module 703 operate in generally the same manner as the circuitry described in reference to FIG. 22. That is, when the mode select signal selects a 4-PAM mode of operation, the data receive and level sampling circuit samples incoming 4-PAM signals to generate an MSB and LSB per captured sample, and generates a data level error sample ($E_{DLEV}$) that allows the adaptive module to determine the full scale difference between steady-state high and low signal levels. The +α, −α and zero threshold levels are then established by the adaptive module 703 at the $C_α$=2/3 full-scale, $C_{−α}$=1/3 full-scale and $C_0$=1/2 full-scale levels, respectively (other threshold levels may be used in alternative embodiments). When the mode select signal selects a 2-PAM mode of operation, the data receive and level sampling circuit 701 generates data samples by selecting between partial-response comparators (i.e., the comparators receiving the ±α threshold levels) and supplies the selected samples to the adaptive module 703 in pairs to enable determination of which of partial response state is reflected by the error sample, $E_{DLEV}$, generated by data level comparator (or data level comparators). The adaptive module 703 then adjusts the ±α threshold levels and the zero threshold level according to the incoming data signal levels determined by the data level comparator.

The edge comparators 707, 708 and 709 capture transition samples $T_{N−2}(+α)$, $T_{N−2}(−α)$ and $T_{N−2}(0)$, respectively, of the incoming data signal in response to transitions of an edge clock signal, ECLK, and provide the transition samples to the clock data recovery circuit 705. The 4-PAM/partial response data samples captured by the data receive and level sampling circuit 701 (i.e., MSB/LSB in 4-PAM mode, D[N−2:N−3] in partial response mode) are also provided to the clock data recovery circuit 705. The clock data recovery circuit selectively adjusts the phases of the edge clock signal 610 and sampling clock signal 210 based on the transition samples and data samples.

Figure 29:
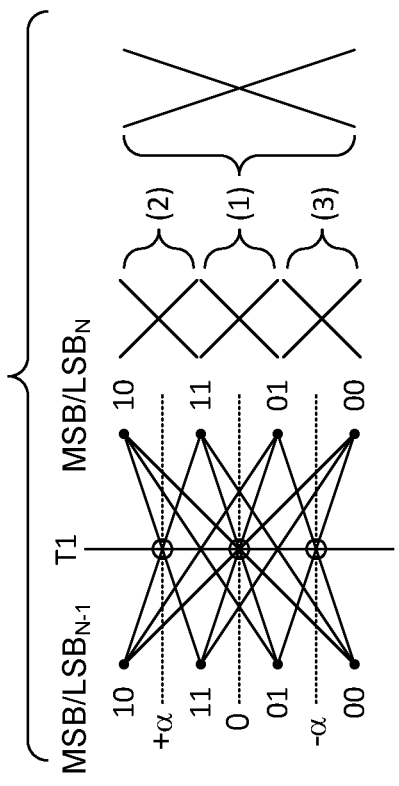
FIG. 29 illustrates signal transitions between successive 4-PAM (Pulse Amplitude Modulation) symbols.

FIG. 29 illustrates the possible signal transitions between successive 4-PAM symbols. As shown, from each of four possible signal levels, the incoming data signal may transition to any of three other signal levels. For example, a signal level above +α (corresponding to data state 10) may transition to a signal level between +α and 0 (data state 11); a signal level between 0 and −α (data state 01); and a signal level below −α (data state 00). Examining the different possible transitions, it can be seen that any transitions that cross all three threshold levels will cross the zero threshold level at the timing center, T1, between the desired data sampling instants. Similarly, transitions that cross a single threshold level will cross either the zero threshold level, the +α threshold level or the −α threshold level at T1. By contrast, any transitions that cross two threshold levels, but not three, do not cross the zero, +α or −α threshold levels at T1. Enumerating the different transitions that cross the zero, +α and −α threshold levels at T1 as transition types (1), (2) and (3), respectively, it can be seen that type (1) transitions are those in which the LSB remains unchanged at either '1' or '0', while the MSB changes state (i.e., ($MSB_N$ xor $MSB_{N-1}$) & ($LSB_N$ xnor $LSB_{N-1}$)); type (2) transitions are those in which the MSB remains high while the LSB changes state (i.e., $MSB_N$&$MSB_{N-1}$&($LSB_N$ xor $LSB_{N-1}$)); and type (3) transitions are those in which the MSB remains low, while the LSB changes state (i.e., /$MSB_N$&/$MSB_{N-1}$&($LSB_N$ xor $LSB_{N-1}$)). Thus, in one embodiment, when the mode select signal 712 selects a 4-PAM mode of operation within the partial response receiver 700 of FIG. 28, the clock recovery circuit adjusts the phase of the edge clock signal and sampling clock signal in response to the data samples generated by the data receive and level sampling circuit 701 and the transition samples generated by comparators 707, 708, 709 in accordance with the following table:

TABLE 1

| $D_{N-1}$(4P) | $D_N$(4P) | Center Time Crossing At: | $T_N$(+α) | $T_N$(−α) | $T_N$(0) | Early/Late Count Adj. |
|---|---|---|---|---|---|---|
| 00 | 01 | −α | X | 0/1* | X | +1/−1 |
| 00 | 11 | — | X | X | X | — |
| 00 | 10 | 0 | X | X | 0/1 | +1/−1 |
| 01 | 00 | −α | X | 0/1 | X | −1/+1 |
| 01 | 11 | 0 | X | X | 0/1 | +1/−1 |
| 01 | 10 | — | X | X | X | — |
| 11 | 00 | — | X | X | X | — |
| 11 | 01 | 0 | X | X | 0/1 | −1/+1 |
| 11 | 10 | +α | 0/1 | X | X | +1/−1 |
| 10 | 00 | 0 | X | X | 0/1 | −1/+1 |
| 10 | 01 | — | X | X | X | — |
| 10 | 11 | +α | 0/1 | X | X | −1/+1 |

(* '0/1' means '0' or '1' and corresponds to the +1 or −1 adjustment to the early/late count)

Figure 30:
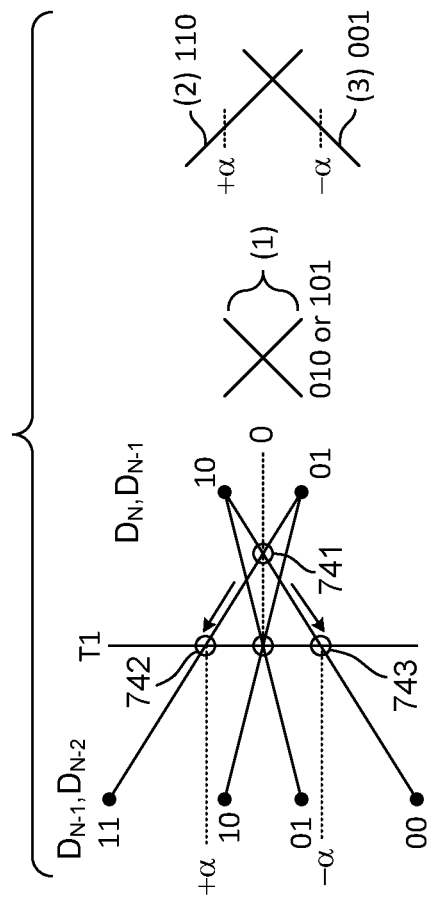
FIG. 30 illustrates data signal transitions that may be used for clock recovery when the dual mode receiver of FIG. 28 is operated in a partial response mode.

Still referring to FIG. 28, when the partial response receiver 700 is operated in the partial response mode, the transitions of interest are as shown in FIG. 30. That is, a partial-response state transition from 10-to-01 or 10-to-01 crosses the zero threshold level at the desired edge clock transition time, T1; a state transition 11-to-01 crosses the +α threshold level at T1; and a state transition from 00-to-10 crosses the −α threshold level at T1. Enumerating the partial response mode transitions that cross the zero, +α and −α threshold levels at T1 as transition types (1), (2) and (3), respectively, it can be seen that type (1) transitions are those in which the current data sample, $D_N$, does not match the immediately preceding data sample, $D_{N-1}$, which, in turn, does not match the twice-removed data sample, $D_{N-2}$ (i.e., ($D_N$ xor $D_{N-1}$) & ($D_{N-1}$ xor $D_{N-2}$)); type (2) transitions are those in which the current data sample, $D_N$, is low, and the two immediately preceding data samples, $D_{N-1}$ and $D_{N-2}$, are high (i.e., /$D_N$&$D_{N-1}$&$D_{N-2}$); and type three (3) transitions are those in which the current data sample, $D_N$, is high, and the two immediately preceding data samples, $D_{N-1}$ and $D_{N-2}$, are low (i.e., $D_N$&/$D_{N-1}$&/$D_{N-2}$). Thus, in one embodiment, when the mode select signal 712 selects a partial response mode of operation within the partial response receiver 700, the clock recovery circuit 705 adjusts the phase of the edge clock and sampling clock signals 610, 210 in response to the data and transition samples generated by circuit 701 and comparators 707, 708, 709 in accordance with the following table:

TABLE 2

| D[N−1:N−2] | D[N:N−1] | Center Time Crossing At: | $T_N$(+α) | $T_N$(−α) | $T_N$(0) | Early/Late Count Adj. |
|---|---|---|---|---|---|---|
| 00 | 10 | −α | X | 0/1 | X | +1/−1 |
| 01 | 00 | — | X | X | X | — |
| 01 | 10 | 0 | X | X | 0/1 | +1/−1 |
| 10 | 01 | 0 | X | X | 0/1 | −1/+1 |
| 10 | 11 | — | X | X | X | — |
| 11 | 01 | +α | 0/1 | X | X | −1/+1 |

Still referring to FIG. 30, if the +α and −α threshold levels are initially set to zero as indicated by reference numeral 741, it can be seen that the edge clock alignment will initially converge to a point that is phase delayed relative to the desired edge sampling point, T1. As the levels of ±α progress toward their ultimate setpoints at 742 and 743, however, the edge clock phase alignment will converge to the desired sampling point, T1.

Figure 31:
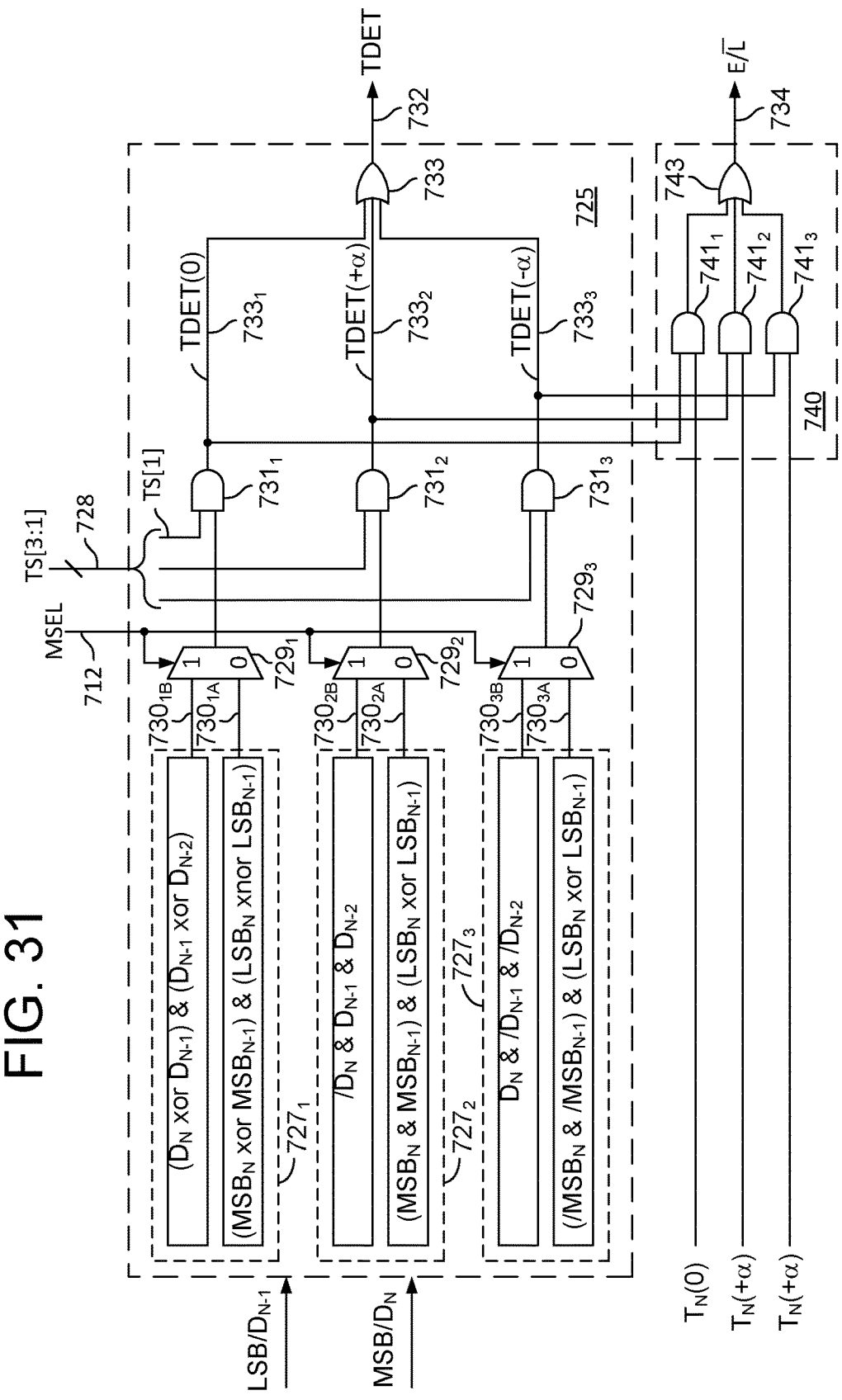
FIG. 31 illustrates a transition detect circuit and sample select circuit that may be used within the clock recovery circuit of FIG. 28.

FIG. 31 illustrates a transition detect circuit 725 and sample select circuit 740 that may be used within the clock recovery circuit 705 of FIG. 28. The transition detect circuit receives the data sample pair generated by the data receive and level sampling circuit 701 and generates a transition detect signal 732 (TDET) in accordance with the states of successive data sample pairs, the mode select signal 712 (MSEL) and a transition select signal 728 (TS[3:1]). The transition detect circuit additionally generates component transition detect signals $733_1$, $733_2$ and $733_3$ (i.e., TDET(0), TDET(+α) and TDET(−α), respectively) which are output to the transition select circuit 740. The transition select circuit includes AND gates $741_1$, $741_2$, and $741_3$ to gate the transition samples $T_N$(0), $T_N$(+α) and $T_N$(−α), according to the state of the corresponding transition select signals $733_1$-$733_3$. The outputs of the AND gates 741 are input to OR gate 743 to generate an early signal 734. The transition detect signal 732 is itself generated by a logic OR combination of the component transition detect signals 733 in OR gate 733. By this arrangement, if any of the component transition detect signals 733 is asserted (e.g., to a logic high state), the transition detect signal 732 is asserted, and the state of the corresponding transition sample $T_N$ is output as the early signal 734.

The transition detect circuit 725 includes a set of combinatorial logic circuits $727_1$, $727_2$ and $727_3$ that generate type (1), type (2) and type (3) transition detect signals 730 for both 4-PAM and partial response data states in accordance with the type (1), type (2) and type (3) transition types described in reference to FIGS. 29 and 30. In the embodiment of FIG. 31, combinatorial logic circuit $727_k$ generates a 4-PAM type (1) transition detect signal $730_{1A}$ and a 2-PAM, partial response type (1) transition detect signal $730_{1B}$ as follows:

Signal $730_{1A}$=($MSB_N$ xor $MSB_{N-1}$)&($LSB_N$ xnor $LSB_{N-1}$); and

Signal $730_{1B}$=($D_N$ xor $D_{N-1}$)&($D_{N-1}$ xor $D_{N-2}$).

Similarly, combinatorial logic circuits $727_2$ and $727_3$ generate 4-PAM type (2) and type (3) transition detect signals $730_{2A}$ and $730_{3A}$, and 2-PAM, partial response type (2) and type (3) transition detect signals, $730_{2B}$ and $730_{3B}$, as follows:

Signal $730_{2A}$=(MSB$_N$&MSB$_{N-1}$)&(LSB$_N$ xor LSB$_{N-1}$);

Signal $730_{3A}$=(/MSB$_N$&/MSB$_{N-1}$)&(LSB$_N$ xor LSB$_{N-1}$);

Signal $730_{2B}$=/D$_N$&D$_{N-1}$&D$_{N-2}$; and

Signal $730_{3B}$=D$_N$&/D$_{N-1}$&/D$_{N-2}$.

It should be noted that, in both partial-response mode and 4-PAM mode, two successive pairs of data samples are used within the transition detect circuit 725 (e.g., MSB/LSB$_N$ and MSB/LSB$_{N-1}$ in 4-PAM mode; D$_N$/D$_{N-1}$ and D$_{N-1}$/D$_{N-2}$ in partial response mode) to generate the transition detect signals 730. One or more of the data sample pairs may be buffered within a storage circuit within transition detect circuit 725 or elsewhere within the dual mode receiver and made available to the various combinatorial logic circuits 727. Also, the latency of the data samples referred to in FIG. 31, though depicted as N, N−1 and N−2, may be any latency necessary to match the latency of the data samples output from the data receive and level sampling circuit 701 of FIG. 28.

Select circuits 729$_1$, 729$_2$ and 729$_3$ each have a first input port coupled to receive a respective one of the 4-PAM type (1), type (2) and type (3) transitions detect signals $730_{1A}$, $730_{2A}$ and $730_{3A}$, respectively, and a second input port coupled to receive a respective one of the 2-PAM, partial response type (1), type (2) and type (3) transition detect signals $730_{1B}$, $730_{2B}$ and $730_{3B}$, respectively. The mode select signal 712 is coupled to a select input of each of the select circuits 729 so that, when the mode select signal 712 is low to select a 4-PAM mode of operation, the 4-PAM transition detect signals $730_{1A}$, $730_{2A}$ and $730_{3A}$ are supplied to inputs of respective AND gates 731$_1$, 731$_2$ and 731$_3$, respectively. By contrast, when the mode select signal 712 is high, the 2-PAM, partial response transition detect signals $730_{1B}$, $730_{2B}$ and $730_{3B}$ are supplied to respective inputs of the AND gates 731. In the embodiment of FIG. 31, the transition select signal 728 includes three component signals, TS[1], TS[2] and TS[3], that are input to AND gates 731$_1$, 731$_2$ and 731$_3$, respectively, to gate the generation of the component transition detect signals 733$_1$, 733$_2$, and 733$_3$. Thus, the transition select signal 728 may be used selectively enable the different types of data signal transitions to be used for clock recovery purposes. For example, if TS[3:1]=001, then detection of type (1) transitions (i.e., crossing the zero-threshold at the desired time) is enabled, but detection of type (2) and type (3) transitions (i.e., crossing the ±α thresholds at the desired time) is disabled. When TS[3:1]=111, then detection of all three types of transitions depicted in FIGS. 29 and 30 is enabled. Other settings of the transition select signal may be used to enable detection of the different transition types in other combinations. In one embodiment, the transition select signal is generated according to a transition select value stored in a configuration circuit that may be run-time programmed (e.g., by a host processor or other system control component). The transition select value may alternatively be programmed into a non-volatile storage circuit (e.g., at production time) or similar hardware configurable circuit (e.g., fuse-blowing to establish desired configuration).

The transition detect signal 732 and early signal 734 generated by the transition detect circuit 725 and transition select circuit 740 may be used to control the phase of one or more sampling clock signals and one or more edge clock signals in the manner above in reference to FIG. 26. For example, in one embodiment the transition detect signal 732 is applied to the count enable input of an early/late counter, and the early signal 734 is applied to the up/down input. The transition detect signal 732 and early signal 734 may alternatively be supplied to other logic circuitry that determines whether detected transitions occur early or late relative to an edge clock signal.

Numerous changes may be made to the transition detect circuit 725 and transition select circuit 740 without departing from the spirit and scope of the present invention. For example, if the data signal transitions to be used for clock recovery is a subset of the three transition types shown in FIGS. 29 and 30, one or more component signals of the transition select signal (and corresponding components of the combinatorial logic 727, select circuitry 729 and gating circuitry 731, 741) may be omitted. Moreover, if the transition types are fixed for a given application (e.g., all three types of the transitions depicted in FIGS. 29 and 30, or any subset or single one thereof), the transition select signal may be omitted altogether along with the combinatorial logic and gating circuitry for any unused types of transitions.

Figure 32:
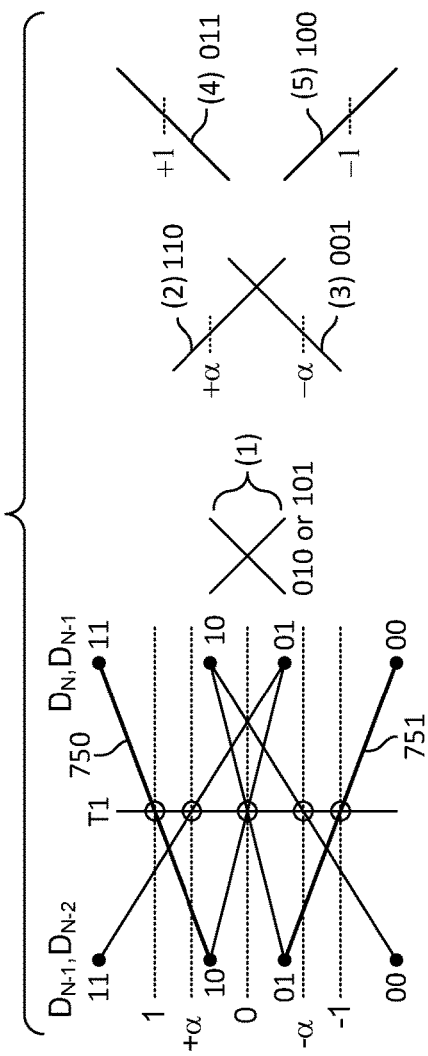
FIG. 32 illustrates additional data signal transitions that may be used for clock recovery when the dual mode receiver of FIG. 28 is operated in a partial response mode.
Figure 33:
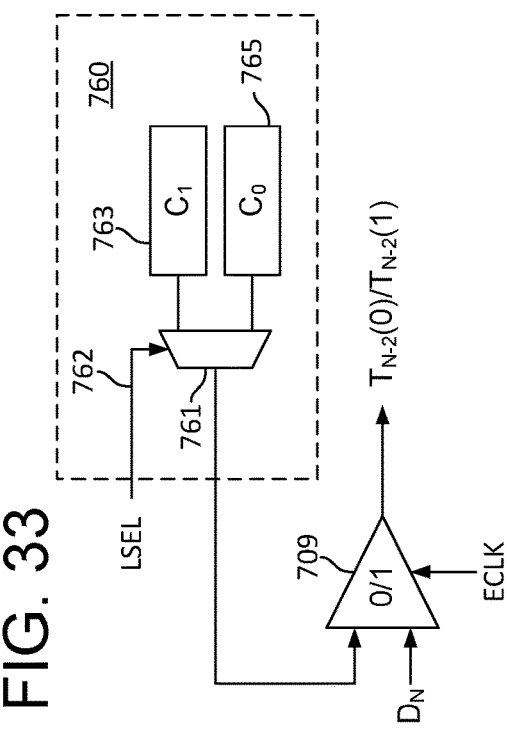
FIG. 33 illustrates a threshold select circuit according to an embodiment of the invention.

FIG. 32 illustrates the full set of transitions that may be detected when the partial response receiver 700 of FIG. 28 is operated in the partial response mode. In particular, transitions 750 and 751 (i.e., transitions from 10-to-11 and from 01-to-00), designated type (4) and type (5) transitions, respectively, can be seen to cross the nominal 1 and −1 threshold levels (referred to herein as unity threshold levels), respectively, at the desired edge sampling point, T1. Note that, in these transitions, the input signal slews substantially faster than in the 01-to-10 and 10-to-01 transitions and therefore is a potentially more accurate (and/or more jitter-free) source of clock phase information. Accordingly, in one embodiment, additional edge comparators are provided in the circuit of FIG. 28 (not shown), and corresponding additional logic is added to the transition detect and select circuits (725, 740) of FIG. 31 to enable clock recovery based on type (4) and/or type (5) transitions. Alternatively, in one embodiment, the zero-threshold comparator 709 of FIG. 28 is re-allocated to a unity threshold comparator function after the ±α threshold levels are established (e.g., converge to the points 742 and 743 depicted in FIG. 30). FIG. 33 illustrates an embodiment of a threshold select circuit 760 that is used to select between control values C$_0$ and C$_1$ for the zero and unity threshold levels, respectively. Initially a threshold select signal 762 (LSEL) is supplied in a first state to multiplexer 761 (or other select circuit) to select the C$_0$ control value to be provided to edge comparator 709, thereby enabling the 10-to-01 and 01-to-10 transitions to be used for clock recovery purposes as the ±α levels are adapted. After the ±α levels have reached convergence points (e.g., begin to dither), the threshold select signal 762 is switched to an alternate state to select the C$_1$ control value to be used for generation of edge samples. The C$_1$ control value may be generated by the adaptive module 703 of FIG. 28 using the techniques discussed above in reference to FIG. 22. The C$_0$ and/or C$_1$ control values may be buffered in registers 763 and 765 as shown in FIG. 33 (or other storage circuits), or provided directly to the multiplexer 761 from the adaptive module.

Referring again to the partial response receiver 700 of FIG. 28, it should be noted that the receiver may alternatively be a single-mode 4-PAM circuit having the clock recovery function described above in reference to FIGS. 28, 29 and 31 (i.e., omitting the combinatorial circuitry and mode select circuitry used to enable the partial response mode). That is, the 4-PAM circuit may include data receive circuitry for capturing a sequence of 2-bit data samples (or more bits per data sample in the case of M-PAM, M>4), and clock recovery circuitry that captures transition samples at one or more of the 0, +α and −α threshold levels, and that selectively uses the transition samples to recover a sampling clock signal and edge clock signal according to the state of successive data samples. Conversely, the circuitry necessary to enable the 4-PAM mode of operation may be omitted to provide a partial-response receiver with clock recovery circuitry that captures transition samples at one or more of the 0, +α and −α threshold levels, and that selectively uses the transition samples to recover a sampling clock signal and edge clock signal according to the state of successive data samples.

In another alternative embodiment, the partial response receiver 700 of FIG. 28 may include a third, non-partial-response operating mode in which binary signal reception and clock recovery are performed without regard to partial response. That is, the +α and −α comparators within the data sampling circuit and edge sampling circuit may be disabled, and the zero-threshold comparators within the data and edge sampling circuits being used to sample data and edges in the incoming signal. Alternatively, in the non-partial-response mode, the ±α threshold levels may be set to zero such that all the comparators within the data and edge sampling circuits perform a zero-threshold comparison. In yet other embodiments, the partial response receiver 700 of FIG. 28 may be operable in either a 4-PAM or binary mode, with partial response signal detection being separately enabled in either mode. That is, the partial response receiver 700 may be operated in either a binary non-partial response mode; a binary partial response mode; a 4-PAM non-partial response mode; or a 4-PAM partial response mode. Moreover, the number of least-latent data samples included in the partial response may be extended to any number. More generally, the receive circuit 700 may be operated in PAM modes ranging from M-PAM to (M−X)-PAM (where M is any integer and X is any integer less than M−1), and may be operated with or without regard to partial response in each PAM mode. Circuitry to support extended-bit partial response operation, and 4-PAM partial response operation is discussed below in greater detail.

Extending the Partial Response Compensation to Include Additional Data History

Figure 34:
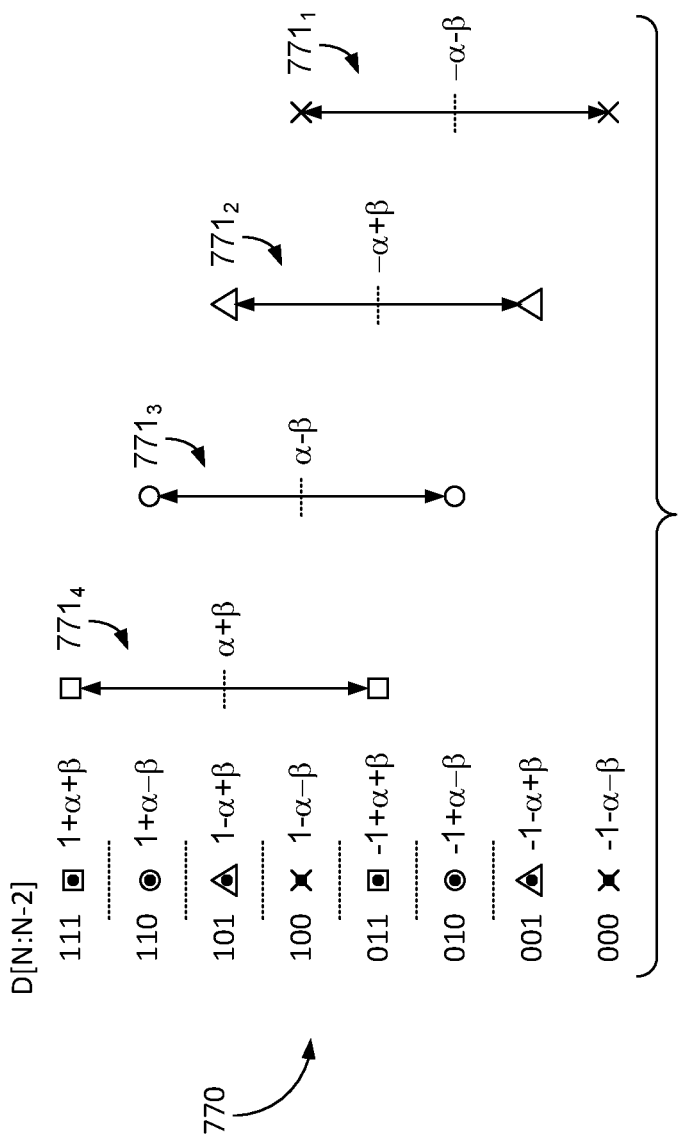
FIG. 34 illustrates a distribution 770 of signal levels in a system in which the two most recently received symbols are the primary source of residual channel response.

Thus far, partial response receivers have been described in terms of a bimodal distribution based on the current symbol, $D_N$, and the preceding symbol, $D_{N-1}$. In alternative embodiments, partial responses to any number of preceding symbols may be accounted for in the generation of data samples. FIG. 34, for example, illustrates a distribution 770 of data-plus-partial-response signal levels in a system in which the two most recently received symbols are the primary source of residual channel response (i.e., the channel memory includes a partial response, α, to the immediately preceding symbol, $D_{N-1}$, and a partial response, β, to the twice-removed preceding symbol, $D_{N-2}$). For purposes of simplicity, the signal level constellation shown in FIG. 34 assumes a substantially equal distribution of the eight partial response signal levels: 1+α+β, 1+α−β, 1−α+β, 1−α−β, −1+α+β, −1+α−β, −1−α+β, and −1−α−β. Other signal distributions may result depending upon the channel characteristics. As shown, the constellation may be viewed as defining four signal ranges $771_1$-$771_4$, each range being centered about one of the four possible partial response levels, α+β, α−β, −α+β, and −α−β.

Figure 35:
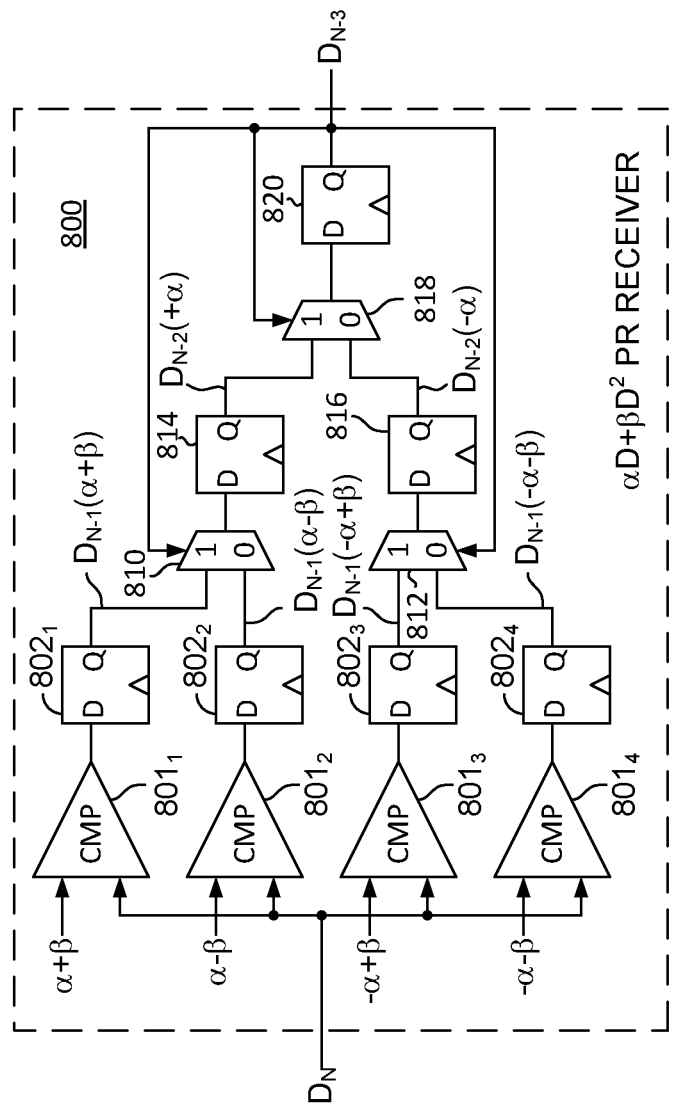
FIG. 35 illustrates a partial response receiver according to an embodiment of the invention that operates in accordance with the partial response states shown in FIG. 34.

FIG. 35 illustrates a partial response receiver 800 that operates in accordance with the partial response states shown in FIG. 34. Four comparators $801_1$, $801_2$, $801_3$ and $801_4$ are provided to compare the signal level of an incoming symbol, $D_N$, against the four partial response threshold levels α+β, α−β, −α+β and −α−β, respectively. The outputs of each of the comparators 801 are stored in a first stage of storage circuits $802_1$-$802_4$ (e.g., in response to a sampling clock signal, not shown), with the sample values that correspond to the +α threshold levels (i.e., $D_{N-1}(α+β)$ and $D_{N-1}(α−β)$) being supplied to a first select circuit 810 and the sample values that correspond to the −α threshold levels (i.e., $D_{N-1}(−α+β)$ and $D_{N-1}(−α−β)$) being supplied to a second select circuit 812. Each of the first and second select circuits 810 and 812 selects between its respective pair of input samples according to the state of a previously resolved sample value, $D_{N-3}$, stored in storage circuit 820. More specifically, if the resolved sample value, $D_{N-3}$, is a '1', then β, the partial response to $D_{N-3}$, is a positive value and the select circuits 810 and 812 select the sample values $D_{N-1}(α+β)$ and $D_{N-1}(−α+β)$, respectively, that correspond to the positive β state. If the $D_{N-3}$ sample is a logic '0' value, then β is a negative value and the select circuits 810 and 812 select the sample values $D_{N-1}(α−β)$ and $D_{N-1}(−α−β)$ that correspond to the negative β state. The $D_{N-1}$ sample values selected by the select circuits 810 and 812 correspond to the +α and −α partial response states, respectively, and are stored in storage circuits 814 and 816 to provide $D_{N-2}$ sample values $D_{N-2}(α)$ and $D_{N-2}(−α)$. The $D_{N-2}(α)$ and $D_{N-2}(−α)$ samples are output from the storage circuits 814 and 816 to respective inputs of select circuit 818. The state of the $D_{N-3}$ sample value indicates the sign of the partial response contribution in the $D_{N-2}$ signal. That is, if $D_{N-3}=1$, α is positive, and if $D_{N-3}=0$, α is negative. Accordingly, the $D_{N-3}$ sample value is supplied to a select input of select circuit 818 to select either $D_{N-2}(+α)$ or $D_{N-2}(−α)$. Thus, the partial response receiver 800 of FIG. 35 simultaneously compares the incoming data signal against four different partial response thresholds, then selects one of the four sample values to be the output sample value ($D_{N-3}$) based on the previously resolved state of the α and β partial response components. Partial response components from more than two previously received symbols may be accommodated in a similar manner by increasing the number of comparators to match the number of partial response levels to be resolved, and then selecting the desired partial response sample on the basis of the partial response components indicated by a previously resolved sample value.

Figure 36:
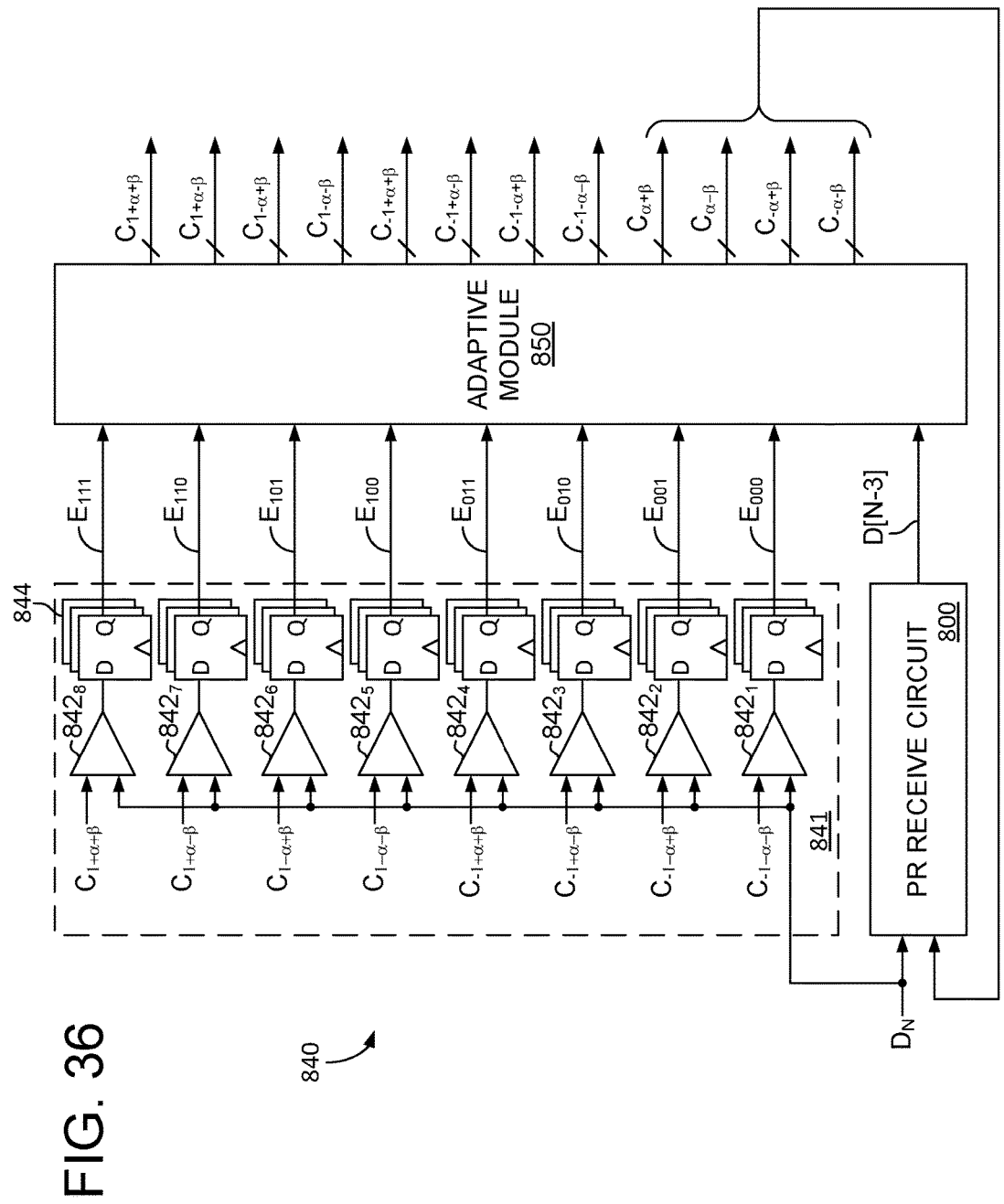
FIG. 36 illustrates a partial response receiver according to another embodiment of the invention.

FIG. 36 illustrates a partial response receiver 840 according to another embodiment of the invention. The partial response receiver 840 includes a partial response receive circuit 800, level sampler 841 and adaptive module 850. The partial response receive circuit 800 operates generally as described in reference to FIG. 35 to generate sample value $D_{N-3}$, which is supplied to the adaptive module 850. The level sampler 841 operates in generally the same manner as the level sampling circuit of FIG. 14, except that eight comparators $842_1$-$842_8$ are provided to error samples for each of the eight possible partial response levels depicted in FIG. 34 (i.e., $E_{000}$, $E_{001}$, ..., $E_{110}$, $E_{111}$). The level sampler additionally includes storage circuits 844 to latency-align the error samples generated by comparators 842 with the data sample D[N−3] generated by the partial response receive circuit 800. The adaptive module 850 operates similarly to the adaptive module described in reference to FIGS. 14-16, except that control values for each of the eight partial response threshold levels applied within comparators 842 are updated in response to reception of a corresponding one of the eight possible data patterns for sample values D[N−3:N−5] (note that data samples $D_{N-4}$ and $D_{N-5}$ may be generated by buffering data samples received from the partial response receive circuit 800 within the adaptive module 850). That is, when D[N−3:N−5]=111, control value $C_{1+\alpha+\beta}$ is incremented or decremented according to the state of the error sample, $E_{111}$, generated by comparator 842$_8$; when D[N−3:N−5]=110, $C_{1+\alpha-\beta}$, is incremented or decremented according to the state of error sample $E_{110}$, and so forth to error sample $E_{000}$ which is used to update $C_{-1-\alpha-\beta}$ when D[N−3:N−5]=000.

In one embodiment, each of the four threshold control values supplied to the partial response receive circuit 800 (i.e., $C_{\alpha+\beta}$, $C_{\alpha-\beta}$, $C_{-\alpha+\beta}$ and $C_{-\alpha-\beta}$) are generated by averaging respective pairs of the control values output to the level sampler 841. That is:

$$C_{\alpha+\beta}=(C_{1+\alpha+\beta}+C_{-1+\alpha+\beta})/2;$$

$$C_{\alpha-\beta}=(C_{1+\alpha-\beta}+C_{-1+\alpha-\beta})/2;$$

$$C_{-\alpha+\beta}=(C_{1-\alpha+\beta}+C_{-1-\alpha+\beta})/2; \text{ and}$$

$$C_{-\alpha-\beta}=(C_{1-\alpha-\beta}+C_{-1-\alpha-\beta})/2$$

Alternatively, the threshold control values supplied to the partial response receive circuit 800 may be generated by halving the difference between respective pairs of the control values output to the level sampler 841 (e.g., $C_{\alpha+\beta}=(C_{1+\alpha+\beta}-C_{1-\alpha-\beta})/2$).

Partial Response, Multi-PAM Receiver

Figure 37:
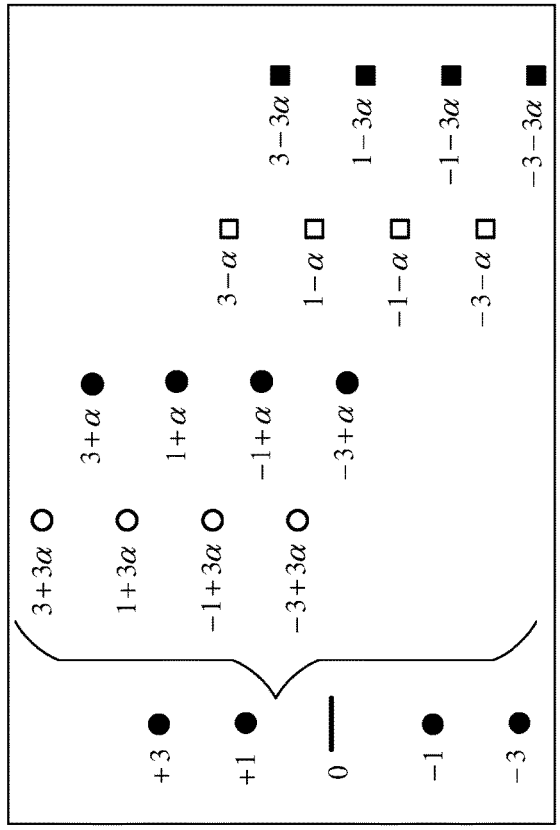
FIG. 37 illustrates a constellation of possible signal levels in a 4-PAM signaling system.

The partial response operation described above in the context of binary signaling may be extended to multi-PAM receivers. FIG. 37, for example, illustrates a constellation of possible signal levels in a 4-PAM signaling system. More specifically, assuming that a given data symbol has one of the four levels +3, +1, −1 or −3 centered about a nominal zero value, and that the primary partial response is due to the immediately preceding symbol, then sixteen partial response states become possible. That is, a symbol nominally transmitted at level +3 may have any of the states 3+3α, 3+α, 3−α, or 3−3α when observed at the receiver, depending on whether the signal level for the preceding symbol was +3, +1, −1 or −3. Similarly, a symbol nominally transmitted at levels +1, −1 or −3 may have any of the four states that correspond to the additive or subtractive effect of the preceding symbol level. As shown in FIG. 37, by grouping the possible partial response states according to the signal level of the preceding symbol, it can be seen that if the preceding symbol was a +3, the subsequently transmitted symbol will have a signal level that is offset by 3α and therefore that ranges from −3+3α to +3+3α. Similarly, if the preceding symbol was a +1, the subsequently transmitted symbol will have a signal level that is offset by 1α, and so forth for preceding symbols at −1 (offset=−1α) and −3 (offset=−3α). Accordingly, by providing four 4-PAM receive circuits each having thresholds offset by respective one of the 3α, +α, −α and −3α partial response levels, a partial response mode of operation may be enabled within a 4-PAM receiver.

Figure 38:
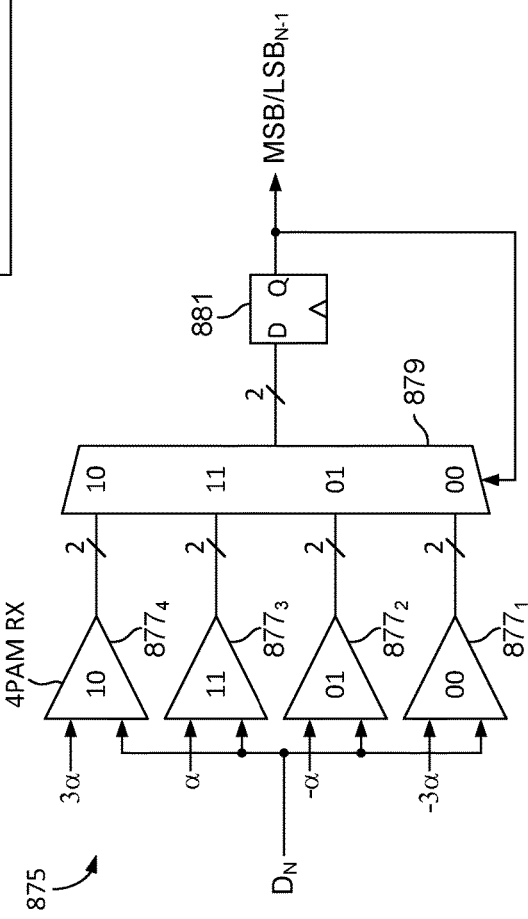
FIG. 38 illustrates a 4-PAM partial response receiver according to an embodiment of the invention.

FIG. 38 illustrates a 4-PAM partial response receiver 875 according to an embodiment of the invention. The receiver 875 includes four 4-PAM receive circuits 877$_1$-877$_4$ (i.e., each capable of resolving the signal level of an incoming symbol into one of four possible two-bit combinations) each having a threshold level that is offset according to one of the four partial response levels (3α, α, −α, or −3α). In the case of receive circuit 877$_4$, for example, the 3α offset (corresponding to a prior symbol level of 10) is applied to each of the internal levels generated to resolve the 4-PAM signal. That is, instead of comparing the incoming signal with levels of −2, 0, and 2, the incoming signal is compared with −2+3α, 3α and 2+3α (i.e., the threshold values between the 3+3α, 1+3α, −1+3α, −3+3α constellation depicted in FIG. 37). Similarly, 4-PAM receive circuit 877$_3$ compares the incoming signal with thresholds offset by α (i.e., −2+α, α and 2+α), comparator 877$_2$ compares the incoming signal with thresholds offset by −α (i.e., −2−α, −α, and 2−α) and comparator 877$_1$ compares the incoming signal with thresholds offset by −3α (i.e., −2−3α, −3α and 2−3α). By this arrangement, the incoming signal is resolved into four 2-bit sample values according to each of the four possible partial responses to the preceding symbol. The preceding symbol, MSB/LSB[N−1], having been selected according to the state of MSB/LSB[N−2], is stored in storage element 881 and applied to the select input of select circuit 879 to select the one of the four sample values generated in accordance with the incoming signal level. While the partial response operation has been described in terms of a 4-PAM receiver that enables partial response selection based on a single preceding symbol, the circuits and operation described may be extended to other PAM levels (e.g., 8-PAM, 10-PAM, etc.) and/or to include the partial response to additional preceding bits.

Figure 39:
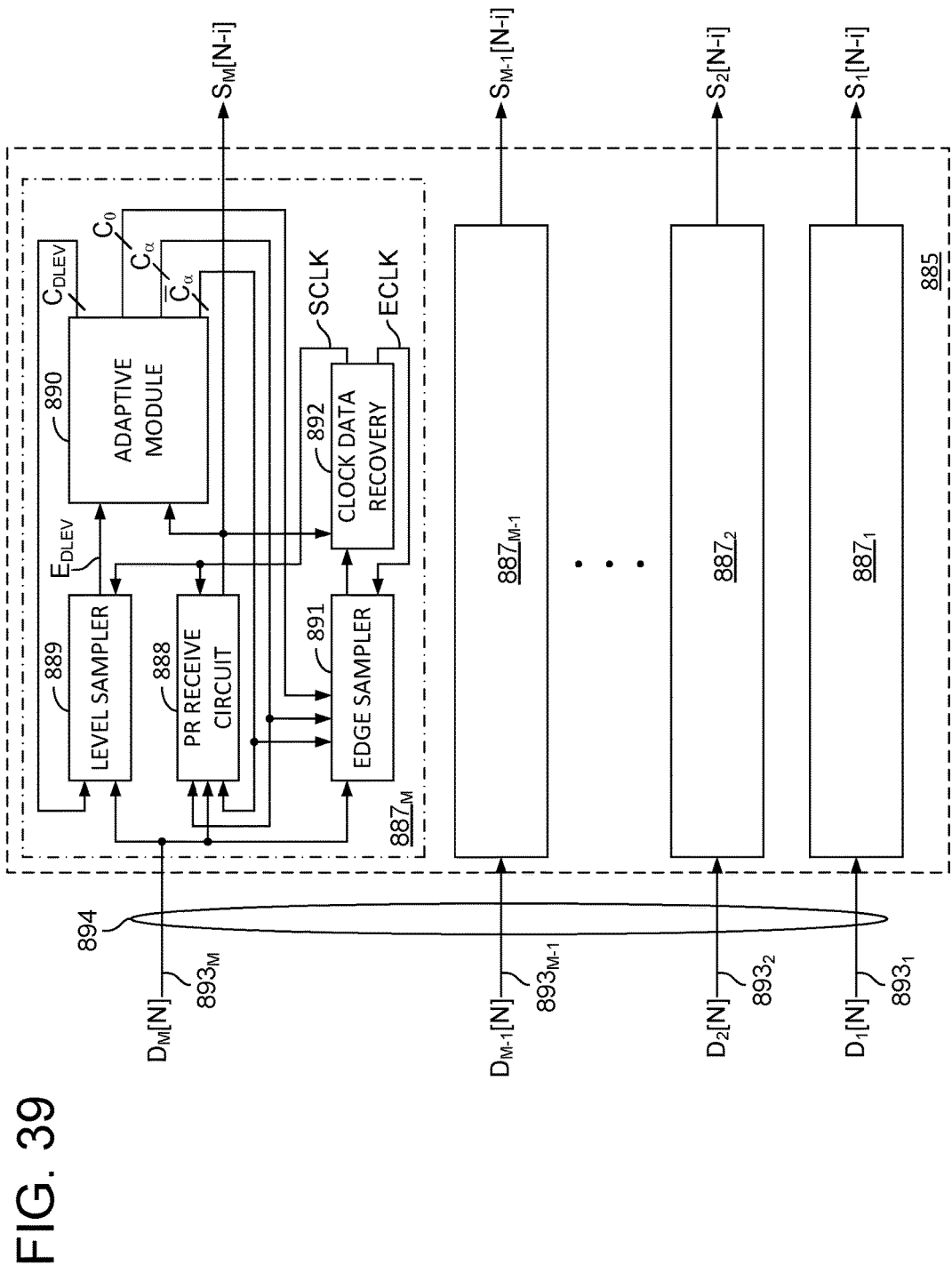
FIG. 39 illustrates an input circuit that includes multiple partial response receivers according to an embodiment of the invention.

FIG. 39 illustrates an input circuit 885 that includes multiple partial response receivers 887$_1$-887$_M$ according to an embodiment of the invention. Each of the partial response receivers 887$_1$-887$_M$ is coupled to a respective one of signal lines 883$_1$-883$_M$ to receive a corresponding one of data signals $D_1$-$D_M$. In one embodiment, each of the data signals $D_1$-$D_M$ is a serial stream of data values (e.g., data eyes) that is sampled within the corresponding partial response receiver 887 to generate a corresponding one of sample values, $S_1$-$S_M$. The sampled values $S_1$-$S_M$ are delayed relative to the corresponding data values by one or more symbol times, i, according to the latency introduced by the partial response receiver 887. Thus, during the symbol time in which data value $D_M[N]$ is valid at the input to partial response receiver 887$_M$, the partial response receiver outputs sample value $S_M[N-i]$. Partial response receivers 887$_1$-887$_{M-1}$ similarly output respective sample values $S_1[N-i]$-$S_{M-1}[N-i]$ during the symbol times in which data values $D_1[N]$-$D_{M-1}[N]$ are valid.

In one embodiment, each of the signal lines 893$_1$-893$_M$ forms a unidirectional or bidirectional point-to-point signaling link between a first IC device that includes input circuit 885 and a second IC device. In the case of a bi-directional link, the first IC device may additionally include transmit circuitry coupled to the signal lines 893, and the second IC device may include a counterpart input/output circuitry having an input circuit similar to input circuit 885. The first and second IC devices may be in separate IC packages coupled to a common substrate (e.g., circuit board) or coupled to different substrates (e.g., coupled to respective daughterboards with signal paths 893$_1$-893$_M$ formed in part by signal traces on the daughterboards and on a backplane, or the first IC device coupled to a daughterboard and the second IC device coupled to a motherboard). Alternatively, the first and second IC devices may be included within the same IC package (e.g., a multi-chip module, chip-stack package, paper-thin package or combination of integrated circuit dice within a package). In another embodiment, each of the signal lines $893_1$-$893_M$ forms a unidirectional or bidirectional multi-drop signaling link coupled to three or more IC devices, with the IC devices or any subset thereof being disposed on the same or different substrates, and within the same or different IC packages.

In either the point-to-point or multi-drop embodiments, the signal lines $893_1$-$893_M$ may constitute a parallel signaling path 894 for transmission of multi-bit data values. For example, each of the sample values $S_1$-$S_M$ for a given symbol time (i.e., corresponding to data values $D_1$-$D_M$ recovered from path 894) may represent a unified digital value (in which $S_M$ is a most significant bit (MSB) and sample $S_1$ is a least significant bit (LSB), M being any integer value greater than one. Also, subsets of bits within the sample values $S_1$-$S_M$ may constitute respective unified digital values (e.g., $S_1$-$S_X$ being a first value ordered from LSB to MSB, $S_{X+1}$-$S_Y$ being a second data value ordered from LSB to MSB, and so forth to $S_{Z+1}$ to $S_M$ which constitute a last data value ordered from LSB to MSB). Further, any number of successively received samples (i.e., corresponding to a packetized transmission of values) may form a unified digital value. For example, $S_1[N-i]$–$S_M[N-i]$, $S_1[N-i-1]$–$S_M[N-i-1]$, . . . , $S_1[N-i-Q]$–$S_M[N-i-Q]$ may form a unified digital value having a total of Q×M bits (Q being any integer value greater than one) in which one bit is an LSB and one bit is an MSB. Alternatively, a set of successively received samples may form multiple unified digitized values, as when bits of a first digitized value are generated in successive symbol times by partial response receivers $887_1$-$887_X$, bits of a second digitized value are generated in successive symbol times by partial response receivers $887_{X+1}$-$887_Y$, and so forth.

In the embodiment of FIG. 39, each partial response receiver 887 includes a partial response receive circuit 888, level sampler 889, adaptive module 890, edge sampler 891 and clock data recovery circuit 892. The partial response receive circuit 888 may be a multi-mode receive circuit as described above (i.e., capable of being switched between a multi-level signaling mode and a partial-response mode), or may be dedicated to partial-response operation. Also, the partial response receive circuit may operate on incoming binary or multi-level signals (e.g., 2-PAM, 4-PAM, 8-PAM, 10-PAM, etc.) having any data rate (e.g., single data rate, double data rate, quad data rate, octal data rate, decade data rate, etc.). Thus, the partial response receive circuit 888 may be implemented by any of the partial response receive circuit embodiments described herein. Similarly, the level sampler 889 and adaptive module 890 may be implemented by any of the level sampler and adaptive module embodiments described herein. For example, though depicted as outputting a single error sample, $E_{DLEV}$, the level sampler 889 may output multiple error samples to the adaptive module 890, and the adaptive module 890 may output any number of control values to the level sampler 889, partial response receive circuit 888 and edge sampler 891 (e.g., as shown in FIGS. 14, 28 and 36) in addition to or instead of $C_{DLEV}$, $C_\alpha$, /$C_\alpha$ and $C_0$. Also, though depicted in FIG. 39 as recovering a sample clock signal (SCLK) and edge clock signal (ECLK), the edge sampler 891 and clock data recovery circuit 892 may recover any number of clock signals as described above in reference to FIGS. 24 and 26 (e.g., for use in multi-data rate embodiments). Further, the edge sampler 891 and clock data recovery circuit 892 may recover phase information (i.e., for adjusting the phase of the recovered clock signals) from any or all transitions of the incoming data signal 893 as described above. The edge sampler 891 and clock data recovery circuit 892 may be omitted from the partial response receiver 887 in an embodiment in which clock signals, strobe signals or other timing signals are provided by another source, such as an external or internal clock generator, or separate clock recovery circuit.

Figure 40:
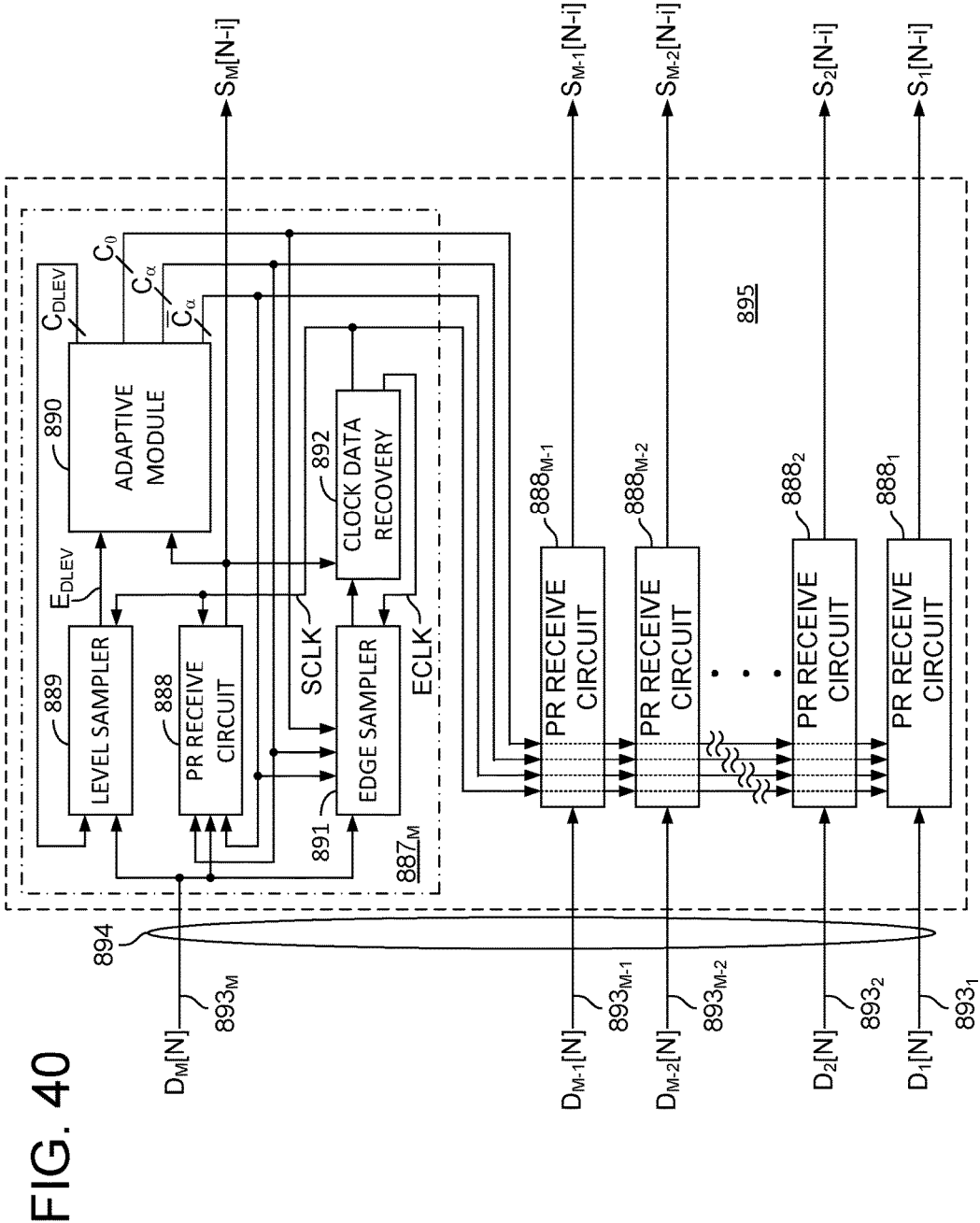
FIG. 40 illustrates an input circuit according to an alternative embodiment of the invention.

FIG. 40 illustrates an input circuit 895 according to an alternative embodiment of the invention. The input circuit 895 is similar to the input circuit 885 of FIG. 39 (and may be implemented in all the alternative embodiments described in reference to FIG. 39), except that the circuitry used to generate partial response thresholds (or representative control values) and sampling clock signals is shared among multiple partial response receive circuits $888_1$-$888_M$. That is, a single level sampler 889 and corresponding adaptive module 890 are used to generate control values $C_\alpha$, /$C_\alpha$ and $C_0$ (and additional or different threshold control values in multi-level signaling embodiments and embodiments that do not include clock recovery circuitry) that are supplied to each of the partial response receive circuits $888_1$-$888_M$, and a single edge sampler 891 and corresponding clock data recovery circuit 892 are used to generate the sampling clock signal (SCLK) that is supplied to each of the partial response receive circuits $888_1$-$888_M$. Multiple sampling clock signals may be generated and shared among the partial response receive circuits $888_1$-$888_M$ in multi-data rate embodiments. By sharing the circuitry for generating control thresholds and/or the circuitry for generating sampling clock signals, the amount of circuitry within the input circuit 895 is substantially reduced relative to input circuit 885, reducing production and operational cost of the host integrated circuit device (i.e., due to reduced die area consumption, layout complexity, test and verification time, power consumption, etc.). Note that, in an embodiment in which the sampling clock signal is provided by circuitry other than clock data recovery circuitry (e.g., external clock source, internal clock generated), the edge sampler 891 and clock data recovery circuit 892 may be omitted. Alternatively, programmable selection of the clock source may be used to select either the recovered sampling clock (i.e., recovered by operation of the edge sampler 891 and clock data recovery circuit 892) or another clock source to provide a sampling clock signal to the partial response receive circuits $888_1$-$888_M$. As in the embodiment of FIG. 39, the signal lines $893_1$-$893_M$ may be used to deliver distinct serial transmissions, or transmission of related groups of bits (e.g., the M bits received during a given symbol time representing one or more multi-bit digital values) as, for example, in the case of a parallel bus or any other signaling system in which the threshold control values and/or timing control signals are expected to be substantially similar (e.g., substantially same thresholds and/or clock phases) across multiple signaling paths. Also, while a single level sampler 889 and corresponding adaptive module 890 are depicted in FIG. 40 as generating threshold control values $C_\alpha$, /$C_\alpha$ and $C_0$ for each of the partial response receive circuits $888_1$-$888_M$, in an alternative embodiment, multiple level sampler/adaptive module pairs may be used to generate threshold control values for respective subsets of the partial response receive circuits $888_1$-$888_M$. Respective edge sampler/clock data recovery circuit pairs may similarly be used to generate sampling clock signals for corresponding subsets of partial response receive circuits $888_1$-$888_M$.

Still referring to FIG. 40, the partial response receive circuits $888_1$-$888_M$ may be implemented by any of the embodiments described herein including, without limitation, the embodiments described as described in reference to FIGS. 17-19. Also, in embodiments in which a preamplifier (e.g., preamplifier 401 of FIG. 17) or offset control circuit (e.g., offset control circuit 440 of FIG. 19) is used to adjust the effective threshold of a differential comparator above or below a common mode, such preamplifier or offset control circuit may be shared among multiple partial response receive circuits 888, thereby reducing the circuitry within the partial response receive circuits $888_1$-$888_M$ to that of a sampling circuit (e.g., sampler 425 of FIG. 17 or sampler 452 of FIG. 19). Respective preamplifiers (or offset control circuits) may also be shared among subsets of the partial response receive circuits $888_1$-$888_M$.

Transmit-Side Equalization in System with Partial Response Receiver

FIG. 41 illustrates a signaling system 950 having a transmit device 951 and receive device 953 coupled to one another via a signaling path 122. The transmit device 951 includes an equalizing transmit circuit 957 and tap control logic 955, and the receive device 953 includes a partial response receive circuit (which may, for example, be a multi-mode circuit or any other of the partial response receive circuits disclosed herein), level sampler 973 and adaptive module 975. Both the transmit device 951 and receive device 953 may include numerous other circuits not shown in FIG. 41 (e.g., application logic, additional transmit circuits and/or receive circuits, etc.). The equalizing transmit circuit 957 includes a number of output drivers $961_0$-$961_{N-1}$ to drive a symbol onto signaling path 122 in response to a transmit timing signal (not shown) and in accordance with a set of weighting values $W_0$-$W_{N-1}$ and the state of data values $D_0$-$D_{N-1}$. Each of the data values $D_0$-$D_{-(N-1)}$ is stored within a shift register 959 (or similar storage circuit) and includes a number of constituent bits in accordance to the number of bits encoded into each symbol transmission on the signaling path 102. For example, in a 4-PAM system, each of the data values, $D_0$-$D_{-(N-1)}$, includes two constituent bits. More generally, in a M-PAM system, each of the data values includes $\log_2(M)$ constituent bits. After each symbol transmission, the contents of the shift register 959 are shifted forward so that a new data value is shifted into position $D_0$, and the data value at position $D_{-(N-1)}$ is overwritten by the data value previously at position $D_{-(N-2)}$.

The weighting values $W_0$-$W_{N-1}$ are generated by the tap control logic 955 and are used to establish the signal drive strength of each of the output drivers 961. In one embodiment, the output driver $961_0$ drives the symbol to be transmitted during a given symbol time in accordance with weighting value $W_0$, and the output drivers $961_1$-$961_{N-1}$ constitute a set of post-tap drivers for equalizing the output signal according to the post-tap data values stored within positions $D_{-1}$-$D_{-(N-1)}$ of the shift register 959 and the weighting values $W_1$-$W_{N-1}$. Though not shown in FIG. 41, pre-tap output drivers may also be provided to equalize the output signal according to pre-tap data values (and pre-tap weighting values), and yet other output drivers may be provided to cancel cross-talk from neighboring signal lines. Also, one or more of the output drivers 961 may be dynamically or statically allocated between pre-tap equalization, post-tap equalization and cross-talk cancellation functions, for example, through configuration register settings or externally received configuration control signals.

The partial response receive circuit 971 includes R compare circuits to generate respective partial response values according to the number of expected partial response signal levels. For example, in a system in which the least-latent symbol (i.e., the most recently received symbol, N−1−i, relative to incoming symbol N−i) is the only expected contributor to the partial response, two compare circuits are provided to generate partial response values according to the two possible states of least-latent symbol (i.e., R=2). In a system in which the K most recently received symbols are expected to contribute to the partial response, 2K compare circuits are provided to generate respective data samples based on comparisons with the K partial response threshold levels ($C_{PR}$) generated by the adaptive module 975.

In one embodiment, the tap control logic 955 of transmit device 951 generates the weighting values $W_0$-$W_{N-1}$ in accordance with the number of symbols desired to contribute to the partial response observed at the receive device 953. Referring to FIG. 42, for example, in a system in which the partial response is to be limited to the least latent symbol, $D_{-1}$ (i.e., K=1), the tap control logic 955 generates weighting values $W_0$-$W_{N-1}$ to equalize the dispersion-type ISI produced by symbol transmissions after $D_{-1}$ and prior to $D_0$. That is, referring to the raw pulse response shown in FIG. 42, the partial response of the signaling path 122 to symbols $D_{+1}$, and $D_{-2}$ to $D_{-(N-1)}$ is equalized by appropriate settings of the weighting values applied to a pre-tap output driver (not shown in FIG. 41) and post-tap output drivers $961_2$-$961_{N-1}$. By this arrangement, the equalized signal observed by the receive device 953 (i.e., equalized for partial response as depicted in FIG. 42) includes a contribution from the symbol to be received, $D_0$, and a partial response to the immediately preceding symbol, $D_{-1}$, with the partial response to all other transmissions being attenuated (e.g., to a negligible or substantially reduced level). In alternative embodiments, the tap control logic 955 may enable partial response to one or more additional symbols to remain in the signal observed by the receive device 953 depending on the desired number of partial response contributors. Also, in a multi-mode circuit in which a partial response receive circuit may optionally be operated in a non-partial response mode, the tap control logic 955 may generate weighting values $W_0$-$W_{N-1}$ as necessary to cancel (or reduce) the partial response to post-tap and pre-tap data values.

Still referring to FIG. 41, the level sampler 973 within the receive device 953 operates generally as described above (e.g., in reference to the various embodiments described in reference to FIGS. 14-15 and 20-21) to compare the incoming signal with a data level threshold and generate error samples ($E_{DLEV}$) that are used to adjust the data level threshold(s), $C_{DLEV}$, and the partial response thresholds, $C_{PR}$. As discussed above, the data level threshold and/or the partial response thresholds, $C_{PR}$, may be digital values that are used to establish the desired threshold levels within compare circuits of the partial response receive circuit 971 and the level sampler 973, or any other types of control values (e.g., analog voltage and/or current levels that are themselves the threshold levels).

As discussed above in reference to FIG. 15, the adaptive module may include filtering circuitry to filter the error samples generated by the level sampler 973 such that the threshold levels generated by the adaptive module are updated based on multiple error samples, rather than on a sample-by-sample basis. For example, in one embodiment, the adaptive module includes a finite impulse response (FIR) filter to update the threshold levels based on a succession of error samples applied to the filter. Alternatively, the adaptive module may include an infinite impulse response filter (IIR) or any other type of filter for filtering the error samples.

In one embodiment, the data level error samples, $E_{DLEV}$, generated by the level sampler 973 are returned to the transmit device 951 via a back channel 968 (e.g., out-of-band signaling, passage via an intermediary device such as the controller 141 of FIG. 3, or other communication path that does not consume otherwise usable bandwidth on the signaling path 122). The error samples are received within the tap control logic 955 and used to adjust the tap weights, $W_0$-$W_{N-1}$, as necessary to reduce ISI (or other sources of distortion) resulting from transmission of symbols other than symbols desired to contribute to the partial response. Referring to FIG. 43, for example, after the data level threshold generated by the adaptive module 975 converges to a nominal data level 985 ($DLEV_{NOM}$), further jitter detected in the signal data level 986 may be treated as residual ISI due resulting from transmission of symbols other than symbols desired to contribute to the partial response. The tap control logic may increase and decrease the weights of the post-tap output drivers and/or pre-tap output drivers as necessary to reduce the residual ISI. In alternative embodiments, updates to the tap weights themselves (e.g., values to be added and/or subtracted from weights $W_0$-$W_{N-1}$ or a subset thereof) may be determined within the receive device (or another device such as controller 141 of FIG. 3) and provided to the transmit device for application within the tap control logic 955. In yet other embodiments, one or more replacement tap weights may be determined within the receive device (or other device such as controller 141 of FIG. 3) and provided to the transmit device for application in place of corresponding tap weights $W_0$-$W_{N-1}$.

Section headings have been provided in this detailed description for convenience of reference only, and in no way define, limit, construe or describe the scope or extent of such sections. Also, while the invention has been described with reference to specific embodiments thereof, it will be evident that various modifications and changes may be made thereto without departing from the broader spirit and scope of the invention. Accordingly, the specification and drawings are to be regarded in an illustrative rather than a restrictive sense.

What is claimed is:

1. A receiver integrated circuit comprising:
    sampling circuitry to sample a multi-PAM input symbol, the sampling circuitry to sample the signal and generate multi-bit sample values that indicate whether the signal exceeds respective threshold levels;
    a select circuit to receive the multi-bit sample values from the sampling circuitry and to select, based at least in part upon at least one previously sampled value, at least one of the multi-bit sample values; and
    storage to store the at least one previously sampled value, and to provide the at least one previously sampled value to the select circuit.

2. The receiver integrated circuit according to claim 1, wherein the sampling circuitry comprises a receive circuit operable to resolve a signal level of the input symbol into four possible two-bit combinations.

3. The receiver integrated circuit according to claim 2, wherein the receiver circuit further comprises:
    a level sampler; and
    an adaptive module to adaptively determine values for the threshold levels.

4. The receiver integrated circuit according to claim 1, wherein the sampling circuit includes comparison circuitry to compare the received input symbol to a respective threshold level that is offset from a corresponding one of the four data levels according to one of four partial response levels.

5. The receiver integrated circuit according to claim 4, wherein:
    the sampling circuit is operable to resolve the input symbol into at least four two-bit sample values according to each of the four possible partial responses to the preceding symbol.

6. The receiver integrated circuit according to claim 1, wherein:
    the input symbol comprises a 4-PAM signal.

7. The receiver circuit according to claim 1, further comprising:
    a clock data recovery circuit coupled to receive the at least one selected sampled value, and operable to generate in dependence thereon a sampling clock signal, and wherein the sampling circuit is operable to sample the input symbol in dependence on the sampling clock signal.

8. A multi-mode receiver integrated circuit comprising:
    receive circuitry;
    a mode select circuit responsive to a mode select signal to configure the receive circuitry into one of a multi-level receiver to receive an input data symbol having one of at least four levels or a 2-PAM partial response receiver to receive an input data symbol having one of two levels;
    wherein the multi-level receiver includes comparison circuitry to compare the input symbol to at least four respective threshold level control values; and
    wherein the 2-PAM partial response receiver uses at least a portion of the comparison circuitry to compare the input data symbol to respective partial response threshold levels.

9. The multi-mode receiver circuit according to claim 8, further comprising:
    an adaptive module to adaptively generate the threshold level control values and the partial response threshold levels.

10. The multi-mode receiver circuit according to claim 8 wherein:
    the receive circuitry comprises four receive circuits; and
    wherein the 2-PAM partial response receiver uses first and second receive circuits from the four receive circuits to compare the input data symbol to respective partial response threshold levels.

11. The multi-mode receiver circuit according to claim 10, wherein:
    the 2-PAM partial response receiver uses a third receive circuit from the four receive circuits to generate the partial response levels.

12. The multi-mode receiver circuit according to claim 8, wherein:
    the mode select signal is provided from an external source.

13. The multi-mode receiver circuit according to claim 8, further comprising:
    a configuration control circuit to provide the mode select signal to the mode select circuit.

14. The multi-mode receiver circuit according to claim 13, wherein:
    the configuration control circuit includes a configuration register; and
    the mode select signal is stored in the configuration register.

15. The multi-mode receiver circuit according to claim 14, wherein:
    the configuration control circuit is operable to dynamically change the state of the mode select signal in response to detected system conditions.

16. The multi-mode receiver circuit according to claim 8, further comprising:
    a clock data recovery circuit coupled to receive selected sampled values, and operable to generate in dependence thereon a sampling clock signal, and wherein the receive circuit is operable to sample the input data symbol in dependence on the sampling clock signal.

17. A multi-mode receiver integrated circuit comprising:
a level sampler circuit responsive to a sampling clock signal to generate data samples, the level sampler circuit including a receive circuit operable to be configured into one of a 4-PAM receiver to receive an input data symbol having one of at least four data levels or a 2-PAM partial response receiver to receive an input data symbol having one of two levels;
an edge sampler circuit to capture transition samples in response to transitions of an edge clock signal; and
a clock data recovery circuit operable to selectively adjust a phase of the edge clock signal and a phase of the sampling clock signal based on the transition samples and data samples.

18. The multi-mode receiver integrated circuit according to claim 17, further comprising:
a mode select circuit responsive to a mode select signal to configure the receive circuit into one of the multi-level receiver or the 2-PAM partial response receiver.

19. The multi-mode receiver integrated circuit according to claim 18, wherein:
the mode select signal is provided from an external source.

20. The multi-mode receiver circuit according to claim 17, further comprising:
an adaptive module to adaptively generate threshold level control values for the multi-level receiver and partial response threshold levels for the 2-PAM partial response receiver.

* * * * *